(12) United States Patent
Sudo et al.

(10) Patent No.: US 11,703,669 B2
(45) Date of Patent: Jul. 18, 2023

(54) ZOOM LENS AND IMAGE PICKUP APPARATUS

(71) Applicant: CANON KABUSHIKI KAISHA, Tokyo (JP)

(72) Inventors: Kenta Sudo, Tochigi (JP); Kazuki Someya, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 221 days.

(21) Appl. No.: 17/126,458

(22) Filed: Dec. 18, 2020

(65) Prior Publication Data

US 2021/0199937 A1    Jul. 1, 2021

(30) Foreign Application Priority Data

Dec. 25, 2019  (JP) ................. 2019-233783
Dec. 25, 2019  (JP) ................. 2019-234095

(51) Int. Cl.
*G02B 15/14*    (2006.01)
*G02B 15/16*    (2006.01)

(52) U.S. Cl.
CPC .. *G02B 15/1441* (2019.08); *G02B 15/144113* (2019.08); *G02B 15/145121* (2019.08); *G02B 15/16* (2013.01)

(58) Field of Classification Search
None
See application file for complete search history.

(56) References Cited

U.S. PATENT DOCUMENTS

| | | |
|---|---|---|
| 10,061,114 B2 | 8/2018 | Sudo |
| 10,197,778 B2 | 2/2019 | Sudo et al. |
| 10,545,335 B2 | 1/2020 | Sudo |
| 2004/0169935 A1 | 9/2004 | Oomura et al. |
| 2012/0250162 A1 | 10/2012 | Wakazono et al. |
| 2012/0300118 A1* | 11/2012 | Shimomura .......... G02B 15/22 359/686 |
| 2014/0268366 A1 | 9/2014 | Shinohara |

(Continued)

FOREIGN PATENT DOCUMENTS

| | | |
|---|---|---|
| CN | 102216825 A | 10/2011 |
| CN | 102707417 A | 10/2012 |

(Continued)

OTHER PUBLICATIONS

Notification of the First Office Action issued by the China National Intellectual Property Administration dated Jun. 21, 2022 in corresponding CN Patent Application No. 202011526932.1, with English translation.

(Continued)

*Primary Examiner* — Darryl J Collins
(74) *Attorney, Agent, or Firm* — Carter, DeLuca & Farrell LLP

(57) ABSTRACT

A zoom lens includes, in order from an object side to an image side, a first lens unit having a positive refractive power, a second lens unit having a negative refractive power, a third lens unit having a positive refractive power, and one or more rear lens units. The first lens unit does not move for zooming. An interval between each pair of adjacent lens units changes in zooming. The first lens unit includes a positive lens made of material with an Abbe number less than 30. A predetermined condition is satisfied.

8 Claims, 24 Drawing Sheets

(56) References Cited

U.S. PATENT DOCUMENTS

| | | | |
|---|---|---|---|
| 2020/0271924 A1 | 8/2020 | Abe et al. | |
| 2020/0348495 A1 | 11/2020 | Sudo | |
| 2021/0109330 A1* | 4/2021 | Hori | G02B 15/173 |
| 2021/0141198 A1* | 5/2021 | Asami | G02B 15/144113 |

FOREIGN PATENT DOCUMENTS

| | | |
|---|---|---|
| CN | 102854612 A | 1/2013 |
| CN | 104049346 A | 9/2014 |
| CN | 110208934 A | 9/2019 |
| JP | 2000-105336 A | 4/2000 |
| JP | 2012-123031 A | 6/2012 |
| JP | 2012-128116 A | 7/2012 |
| JP | 2013-50519 A | 3/2013 |
| JP | 2014219601 A | 11/2014 |
| JP | 2017-062318 A | 3/2017 |

OTHER PUBLICATIONS

Notification to Grant Patent Right issued by the China National Intellectual Property Administration dated Dec. 5, 2022 in corresponding CN Patent Application No. 202011526932.1, with English allowed claims.

* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

A small size and a high magnification ratio are required in a zoom lens used in an image pickup apparatus such as a monitoring camera, a digital still camera, a digital video camera, a broadcasting camera, and the like. As the zoom lens having the high magnification ratio, a positive lead type zoom lens is known that includes a first lens unit having a positive refractive power where the first lens unit does not move for magnification variation. Japanese Patent Application Laid-Open No. ("JP") 2012-123031 discloses a zoom lens in which refractive powers of units are respectively positive, negative, positive, and positive in order from an object side, and in which, for a magnification variation, a first lens unit and a third lens unit do not move and a second lens unit and a fourth lens unit move. JP2012-128116 discloses a zoom lens in which refractive powers of units are respectively positive, negative, positive, positive, and positive in order from an object side, and in which, for the magnification variation, a first lens unit, a third lens unit, and a fifth lens unit do not move, and a second lens unit and a fourth lens unit move.

A zoom lens is desired that has at least one of a higher magnification ratio, a smaller size, and a higher optical performance than those of the zoom lenses disclosed in JP2012-123031 and JP2012-128116.

Further, as a lens used in an image pickup apparatus, a lens is required that has high optical performance so as to support an image pickup element of high definition. In recent years, with a rapid expansion of a monitoring camera market, a monitoring camera has been required to have a lens of a high optical performance. Further, a zoom lens is required to have a wide-angle and high magnification variation from a viewpoint of degree of freedom in monitoring, and to have a small size from a viewpoint of easy installation and inconspicuousness.

JP 2013-50519 discloses a small zoom lens which includes lens units having refractive powers of positive, negative, positive and positive, and which has a high magnification ratio of about 30. JP 2000-105336 discloses a zoom lens which includes lens units having refractive powers of positive, negative, positive, negative and positive, and which has a high magnification ratio of about 40 and high performance.

The zoom lens disclosed in JP 2013-50519 has insufficient performance for a high-quality image such as 4K or 8K. The zoom lens disclosed in JP 2000-105336 has too long total length. That is, although each of the zoom lenses disclosed in JP 2013-50519 and JP 2000-105336 has the high magnification ratio, each is insufficient in the high performance or the small size.

SUMMARY OF THE INVENTION

An aspect of embodiments provides, for example, a zoom lens beneficial in a high magnification ratio, a small size, and high optical performance over an entire zoom range.

A zoom lens according to one aspect of embodiments includes, in order from an object side to an image side, a first lens unit having a positive refractive power, a second lens unit having a negative refractive power, a third lens unit having a positive refractive power, and one or more rear lens units. The first lens unit does not move for zooming. An interval between each pair of adjacent lens units changes in zooming. The first lens unit includes a positive lens made of material with an Abbe number less than 30. A predetermined condition is satisfied.

An image pickup apparatus including the above zoom lens constitutes another aspect of embodiments.

A zoom lens according to one aspect of embodiments includes, in order from an object side to an image side, a first lens unit having a positive refractive power, a second lens unit having a negative refractive power, a third lens unit having a positive refractive power, and one or more rear lens units. Three or more lens units move and an interval between each pair of adjacent lens units changes in zooming from a wide-angle end to a telephoto end. A positive lens, of positive lenses included in the first lens unit, having a smallest Abbe number for d-line being named as G1vdmin, the first lens unit includes a negative lens on each of the object side and the image side of the positive lens G1vdmin. A predetermined condition is satisfied.

An image pickup apparatus including the above zoom lens constitutes another aspect of embodiments.

Further features of the present invention will become apparent from the following description of exemplary embodiments with reference to the attached drawings.

DESCRIPTION OF THE EMBODIMENTS

Figure 1:
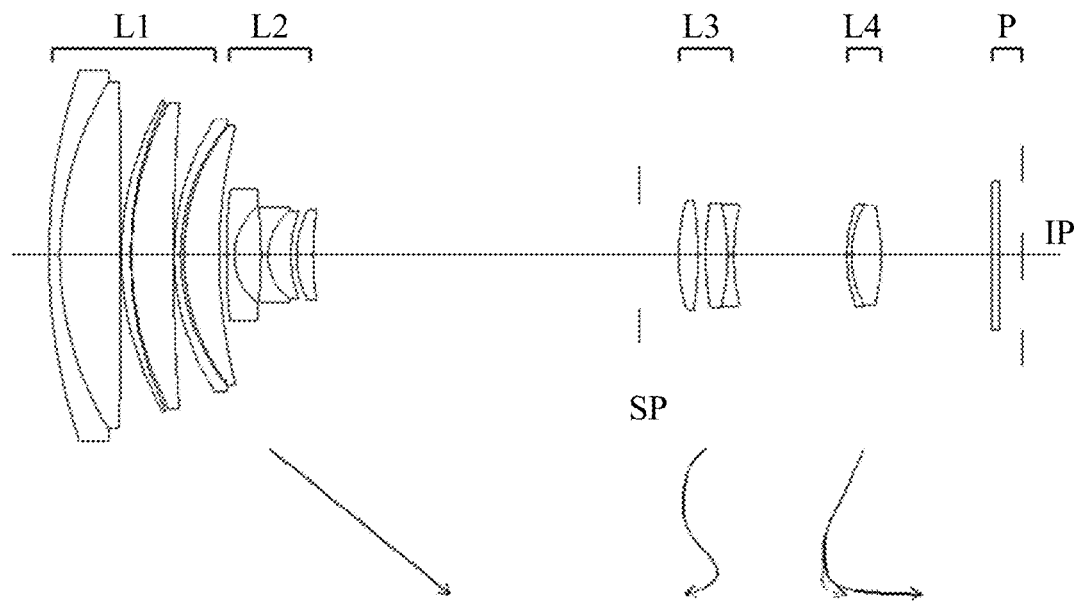
FIG. 1 is a sectional view of a zoom lens at a wide-angle end according to a first embodiment.

Referring now to the accompanying drawings, a description will be given of embodiments according to the present invention. Corresponding elements in respective figures will be designated by the same reference numerals, and a description thereof will be omitted.

First, zoom lenses will be described according to first to fifth embodiments. FIGS. 1, 3, 5, 7, and 9 are sectional views of the lenses at wide-angle ends of the zoom lenses according to the first to fifth embodiments, respectively. The zoom lens according to each embodiment is used in an image pickup apparatus such as a digital video camera, a digital still camera, a broadcasting camera, a silver halide film camera, and a monitoring camera.

In each sectional view, a left side is an object side and a right side is an image side. The zoom lens according to each embodiment includes a plurality of lens units. In the specification of the present application, a lens unit is a group of lenses that integrally move or stop during zooming. That is, in the zoom lens according to each embodiment, each an interval between each pair of adjacent lens units changes in zooming. A lens unit may consist of one lens or may consists of a plurality of lenses. A lens unit may include a diaphragm that is also referred to as an aperture stop.

The zoom lens according to each embodiment includes a first lens unit L1 having a positive refractive power, a second lens unit L2 having a negative refractive power, a third lens unit L3 having a positive refractive power, and one or more rear lens units, which are disposed in order from the object side to the image side.

SP represents an aperture stop. An aperture diameter of the aperture stop SP may be constant or variable during zooming. By changing the diameter of the aperture stop SP, it is possible to cut lower ray coma flare and to acquire better optical performance, the lower ray coma flare being caused by an off-axis light beam that largely occurs at the telephoto end. IP represents an image plane. When the zoom lens according to each embodiment is used as an image pickup optical system for a digital still camera or a digital video camera, the image plane IP is an image pickup plane of a solid-state image pickup element (photoelectric converter) such as a CCD sensor or a CMOS sensor. When the zoom lens according to each embodiment is used as an image pickup optical system for a silver halide film camera, the image plane IP is a photosensitive surface corresponding to a film surface. P represents an optical block corresponding to an optical filter, a face plate, a low pass filter, an infrared cut filter, and the like.

In the zoom lens according to each embodiment, the first lens unit does not move for zooming and an interval between each pair of adjacent lens units changes in zooming. Arrows illustrated in each sectional view represent movement trajectories of the lens units in zooming from a wide-angle end to a telephoto end. Since the first lens unit L1 having a largest outer diameter does not move for zooming, it is possible to suppress increase in the size of the zoom lens.

In the zoom lens according to each embodiment, focusing is performed by moving, on the optical axis, a fourth lens unit disposed on the image side of the third lens unit L3. Each sectional view illustrates movement trajectories of the fourth lens unit, and a curved line drawn by a solid line represents a movement trajectory for correcting an image plane variation caused by the zooming from the wide-angle end to the telephoto end, during focusing for an object at infinity. A curved line drawn by a dotted line represents a movement trajectory for correcting an image plane variation caused by the zooming from the wide-angle end to the telephoto end during focusing for a near-distance object. Focusing may be performed by moving one of the lens units in the rear lens unit on the optical axis, and may be performed by moving, on the optical axis, a fifth lens unit disposed on the image side of the fourth lens unit.

Figure 2A:
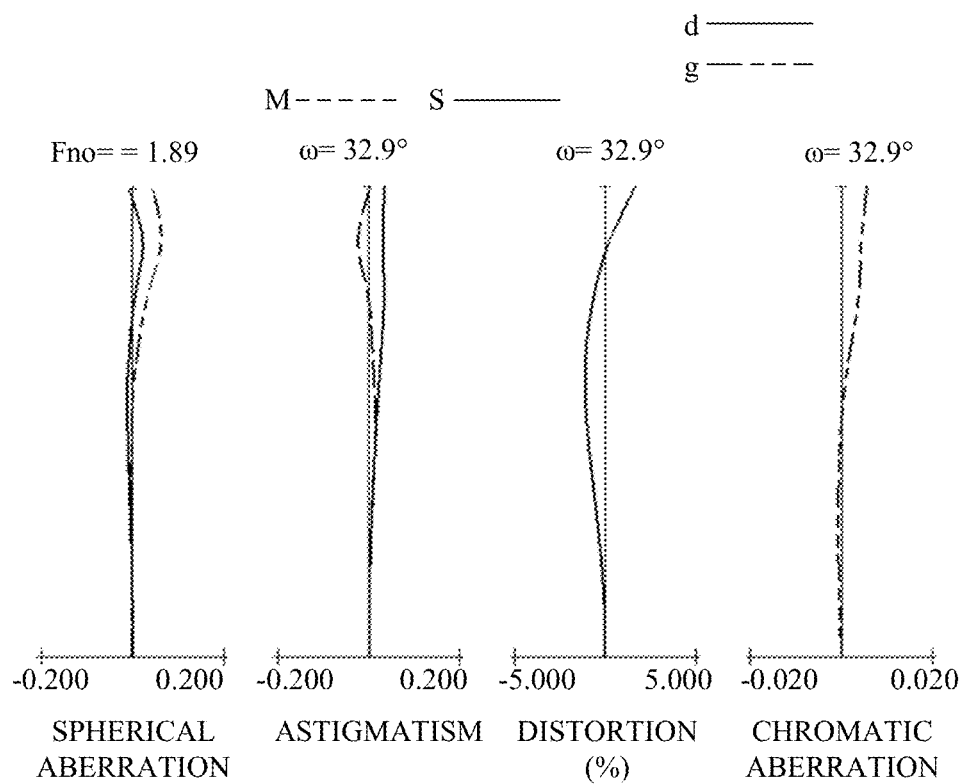
FIGS. 2A to 2C are aberration diagrams at the wide-angle end, a middle zoom position, and a telephoto end according to the first embodiment.
Figure 2B:
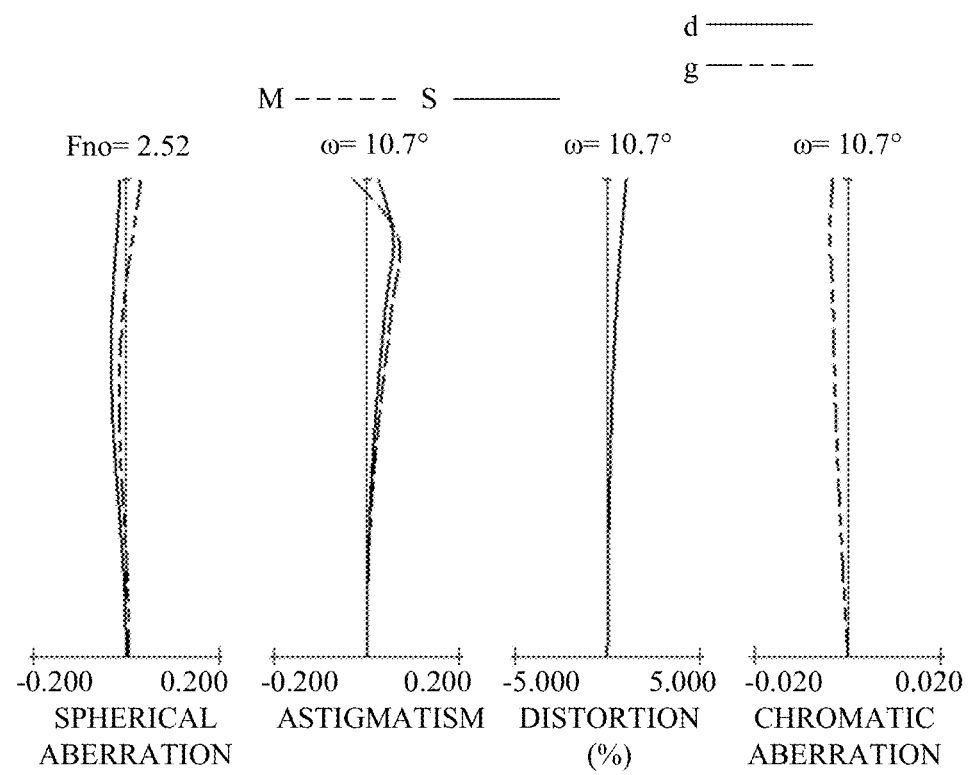
Figure 2C:
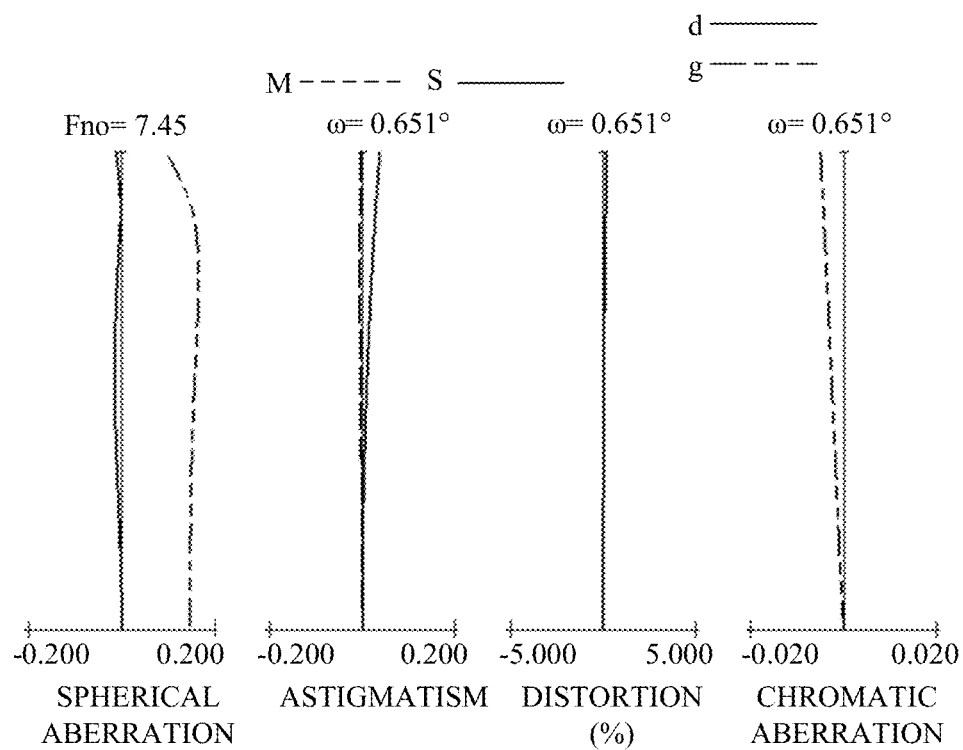
Figure 3:
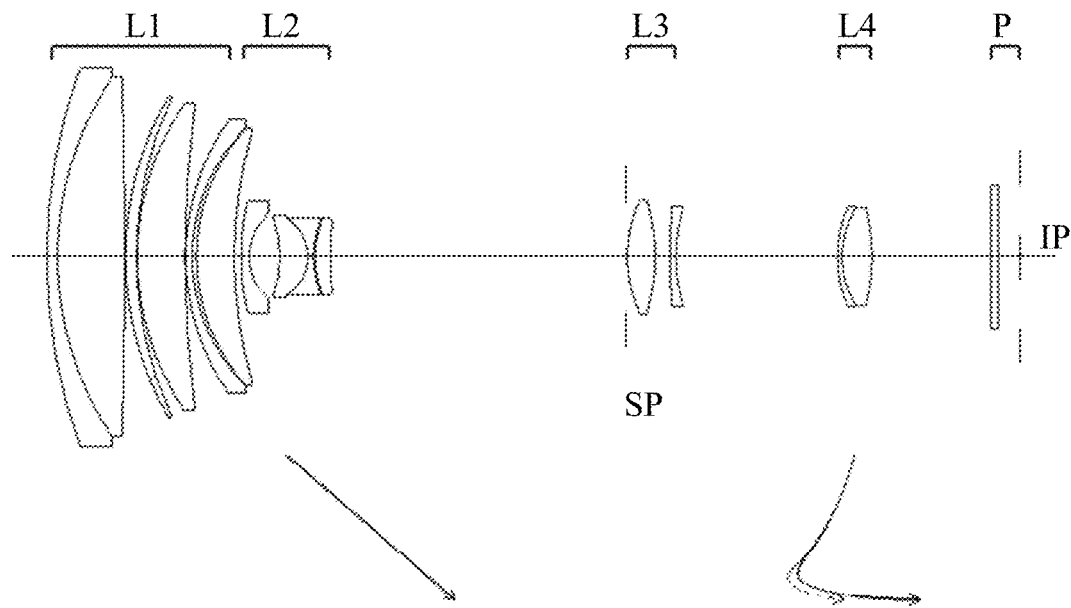
FIG. 3 is a sectional view of a zoom lens at a wide-angle end according to a second embodiment.
Figure 4A:
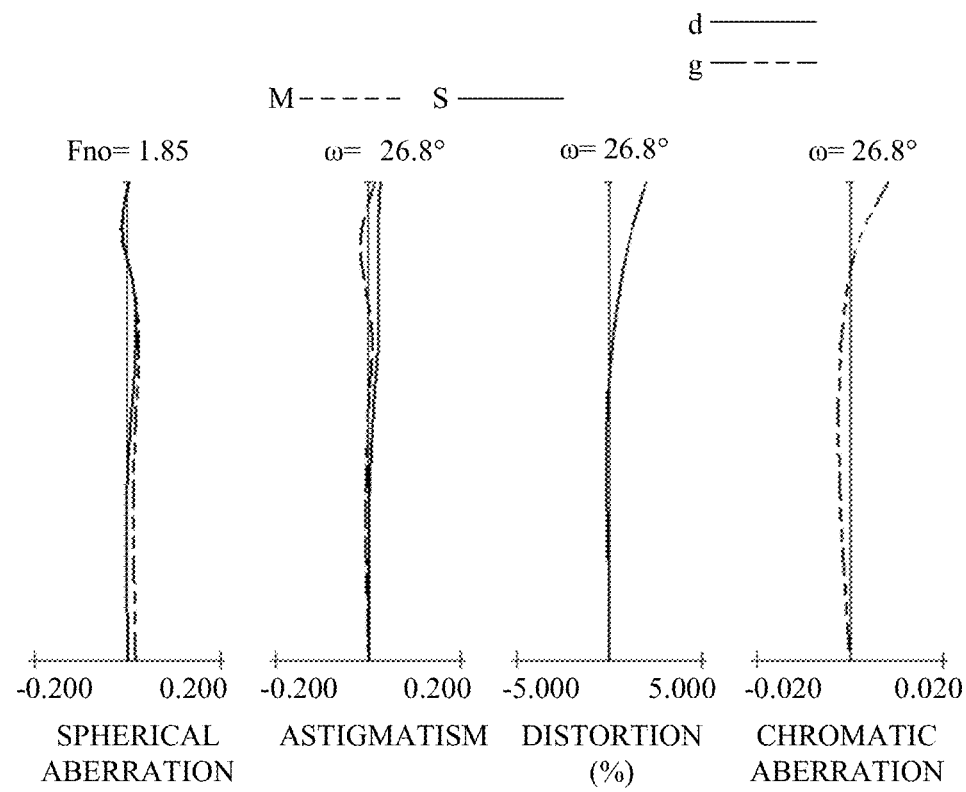
FIGS. 4A to 4C are aberration diagrams at the wide-angle end, a middle zoom position, and a telephoto end according to the second embodiment.
Figure 4B:
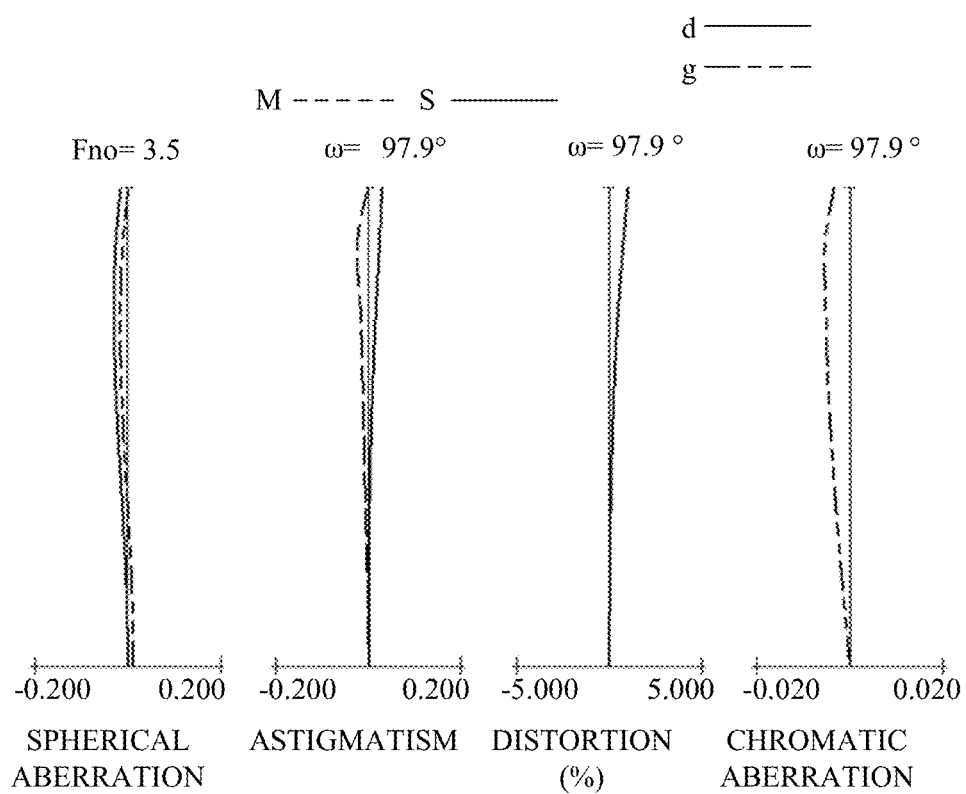
Figure 4C:
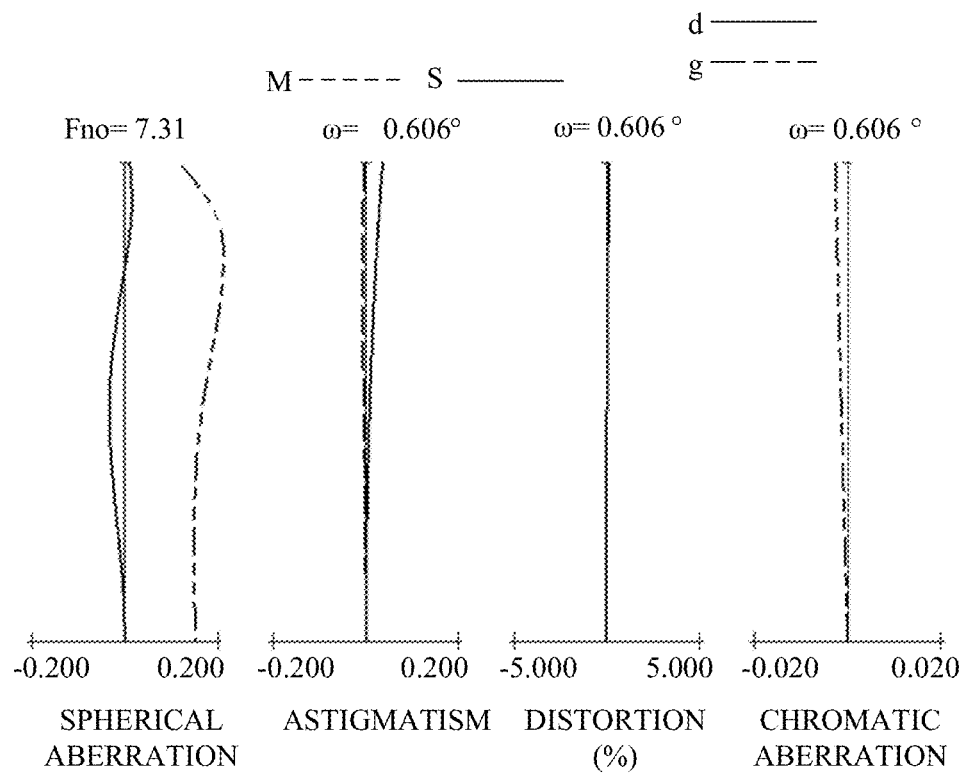
Figure 5:
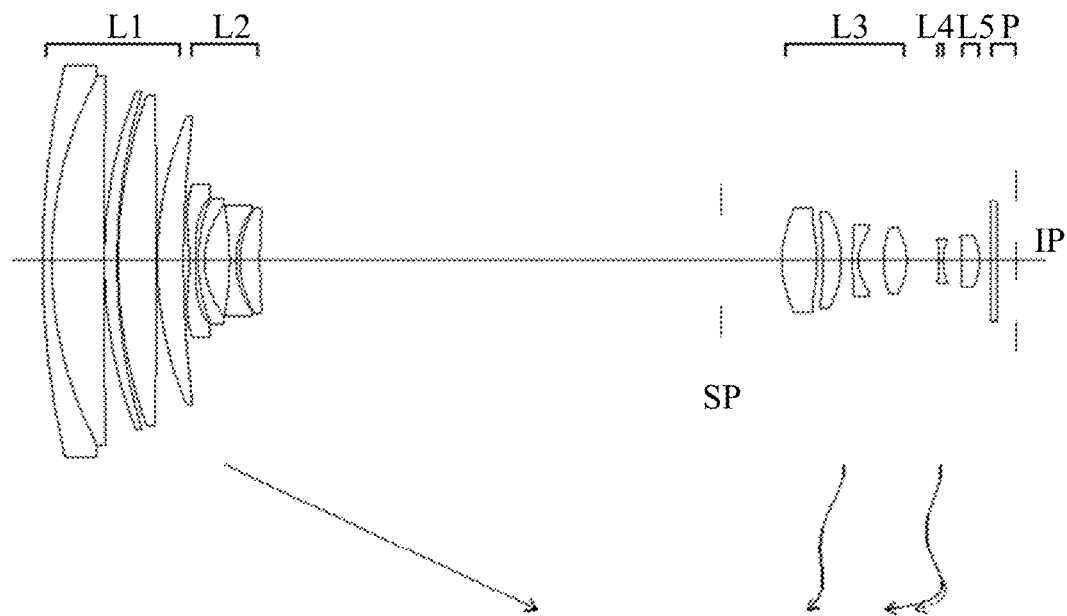
FIG. 5 is a sectional view of a zoom lens at a wide-angle end according to a third embodiment.
Figure 6A:
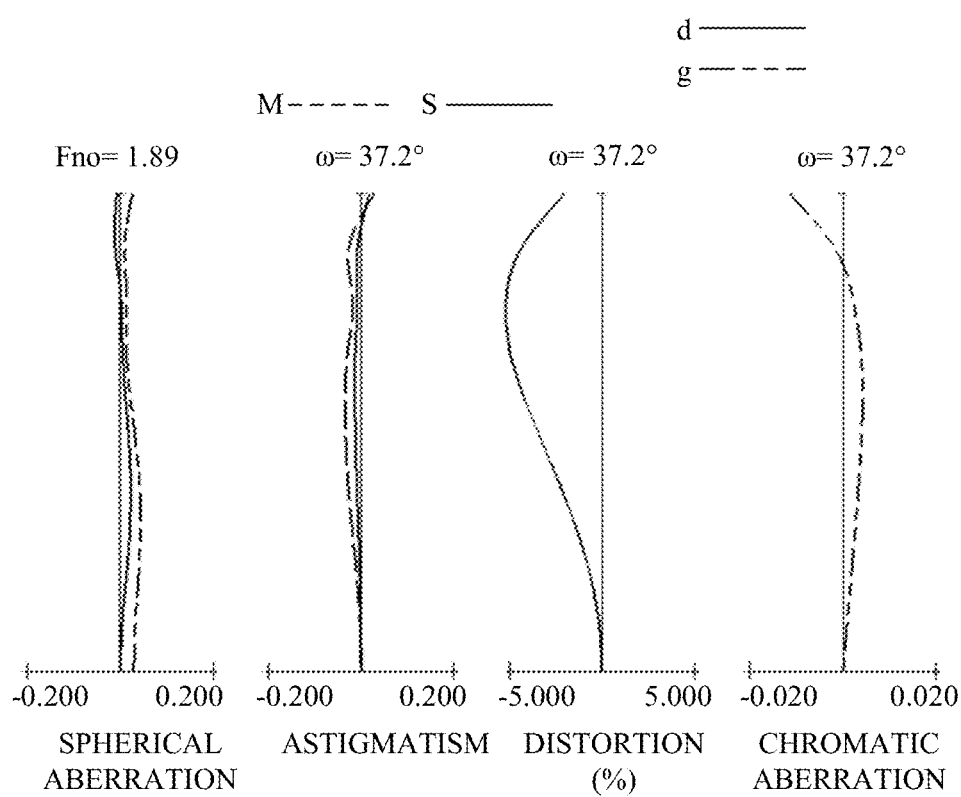
FIGS. 6A to 6C are aberration diagrams at the wide-angle end, a middle zoom position, and a telephoto end according to the third embodiment.
Figure 6B:
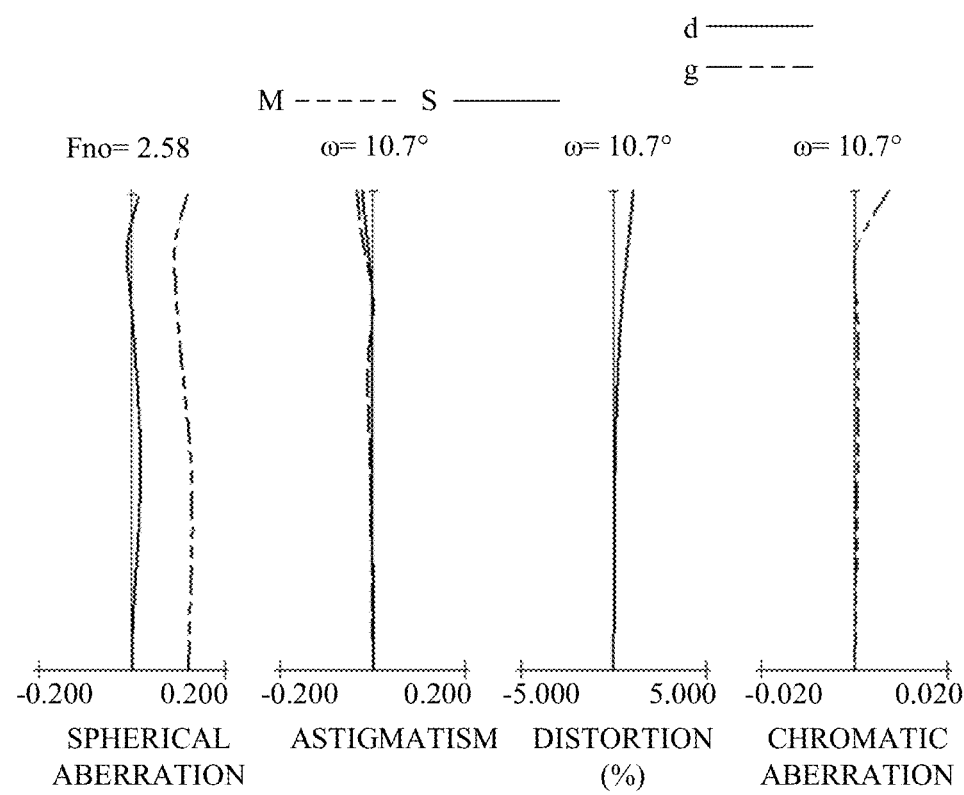
Figure 6C:
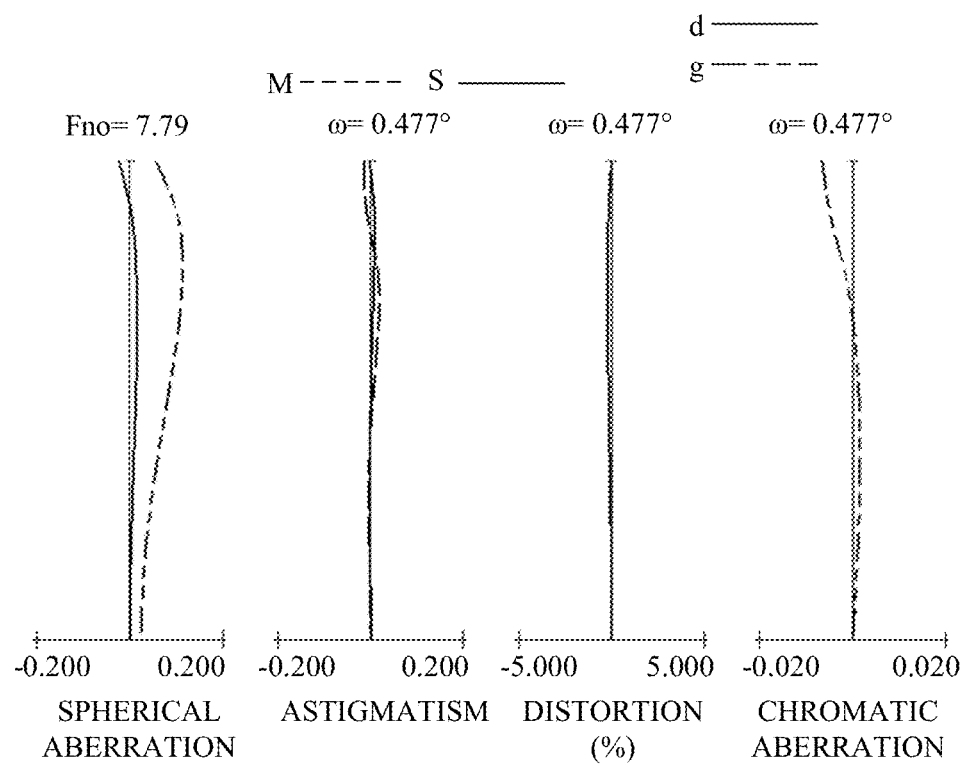
Figure 7:
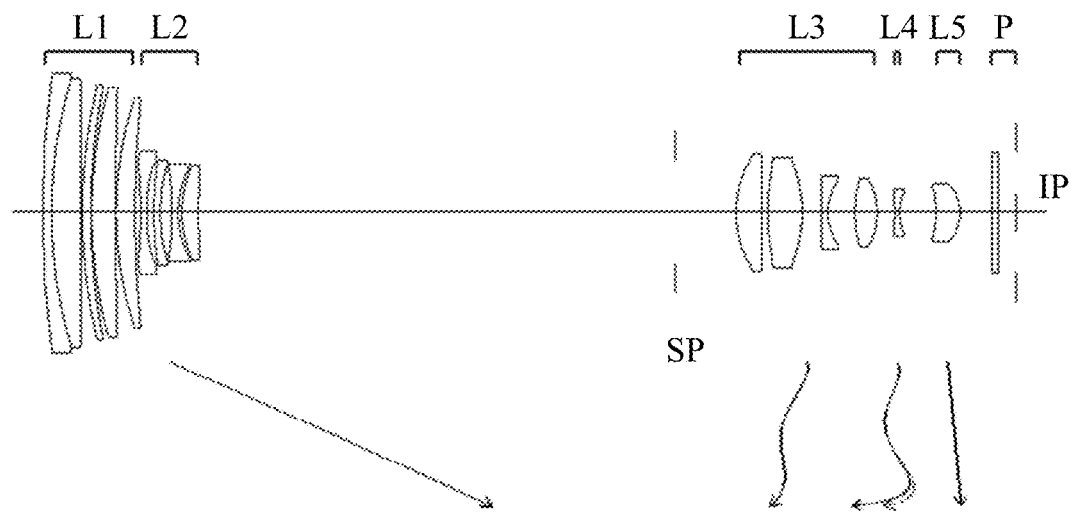
FIG. 7 is a sectional view of a zoom lens at a wide-angle end according to a fourth embodiment.
Figure 8A:
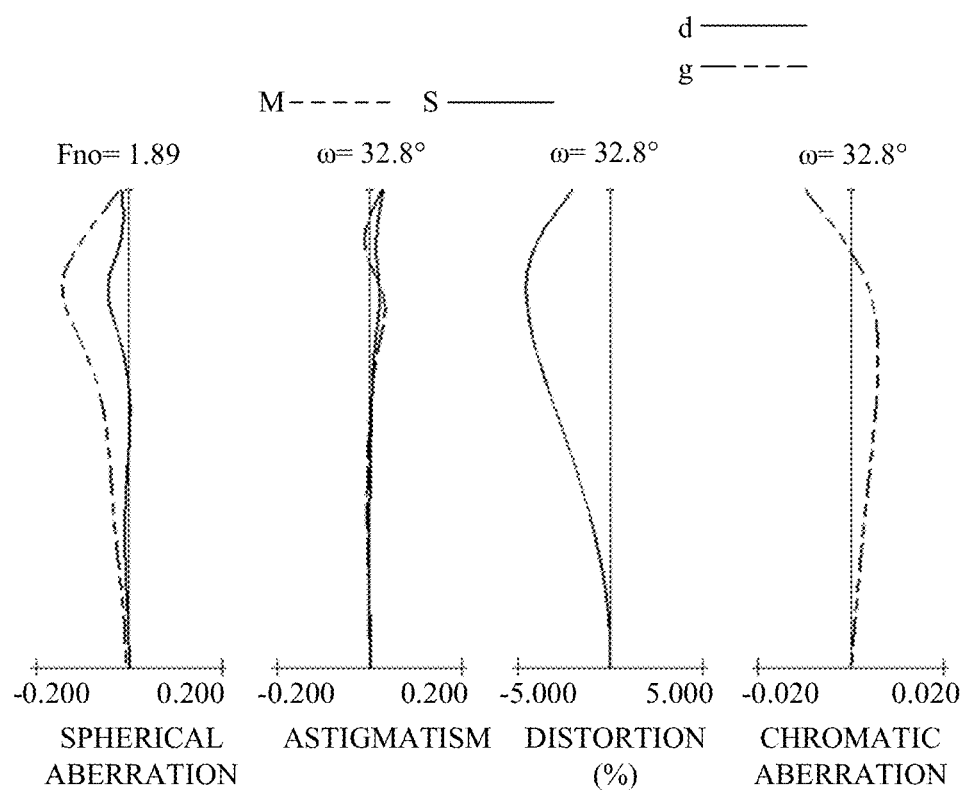
FIGS. 8A to 8C are aberration diagrams at the wide-angle end, a middle zoom position, and a telephoto end according to the fourth embodiment.
Figure 8B:
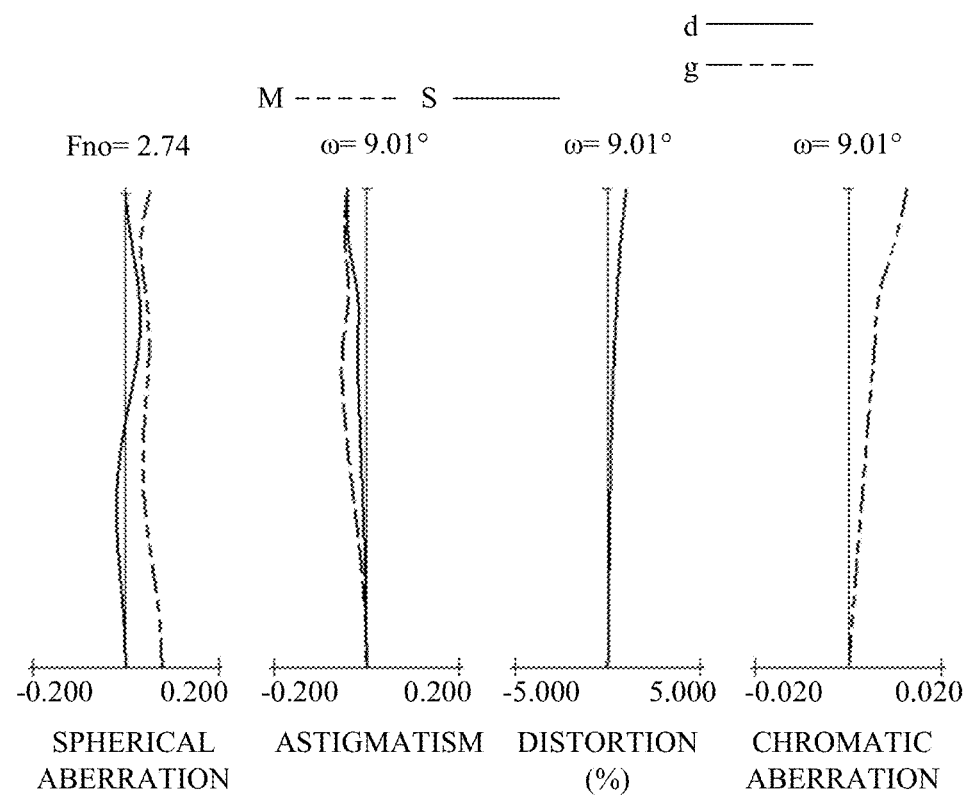
Figure 8C:
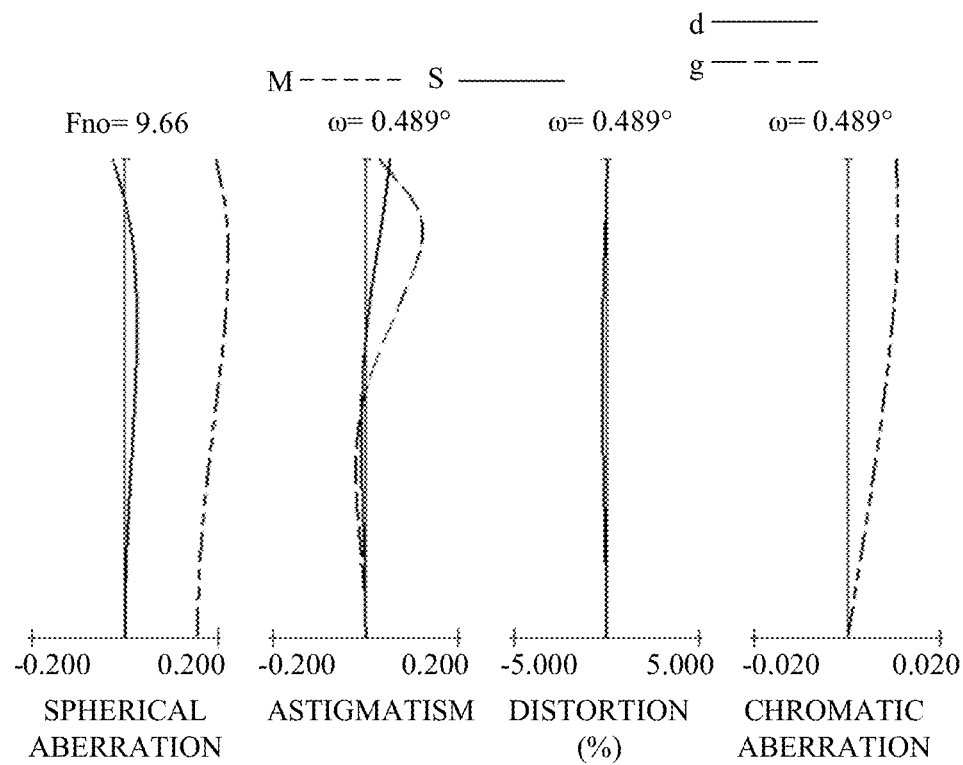
Figure 9:
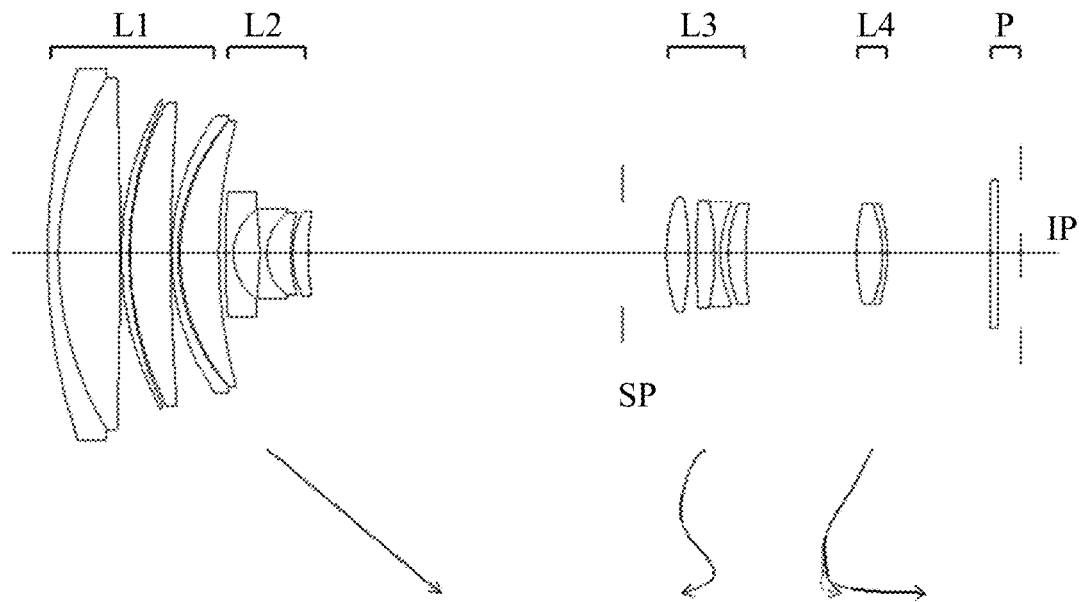
FIG. 9 is a sectional view of a zoom lens at a wide-angle end according to a fifth embodiment.
Figure 10A:
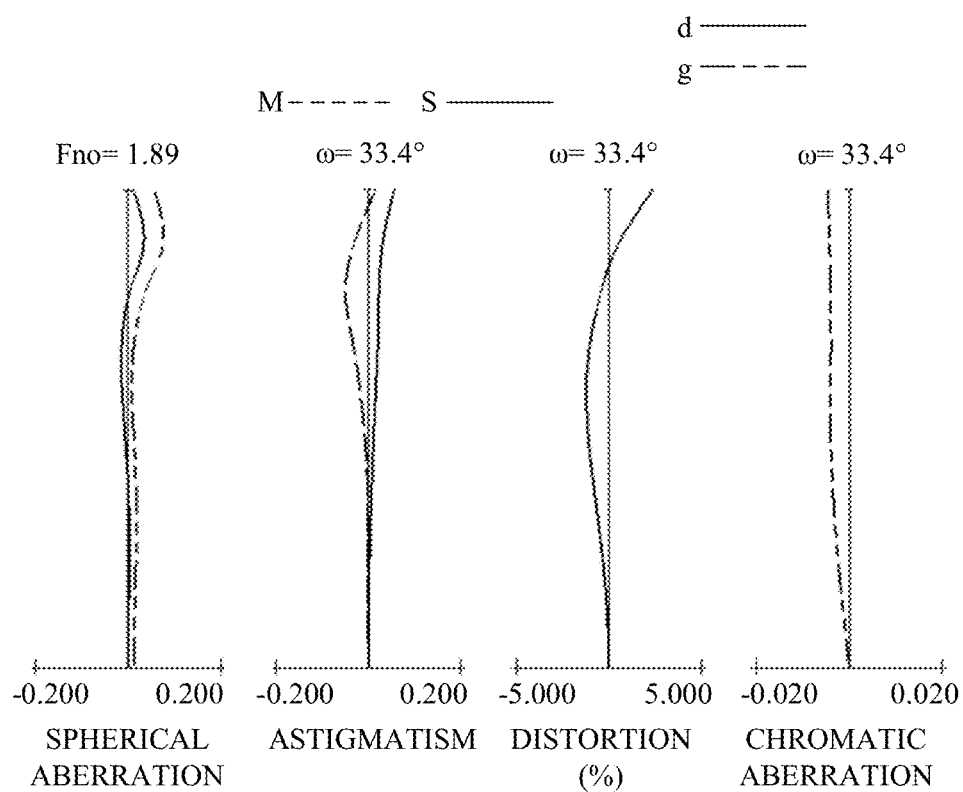
FIGS. 10A to 10C are aberration diagrams at the wide-angle end, a middle zoom position, and a telephoto end according to the fifth embodiment.
Figure 10B:
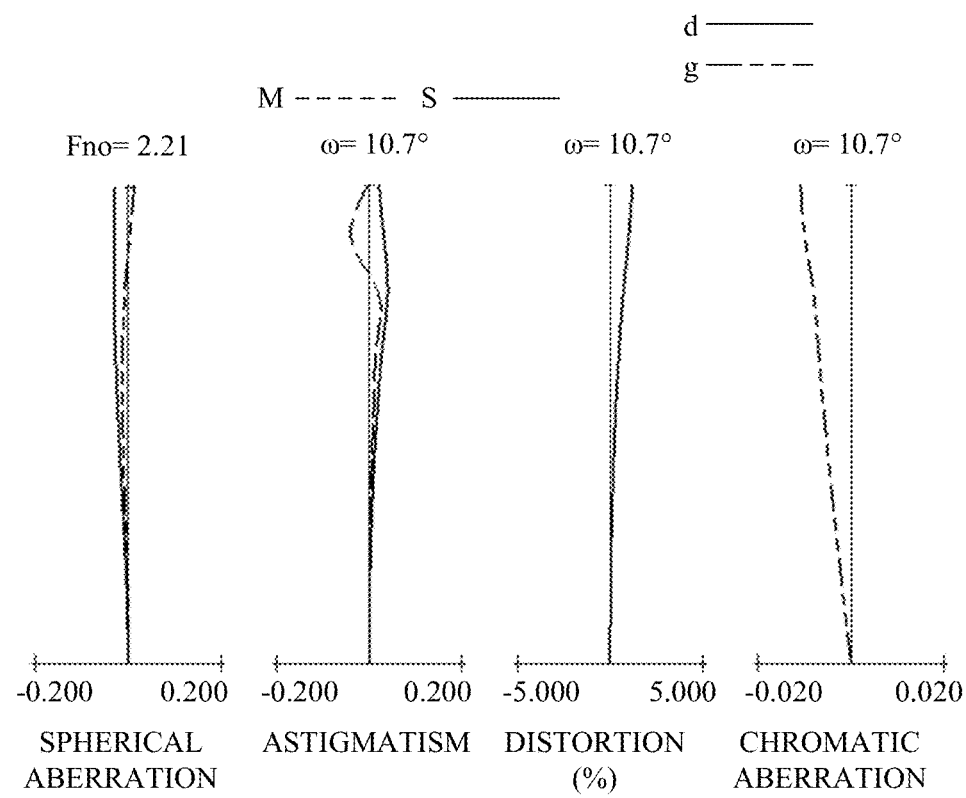
Figure 10C:
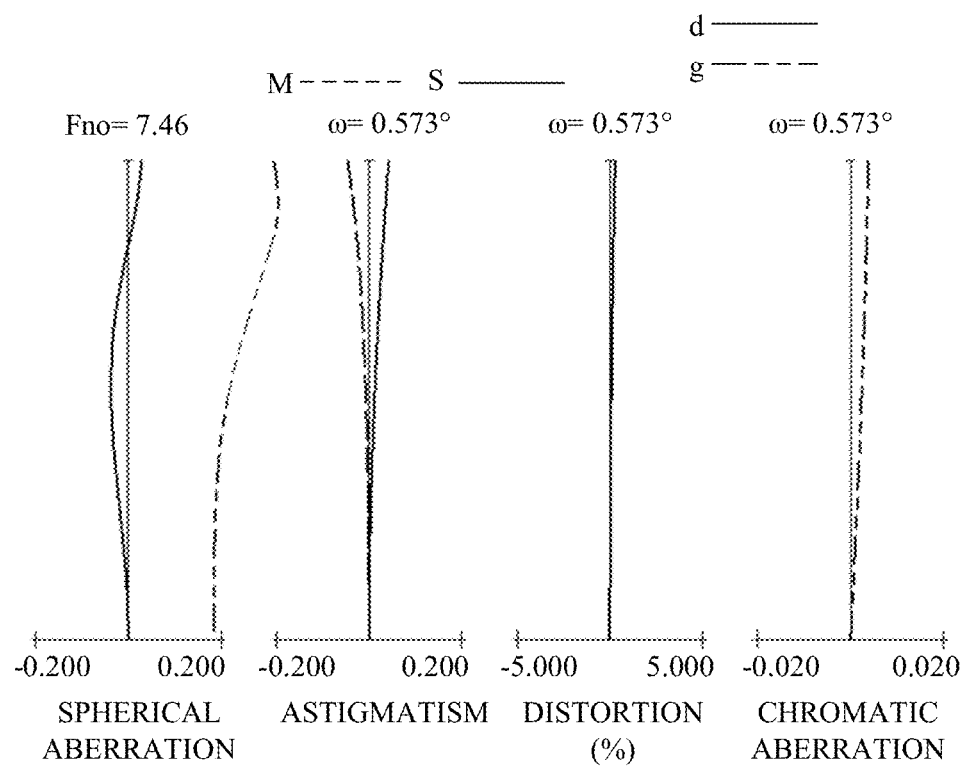

FIGS. 2A to 2C are aberration diagrams at a wide-angle end, a middle zoom position, and a telephoto end according to the first embodiment, respectively. FIGS. 4A to 4C are aberration diagrams at a wide-angle end, a middle zoom position, and a telephoto end according to the second embodiment, respectively. FIGS. 6A to 6C are aberration diagrams at a wide-angle end, a middle zoom position, and a telephoto end according to the third embodiment, respectively. FIGS. 8A to 8C are aberration diagrams at a wide-angle end, a middle zoom position, and a telephoto end according to the fourth embodiment, respectively. FIGS. 10A to 10C are aberration diagrams at a wide-angle end, a middle zoom position, and a telephoto end according to the fifth embodiment, respectively.

In each spherical aberration diagram, Fno represents an F-number. Each spherical aberration diagram indicates amounts of spherical aberration for d-line (wavelength 587.56 nm) and for g-line (wavelength 435.84 nm). In each astigmatism diagram, S represents an amount of astigmatism in a sagittal image plane, and M represents an amount of astigmatism in a meridional image plane. Each distortion diagram indicates an amount of distortion for the d-line. Each chromatic aberration diagram indicates an amount of chromatic aberration for the g-line. $\omega$ represents an image-pickup half-angle of view (degree).

Next, a characteristic configuration will be described of the zoom lens according to each embodiment.

In the zoom lens according to each embodiment, the first lens unit L1 includes one or more positive lenses made of material having an Abbe number of less than 30. The material having the Abbe number of less than 30 has a high partial dispersion ratio $\theta gF$, making it possible to correct well a secondary spectrum on a telephoto side and to suppress an occurrence of on-axis chromatic aberration.

The following conditional expression (1) is satisfied when TL1 represents a distance on the optical axis from a surface of the first lens unit L1 closest to the object side to a surface of the first lens unit L1 closest to the image side, and f1 represents a focal length of the first lens unit L1. The following conditional expression (2) is satisfied when ft represents a focal length of the zoom lens at the telephoto end, and fw represents a focal length of the zoom lens at the wide-angle end.

$$0.05 < TL1/f1 < 0.80 \quad (1)$$

$$40 < ft/fw < 200 \quad (2)$$

The conditional expression (1) defines a ratio of the distance TL1 on the optical axis from the surface of the first lens unit L1 closest to the object side to the surface of the first lens unit L1 closest to the image side to the focal length f1 of the first lens unit L1. When the conditional expression (1) is satisfied, it is possible to decrease a size of an entire system of the zoom lens, and to correct the spherical aberration and coma on the telephoto side. If the value is larger than the upper limit of the conditional expression (1), rays to be imaged at a peripheral image height on the wide-angle side passes through a position far from the optical axis in the first lens unit L1. That is, an outer diameter of the first lens unit L1 increases, and it may be impossible to sufficiently decrease the size of the zoom lens. On the other hand, if the value is smaller than the lower limit of the conditional expression (1), the focal length f1 of the first lens unit L1 becomes longer and a focal length at the telephoto end also becomes longer. Hence, the size may be increased of the entire system of the zoom lens in order to correct aberrations.

The conditional expression (2) defines the magnification ratio of the zoom lens. When the conditional expression (2) is satisfied, a zoom lens can be realized of the high magnification ratio. If the value is smaller than the lower limit of the conditional expression (2), the magnification ratio becomes too small, making it difficult to achieve the high magnification ratio. On the other hand, if the value is larger than the upper limit of the conditional expression (2), the refractive power of each lens unit becomes too strong, and various aberrations may become worse such as the spherical aberration and coma.

By having the above characteristic configurations, the zoom lens according to each embodiment can have the high magnification ratio, the small size, and the good optical performance over the entire zoom range.

The numerical ranges of the conditional expressions (1) and (2) may be numerical ranges of the following conditional expressions (1a) and (2a).

$$0.10 < TL1/f1 < 0.60 \quad (1a)$$

$$45 < ft/fw < 150 \quad (2a)$$

The numerical ranges of the conditional expressions (1) and (2) may be numerical ranges of the following conditional expressions (1b) and (2b).

$$0.15 < TL1/f1 < 0.45 \quad (1b)$$

$$50 < ft/fw < 100 \quad (2b)$$

The zoom lens according to each embodiment may satisfy the following conditional expression (3) when ndA represents a refractive index of material of one or more positive lenses included in the first lens unit L1.

$$1.65 < ndA < 2.30 \quad (3)$$

The conditional expression (3) defines the refractive index ndA of the material of one or more positive lenses included in the first lens unit L1. If the refractive index ndA is larger than the upper limit of the conditional expression (3), no lens material can be selected. On the other hand, if the refractive index ndA is smaller than the lower limit of the conditional expression (3), a curvature increases of one or more positive lenses included in the first lens unit L1, and the spherical aberration may become worse.

The zoom lens according to each embodiment may satisfy the following conditional expression (4) when f2 represents a focal length of the second lens unit L2.

$$-12.0 < f1/f2 < -2.0 \quad (4)$$

The conditional expression (4) defines a ratio of the focal length f1 of the first lens unit L1 to the focal length f2 of the second lens unit L2. If the refractive power of the first lens unit L1 is so strong for the refractive power of the second lens unit L2 that the value is larger than the upper limit of the conditional expression (4), the spherical aberration may become worse at the telephoto end. On the other hand, if the refractive power of the first lens unit L1 is so weak for the refractive power of the second lens unit L2 that the value is smaller than the lower limit of the conditional expression (4), the refractive power of the second lens unit L2 is made stronger in order to ensure the high magnification ratio, and field curvature may become worse at the wide-angle end.

The zoom lens according to each embodiment may satisfy the following conditional expression (5) when M2 represents a moving amount of the second lens unit L2 in zooming from the wide-angle end to the telephoto end. A sign of the moving amount M2 is positive in a case where a position of the second lens unit L2 is closer to the image side at the telephoto end than that at the wide-angle end.

$$-9.0 < M2/f2 < -3.0 \quad (5)$$

The conditional expression (5) defines a ratio of the moving amount M2 of the second lens unit L2 to the focal length f2 of the second lens unit L2 during zooming. If the moving amount M2 is so large for the focal length f2 of the second lens unit L2 that the value is larger than the upper limit of the conditional expression (5), the size may increase of the entire system of the zoom lens. On the other hand, if the moving amount M2 is so small for the focal length f2 of the second lens unit L2 that the value is smaller than the lower limit of the conditional expression (5), it is difficult to achieve the high magnification ratio.

The zoom lens according to each embodiment may satisfy the following conditional expression (6) when f3 represents a focal length of the third lens unit.

$$-1.00 < f2/f3 < -0.10 \quad (6)$$

The conditional expression (6) defines a ratio of the focal length f2 of the second lens unit L2 to the focal length f3 of the third lens unit L3. If the refractive power of the second lens unit L2 is so strong for the refractive power of the third lens unit L3 that the value is larger than the upper limit of the conditional expression (6), the field curvature may be worse at the wide-angle end On the other hand, if the refractive power of the second lens unit L2 is so weak for the refractive power of the third lens unit L3 that the value is smaller than the lower limit of the conditional expression (6), it is difficult to achieve the high magnification ratio.

The zoom lens according to each embodiment may satisfy the following conditional expression (7) when BFw represents a back focus of the zoom lens at the wide-angle end.

$$0.1 < BFw/fw < 6.0 \quad (7)$$

The conditional expression (7) defines a ratio of the back focus BFw to the focal length fw at the wide-angle end of the entire system of the zoom lens. If the back focus BFw is so long that the value is larger than the upper limit of the conditional expression (7), the size may increase of the entire system of the zoom lens. On the other hand, if the back focus BFw is so short that the value is smaller than the lower limit of the conditional expression (7), enough space may not be ensured for including an optical element such as a low pass filter and an infrared cut filter.

The zoom lens according to each embodiment may satisfy the following conditional expression (8) when TL represents a total length of the zoom lens at the telephoto end, that is, a length from the surface closest to the object side to the image plane at the telephoto end.

$$0.2 < TL/ft < 1.0 \tag{8}$$

The conditional expression (8) defines a ratio of the total length TL to the focal length ft at the telephoto end of the entire system of the zoom lens. If the total length TL is so long that the value is larger than the upper limit of the conditional expression (8), the size may increase of the entire system of the zoom lens. On the other hand, if the total length TL is so short that the value is smaller than the lower limit of the conditional expression (8), the refractive power of each lens unit may be excessively increased, and various aberrations such as spherical aberration and coma may be worse.

The zoom lens according to each embodiment may satisfy the following conditional expression (9), when vdA and θgFA respectively represent an Abbe number and a partial dispersion ratio of the material of one or more positive lenses included in the first lens unit L1.

$$0 < \theta gFA + 0.00162 \times vdA - 0.64146 < 0.15 \tag{9}$$

The conditional expression (9) defines a relationship between the Abbe number vdA and the partial dispersion ratio θgFA of the material of one or more positive lenses included in the first lens unit L1. When the Abbe number vdA and the partial dispersion ratio θgA are so small that the value is smaller than the lower limit of the conditional expression (9), the secondary spectrum may not be sufficiently corrected of the on-axis chromatic aberration at the telephoto end, making it difficult to realize both the high magnification ratio and the good optical performance. On the other hand, when the Abbe number vdA and the partial dispersion ratio θgFA is so large that the value is larger than the upper limit of the conditional expression (9), the secondary spectrum may be excessively corrected of the on-axis chromatic aberration at the telephoto end, making it difficult to realize both the high magnification ratio and the good optical performance.

The numerical ranges of the conditional expressions (3) to (9) may be numerical ranges of the following conditional expressions (3a) to (9a).

$$1.70 < ndA < 2.30 \tag{3a}$$

$$-10.0 < f1/f2 < -5.0 \tag{4a}$$

$$-8.0 < M2/f2 < -4.0 \tag{5a}$$

$$-0.80 < f2/f3 < -0.12 \tag{6a}$$

$$0.5 < BFw/fw < 5.0 \tag{7a}$$

$$0.3 < TL/ft < 0.7 \tag{8a}$$

$$0 < \theta gFA + 0.00162 \times vdA - 0.64146 < 0.10 \tag{9a}$$

The numerical ranges of the conditional expressions (3) to (9) may be numerical ranges of the following conditional expressions (3b) to (9b).

$$1.75 < ndA < 2.30 \tag{3b}$$

$$-9.0 < f1/f2 < -8.0 \tag{4b}$$

$$-7.0 < M2/f2 < -5.0 \tag{5b}$$

$$-0.60 < f2/f3 < -0.15 \tag{6b}$$

$$1.0 < BFw/fw < 4.0 \tag{7b}$$

$$0.4 < TL/ft < 0.5 \tag{8b}$$

$$0 < \theta gFA + 0.00162 \times vdA - 0.64146 < 0.05 \tag{9b}$$

The first lens unit L1 may include at least three positive lenses. Thereby, it is possible to loosen a curvature of each positive lens having a strong power in the first lens unit L1 of the positive refractive power, and spherical aberration and coma may be suppressed especially on the telephoto side.

In the following description, the lens configuration will be described of the zoom lens according to each embodiment. Unless otherwise specified, each lens is disposed in order from the object side to the image side.

First Embodiment

A zoom lens of this embodiment includes, in order from an object side to an image side, a first lens unit L1 having a positive refractive power, a second lens unit L2 having a negative refractive power, a third lens unit L3 having a positive refractive power, and a fourth lens unit L4 having a positive refractive power. For zooming, the first lens unit L1 does not move, and the second to fourth lens units L2 to L4 move.

The first lens unit L1 includes a lens in which a negative lens having a meniscus shape with a convex surface on the object side and a positive lens having a biconvex shape are cemented, a positive lens having a meniscus shape with a convex surface on the object side, a positive lens having a meniscus shape with a convex surface on the object side, a negative lens having a meniscus shape with a convex surface on the object side, and a positive lens having a meniscus shape with a convex surface on the object side. By having the cemented lens, the on-axis chromatic aberration can be corrected well, especially at a telephoto end.

The second lens unit L2 includes a negative lens with both surfaces being aspheric having a meniscus shape with a convex surface on the object side, a lens in which a negative lens having a biconcave shape and a positive lens having a meniscus shape with a convex surface on the object side are cemented, and a positive lens having a meniscus shape with a convex surface on the object side. With such a configuration, it is possible to effectively correct the field curvature at a wide-angle end and the lateral chromatic aberration in an entire zoom range.

The third lens unit L3 includes a positive lens with both surfaces being aspheric having a biconvex shape, and a lens in which a positive lens having a biconvex shape and a negative lens having a biconcave shape are cemented. With such a configuration, it is possible to suppress an occurrence of the spherical aberration at the wide-angle end.

The fourth lens unit L4 includes a lens in which a negative lens having a meniscus shape with a convex surface on the object side and a positive lens having a biconvex shape with an aspherical shape on the image side are cemented. By consisting of one cemented lens, the fourth lens unit L4 can suppress lateral chromatic aberration variation during focusing while reducing a weight, making it easier to perform control during focusing.

Second Embodiment

A zoom lens of this embodiment includes, in order from an object side to an image side, a first lens unit L1 having a positive refractive power, a second lens unit L2 having a negative refractive power, a third lens unit L3 having a positive refractive power, and a fourth lens unit L4 having a positive refractive power. For zooming, the first and third lens units L1 and L3 do not move, and the second and fourth lens units L2 and L4 move.

The first lens unit L1 has the same configuration as that of the first lens unit L1 of the first embodiment.

The second lens unit L2 includes a negative lens with both surfaces being aspheric having a meniscus shape with a convex surface on the object side, a lens in which a positive lens having a meniscus shape with a concave surface on the object side and a negative lens having a biconcave shape are cemented, and a positive lens with both surfaces being aspheric having a meniscus shape with a convex surface on the object side. With such a configuration, it is possible to effectively correct the field curvature at a wide-angle end and the lateral chromatic aberration in an entire zoom range.

The third lens unit L3 includes a positive lens with both surfaces being aspheric having a biconvex shape, and a negative lens having a meniscus shape with a convex surface on the object side. With such a configuration, it is possible to suppress an occurrence of the spherical aberration at the wide-angle end.

The fourth lens unit L4 has the same configuration as that of the fourth lens unit L4 of the first embodiment.

Third Embodiment

A zoom lens of this embodiment includes, in order from an object side to an image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. For zooming, the first and fifth lens units L1 and L5 do not move, and the second to fourth lens units L2 to L4 move.

The first lens unit L1 includes a lens in which a negative lens having a meniscus shape with a convex surface on the object side and a positive lens having a meniscus shape with a convex surface on the object side are cemented, a positive lens having a meniscus shape with a convex surface on the object side, a positive lens having a biconvex shape, and a positive lens having a meniscus shape with a convex surface on the object side. By having a cemented lens, on-axis chromatic aberration can be satisfactorily corrected, especially at a telephoto end.

The second lens unit L2 includes a negative lens with both surfaces being aspheric having a biconcave shape, a negative lens having a meniscus shape with a convex surface on the object side, a negative lens having a biconcave shape, and a positive lens having a meniscus shape with a convex surface on the object side. With such a configuration, it is possible to effectively correct field curvature at a wide-angle end.

The third lens unit L3 includes a positive lens with both surfaces being aspheric having a biconvex shape, a positive lens having a meniscus shape with a concave surface on the object side, a negative lens having a meniscus shape with a convex surface on the object side, and a positive lens having a biconvex shape. With such a configuration, it is possible to suppress an occurrence of the spherical aberration at the wide-angle end.

The fourth lens unit L4 includes a negative lens having a biconcave shape. With such a configuration having a single lens, it is possible to reduce a weight, making it easier to perform control during focusing.

The fifth lens unit L5 includes a positive lens with both surfaces being aspheric having a biconvex shape. Telecentricity improves and an off-axis light beam enters an image pickup element at an angle near vertical, because a lens unit having a positive refractive power is disposed on the image side of a unit that performs focusing. Thereby, light falloff caused by shading can be suppressed in a peripheral area of a screen.

Fourth Embodiment

A zoom lens of this embodiment includes, in order from an object side to an image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. For zooming, the first lens unit L1 does not move, and the second to fifth lens units L2 to L5 move.

The first lens unit L1 includes a lens in which a negative lens having a meniscus shape with a convex surface on the object side and a positive lens having a biconvex shape are cemented, a positive lens having a meniscus shape with a convex surface on the object side, a positive lens having a meniscus shape with a convex surface on the object side, and a positive lens having a meniscus shape with a convex surface on the object side. By having a cemented lens, the on-axis chromatic aberration can be corrected well, especially at a telephoto end.

The second lens unit L2 has the same configuration as that of the second lens unit L2 of the third embodiment.

The third lens unit L3 includes a positive lens having a meniscus shape with a convex surface on the object side, a positive lens with both surfaces being aspheric having a biconvex shape, a negative lens having a meniscus shape with a convex surface on the object side, and a positive lens having a biconvex shape. With such a configuration, it is possible to suppress an occurrence of spherical aberration at a wide-angle end.

The fourth lens unit L4 has the same configuration as that of the fourth lens unit L4 of the fourth embodiment.

The fifth lens unit L5 includes a positive lens with both surfaces being aspheric having a meniscus shape with a concave surface on the object side. Telecentricity improves and an off-axis light beam enters an image pickup element at an angle near vertical, because a lens unit having a positive refractive power is disposed on the image side of a unit that performs focusing. Thereby, it is possible to suppress light falloff caused by shading in a peripheral area of a screen.

Fifth Embodiment

The zoom lens of this embodiment includes, in order from an object side to an image side, a first lens unit L1 having a positive refractive power, a second lens unit L2 having a negative refractive power, a third lens unit L3 having a positive refractive power, and a fourth lens unit L4 having a positive refractive power. For zooming, the first lens unit L1 does not move, and the second to fourth lens units L2 to L4 move.

The first lens unit L1 has the same configuration as that of the first lens unit L1 of the first embodiment.

The second lens unit L2 has the same configuration as that of the second lens unit L2 of the first embodiment.

The third lens unit L3 includes a positive lens with both surfaces being aspheric having a biconvex shape, a lens in which a positive lens having a biconvex shape and a negative lens having a biconcave shape are cemented, and a positive lens having a meniscus shape with a convex surface on the object side. With such a configuration, it is possible to suppress an occurrence of the spherical aberration at a wide-angle end.

The fourth lens unit L4 includes a lens in which a positive lens having a biconvex shape with an aspherical shape on the object side and a negative lens having a meniscus shape with a concave surface on the object side. By consisting of one cemented lens, the fourth lens unit L4 can suppress lateral chromatic aberration variation during focusing while reducing a weight, making it easier to perform control during focusing.

The lens configuration of the zoom lens according to each embodiment has been described above. However, the present invention is not limited to the above description. For example, further aberration correction may be performed by dividing the cemented lens and providing an air distance between the lenses, or by replacing a spherical lens with an aspherical lens.

Numerical examples 1 to 5 will be given which correspond to the first to fifth embodiments, respectively.

In surface data of each numerical example, r represents a curvature radius of each optical surface, and d (mm) represents an on-axis distance (distance on an optical axis) between an m-th surface and an (m+1)-th surface. m indicates the number of the surface counted from a light entering side. nd, vd, and θgF represent a refractive index, an Abbe number, and a partial dispersion ratio of material of each optical member for the d-line, respectively. The following expressions expresses the Abbe number νd and the partial dispersion ratio θgF of certain material when Nd, NF, NC and Ng represent refractive indexes for the d-line (587.6 nm), F-line (486.1 nm), C-line (656.3 nm), and g-line (435.8 nm) of Fraunhofer lines, respectively.

$$\nu d=(Nd-1)/(NF-NC)$$

$$\theta gF=(Ng-NF)/(NF-NC)$$

In each numerical example, d, focal length (mm), F-number, and half-angle of view (degree) are values when the zoom lens according to each embodiment focuses on an object at infinity. "Back focus" is a distance on the optical axis from a lens last surface (lens surface closest to the image side) to a paraxial image plane, and is expressed by an air-converted length. "Lens total length" is a length obtained by adding the back focus to the distance on the optical axis from a front surface (lens surface closest to the object side) of the zoom lens to the last surface. "Lens unit" is not limited to consist of a plurality of lenses, and may consist of a single lens.

When an optical surface is aspherical, a * sign is added to a right of side a surface number. An aspherical shape is expressed by the following expression when X represents a shift amount from a surface vertex in the optical axis direction, h represents a height from the optical axis in a direction orthogonal to the optical axis, R represents a paraxial curvature radius, k represents a conic constant, and each of A4, A6, A8, and A10 represents an aspherical coefficient of each order.

$$x=(h^2/R)/[1+\{1-(1+k)(h/R)^2\}^{1/2}+A4 \times h^4+A6 \times h^6+A8 \times h^8+A10 \times h^{10}$$

"e±XX" in each aspherical coefficient represents "×10±$^{XX}$".

[NUMERICAL EXAMPLE 1]
Unit mm
Surface data

| Surface Number | r | d | nd | vd | θgF |
|---|---|---|---|---|---|
| 1 | 79.429 | 1.50 | 1.90366 | 31.3 | |
| 2 | 45.691 | 8.14 | 1.43700 | 95.1 | |
| 3 | −1618.186 | 0.10 | | | |
| 4 | 43.541 | 1.19 | 1.92286 | 18.9 | 0.6495 |
| 5 | 49.258 | 0.10 | | | |
| 6 | 45.695 | 5.64 | 1.43700 | 95.1 | |
| 7 | 279.662 | 0.10 | | | |
| 8 | 34.212 | 0.87 | 1.90525 | 35.0 | |
| 9 | 27.975 | 0.43 | | | |
| 10 | 29.215 | 4.73 | 1.43700 | 95.1 | |
| 11 | 72.826 | (variable) | | | |
| 12* | 179.434 | 1.00 | 1.80610 | 40.7 | |
| 13* | 8.363 | 3.58 | | | |
| 14 | −78.646 | 0.90 | 1.88300 | 40.8 | |
| 15 | 7.613 | 3.02 | 1.75520 | 27.5 | |
| 16 | 16.640 | 0.83 | | | |
| 17 | 14.238 | 2.19 | 1.92286 | 18.9 | |
| 18 | 39.716 | (variable) | | | |
| 19 (diaphragm) | ∞ | (variable) | | | |
| 20* | 26.481 | 2.59 | 1.62263 | 58.2 | |
| 21* | −48.231 | 1.00 | | | |
| 22 | 42.959 | 3.01 | 1.49700 | 81.5 | |
| 23 | −27.735 | 0.73 | 1.60342 | 38.0 | |
| 24 | 28.033 | (variable) | | | |
| 25 | 20.580 | 0.64 | 1.75520 | 27.5 | |
| 26 | 14.632 | 3.97 | 1.49710 | 81.6 | |
| 27* | −26.530 | (variable) | | | |

-continued

| | | | | |
|---|---|---|---|---|
| 28 | ∞ | 1.05 | 1.51633 | 64.1 |
| 29 | ∞ | 3.00 | | |
| image plane | ∞ | | | |

ASPHERICAL SURFACE DATA

Twelfth surface
K = 0.00000e+000 A 4 = 6.56026e−005 A 6 = −4.98604e−007 A 8 = 1.54458e−009
Thirteenth surface
K = 0.00000e+000 A 4 = 4.50341e−005 A 6 = 6.29704e−007 A 8 = −1.73406e−008
Twentieth surface
K = 0.00000e+000 A 4 = −1.70613e−005 A 6 = 5.10769e−007 A 8 = −7.57782e−009
Twenty-first surface
K = 0.00000e+000 A 4 = 2.62637e−006 A 6 = 5.28221e−007 A 8 = −7.98943e−009
Twenty-seventh
K = 0.00000e+000 A 4 = 3.25757e−005 A 6 = 8.86700e−008 A 8 = −1.22851e−009

VARIOUS DATA
Zoom ratio 61.95

| | Wide angle | Middle | Telephoto |
|---|---|---|---|
| Focal length | 4.84 | 16.80 | 300.09 |
| F-number | 1.89 | 2.52 | 7.45 |
| Half angle of view | 32.90 | 10.70 | 0.65 |
| Image height | 3.20 | 3.20 | 3.20 |
| Lens total length | 129.67 | 129.67 | 129.67 |
| BF | 18.45 | 26.35 | 4.68 |
| d11 | 1.00 | 22.31 | 43.62 |
| d18 | 43.62 | 22.31 | 1.00 |
| d19 | 5.21 | 0.26 | 0.20 |
| d24 | 15.11 | 12.15 | 33.89 |
| d27 | 14.77 | 22.67 | 1.00 |

ZOOM LENS UNIT DATA

| Unit | Starting surface | Focal length |
|---|---|---|
| 1 | 1 | 64.07 |
| 2 | 12 | −7.63 |
| 3 | 20 | 38.51 |
| 4 | 25 | 27.16 |

[NUMERICAL EXAMPLE 2]
Unit mm
Surface data

| Surface Number | r | d | nd | νd | θgF |
|---|---|---|---|---|---|
| 1 | 78.750 | 1.50 | 1.90366 | 31.3 | |
| 2 | 45.822 | 9.34 | 1.43700 | 95.1 | |
| 3 | 953.407 | 0.10 | | | |
| 4 | 45.526 | 1.53 | 1.92286 | 18.9 | 0.6495 |
| 5 | 53.930 | 0.10 | | | |
| 6 | 38.875 | 6.65 | 1.43700 | 95.1 | |
| 7 | 171.996 | 0.10 | | | |
| 8 | 33.973 | 0.87 | 1.90525 | 35.0 | |
| 9 | 25.801 | 0.61 | | | |
| 10 | 27.180 | 5.25 | 1.43700 | 95.1 | |
| 11 | 63.835 | (variable) | | | |
| 12* | 73.103 | 1.10 | 1.80610 | 40.7 | |
| 13* | 9.051 | 4.24 | | | |
| 14 | −17.010 | 3.90 | 1.51742 | 52.4 | |
| 15 | −6.494 | 0.74 | 1.59522 | 67.7 | |
| 16 | 13.249 | 0.23 | | | |
| 17* | 12.773 | 2.17 | 1.82115 | 24.1 | |
| 18* | 54.100 | (variable) | | | |
| 19 (diaphragm) | ∞ | 0.20 | | | |
| 20* | 18.226 | 3.89 | 1.55332 | 71.7 | |
| 21* | −24.974 | 2.13 | | | |
| 22 | 300.000 | 0.73 | 1.91082 | 35.3 | |
| 23 | 24.639 | (variable) | | | |
| 24 | 17.904 | 0.64 | 1.85478 | 24.8 | |
| 25 | 13.658 | 4.16 | 1.49710 | 81.6 | |
| 26* | −26.132 | (variable) | | | |

-continued

| | | | | |
|---|---|---|---|---|
| 27 | ∞ | 1.05 | 1.51633 | 64.1 |
| 28 | ∞ | 3.00 | | |
| image plane | ∞ | | | |

ASPHERICAL SURFACE DATA

Twelfth surface
K = 0.00000e+000 A 4 = 2.82571e−004 A 6 = −3.82388e−006
A 8 = 2.20669e−008
Thirteenth surface
K = 0.00000e+000 A 4 = 3.03169e−004 A 6 = 1.20216e−006
A 8 = −7.09981e−008
Seventeenth surface
K = 0.00000e+000 A 4 = −1.00740e−004 A 6 = 8.32767e−007
A 8 = −1.52263e−007
Eighteenth surface
K = 0.00000e+000 A 4 = −7.27962e−005 A 6 = 4.87197e−007
A 8 = −1.36678e−007
Twentieth surface
K = 0.00000e+000 A 4 = −2.92972e−005 A 6 = −1.64702e−007
A 8 = 4.31682e−009
Twenty-first surface
K = 0.00000e+000 A 4 = 3.84259e−005 A 6 = −1.75268e−007
A 8 = 4.04494e−009

-continued

Twenty-sixth surface
K = 0.00000e+000 A 4 = 3.11323e-005 A 6 = 1.76505e-007
A 8 = -2.20234e-009

VARIOUS DATA
Zoom ratio 52.86

|  | Wide angle | Middle | Telephoto |
|---|---|---|---|
| Focal length | 6.19 | 18.32 | 327.07 |
| F-number | 1.85 | 3.50 | 7.31 |
| Half angle of view | 26.80 | 9.79 | 0.61 |
| Image height | 3.20 | 3.20 | 3.20 |
| Lens total length | 134.74 | 134.74 | 134.74 |
| BF | 20.15 | 26.95 | 4.67 |
| d11 | 1.00 | 21.00 | 41.00 |
| d18 | 41.00 | 21.00 | 1.00 |
| d23 | 22.43 | 15.62 | 37.91 |
| d26 | 16.47 | 23.28 | 1.00 |

ZOOM LENS UNIT DATA

| Unit | Starting surface | Focal length |
|---|---|---|
| 1 | 1 | 64.78 |
| 2 | 12 | -7.72 |
| 3 | 19 | 41.83 |
| 4 | 24 | 25.30 |

[NUMERICAL EXAMPLE 3]
Unit mm
Surface data

| Surface Number | r | d | nd | vd | θgF |
|---|---|---|---|---|---|
| 1 | 149.942 | 1.50 | 2.00330 | 28.3 |  |
| 2 | 66.975 | 8.51 | 1.43700 | 95.1 |  |
| 3 | 1167.318 | 0.10 |  |  |  |
| 4 | 79.643 | 2.11 | 1.92286 | 18.9 | 0.6495 |
| 5 | 100.254 | 0.17 |  |  |  |
| 6 | 83.623 | 6.32 | 1.43700 | 95.1 |  |
| 7 | -2236.673 | 0.10 |  |  |  |
| 8 | 61.953 | 4.30 | 1.43700 | 95.1 |  |
| 9 | 194.321 | (variable) |  |  |  |
| 10* | -37.584 | 1.00 | 1.85135 | 40.1 |  |
| 11* | 102.507 | 0.48 |  |  |  |
| 12 | 28.047 | 1.00 | 1.85150 | 40.8 |  |
| 13 | 14.827 | 4.18 |  |  |  |
| 14 | -50.916 | 1.00 | 1.85150 | 40.8 |  |
| 15 | 14.999 | 0.70 |  |  |  |
| 16 | 17.787 | 3.23 | 1.95906 | 17.5 |  |
| 17 | 121.436 | (variable) |  |  |  |
| 18 (diaphragm) | ∞ | (variable) |  |  |  |
| 19* | 17.929 | 5.75 | 1.58313 | 59.4 |  |
| 20* | -23.164 | 1.00 |  |  |  |
| 21 | -72.907 | 3.03 | 1.49700 | 81.5 |  |
| 22 | -17.116 | 1.79 |  |  |  |
| 23 | 67.410 | 1.00 | 1.91650 | 31.6 |  |
| 24 | 9.058 | 4.15 |  |  |  |
| 25 | 17.769 | 3.85 | 1.49700 | 81.5 |  |
| 26 | -11.081 | (variable) |  |  |  |
| 27 | -61.520 | 0.73 | 1.88300 | 40.8 |  |
| 28 | 9.529 | (variable) |  |  |  |
| 29* | 156.124 | 2.93 | 1.68893 | 31.2 |  |
| 30* | -11.167 | 2.00 |  |  |  |
| 31 | ∞ | 1.05 | 1.51633 | 64.1 |  |
| 32 | ∞ | 3.00 |  |  |  |
| image plane | ∞ |  |  |  |  |

ASPHERICAL SURFACE DATA

Tenth surface
K = 0.00000e+000 A 4 = 1.54002e-004 A 6 = -3.90451e-007
A 8 = 5.05800e-010

Eleventh surface
K = 0.00000e+000 A 4 = 1.24854e-004 A 6 = 1.71524e-007
A 8 = 1.23159e-010
Nineteenth surface
K = 0.00000e+000 A 4 = -5.94637e-005 A 6 = 5.41774e-007
A 8 = -1.54659e-009
Twentieth surface
K = 0.00000e+000 A 4 = 1.41870e-004 A 6 = 3.96335e-007
A 8 = 5.82912e-010
Twenty-ninth surface
K = 0.00000e+000 A 4 = -3.19162e-004 A 6 = -1.58383e-005
A 8 = 1.81140e-007
Thirtieth surface
K = 0.00000e+000 A 4 = -2.06194e-004 A 6 = -9.85910e-006
A 8 = 1.31021e-007

VARIOUS DATA
Zoom ratio 89.96

|  | Wide angle | Middle | Telephoto |
|---|---|---|---|
| Focal length | 4.30 | 16.71 | 387.01 |
| F-number | 1.89 | 2.58 | 7.78 |
| Half angle of view | 37.20 | 10.70 | 0.48 |
| Image height | 3.20 | 3.20 | 3.20 |
| Lens total length | 159.65 | 159.65 | 159.65 |
| BF | 5.69 | 5.69 | 5.69 |
| d9 | 1.00 | 37.97 | 74.95 |
| d17 | 75.95 | 38.97 | 2.00 |
| d18 | 9.87 | 4.34 | 1.00 |
| d26 | 5.18 | 7.37 | 1.00 |
| d28 | 3.04 | 6.38 | 16.09 |

ZOOM LENS UNIT DATA

| Unit | Starting surface | Focal length |
|---|---|---|
| 1 | 1 | 95.00 |
| 2 | 10 | -11.07 |
| 3 | 19 | 19.25 |
| 4 | 27 | -9.30 |
| 5 | 29 | 15.24 |

[NUMERICAL EXAMPLE 4]
Unit mm
Surface data

| Surface Number | r | d | nd | vd | θgF |
|---|---|---|---|---|---|
| 1 | 174.713 | 1.50 | 2.00330 | 28.3 |  |
| 2 | 79.197 | 4.94 | 1.43700 | 95.1 |  |
| 3 | -1382.968 | 0.09 |  |  |  |
| 4 | 93.015 | 1.43 | 1.92286 | 18.9 | 0.6495 |
| 5 | 112.357 | 0.09 |  |  |  |
| 6 | 77.934 | 3.93 | 1.43700 | 95.1 |  |
| 7 | 584.483 | 0.10 |  |  |  |
| 8 | 61.275 | 3.08 | 1.43700 | 95.1 |  |
| 9 | 186.722 | (variable) |  |  |  |
| 10* | -68.768 | 1.00 | 1.85135 | 40.1 |  |
| 11* | 31.116 | 1.16 |  |  |  |
| 12 | 64.403 | 1.00 | 1.85150 | 40.8 |  |
| 13 | 28.147 | 2.00 |  |  |  |
| 14 | -58.303 | 1.00 | 1.85150 | 40.8 |  |
| 15 | 16.468 | 0.61 |  |  |  |
| 16 | 20.156 | 2.78 | 1.95906 | 17.5 |  |
| 17 | 229.322 | (variable) |  |  |  |
| 18 (diaphragm) | ∞ | (variable) |  |  |  |
| 19 | 18.404 | 4.18 | 1.49700 | 81.5 |  |
| 20 | 324.723 | 1.00 |  |  |  |
| 21* | 28.604 | 5.74 | 1.58313 | 59.4 |  |
| 22* | -18.896 | 3.18 |  |  |  |
| 23 | 294.243 | 1.00 | 1.91650 | 31.6 |  |
| 24 | 9.817 | 4.42 |  |  |  |
| 25 | 21.399 | 3.76 | 1.49700 | 81.5 |  |
| 26 | -11.081 | (variable) |  |  |  |
| 27 | -41.265 | 0.73 | 1.53775 | 74.7 |  |

-continued

| | | | | |
|---|---|---|---|---|
| 28 | 8.374 | (variable) | | |
| 29* | −24.470 | 3.98 | 1.53775 | 74.7 |
| 30* | −6.991 | (variable) | | |
| 31 | ∞ | 1.05 | 1.51633 | 64.1 |
| 32 | ∞ | 3.00 | | |
| image plane | ∞ | | | |

ASPHERICAL SURFACE DATA

Tenth surface
K = 0.00000e+000 A 4 = −1.07043e−005 A 6 = 8.80411e−007
A 8 = −2.61715e−009
Eleventh surface
K = 0.00000e+000 A 4 = −3.14097e−005 A 6 = 8.09470e−007
A 8 = 3.16569e−009
Twenty-first surface
K = 0.00000e+000 A 4 = −9.42695e−005 A 6 = −2.91900e−007
A 8 = 4.27115e−009
Twenty-second surface
K = 0.00000e+000 A 4 = 6.66596e−005 A 6 = −2.38366e−007
A 8 = 4.06955e−009
Twenty-ninth surface
K = 0.00000e+000 A 4 = −2.65369e−004 A 6 = −3.26146e−005
A 8 = 5.18310e−007
Thirtieth surface
K = 0.00000e+000 A 4 = 2.73646e−004 A 6 = −1.38443e−005
A 8 = 2.84195e−007

VARIOUS DATA
Zoom ratio 74.87

| | Wide angle | Middle | Telephoto |
|---|---|---|---|
| Focal length | 5.08 | 19.98 | 380.15 |
| F-number | 1.89 | 2.74 | 9.61 |
| Half angle of view | 32.80 | 9.01 | 0.49 |
| Image height | 3.20 | 3.20 | 3.20 |
| Lens total length | 159.71 | 159.71 | 159.71 |
| BF | 8.83 | 7.25 | 5.66 |
| d 9 | 1.00 | 39.18 | 77.36 |
| d17 | 78.35 | 40.18 | 2.00 |
| d18 | 10.00 | 3.93 | 1.00 |
| d26 | 2.83 | 6.39 | 1.00 |
| d28 | 6.00 | 10.09 | 20.00 |
| d30 | 5.17 | 3.58 | 2.00 |

ZOOM LENS UNIT DATA

| Unit | Starting surface | Focal length |
|---|---|---|
| 1 | 1 | 97.23 |
| 2 | 10 | −12.12 |
| 3 | 19 | 21.92 |
| 4 | 27 | −12.88 |
| 5 | 29 | 16.86 |

[NUMERICAL EXAMPLE 5]
Unit mm
Surface data

| Surface Number | r | d | nd | vd | θgF |
|---|---|---|---|---|---|
| 1 | 80.553 | 1.50 | 1.90366 | 31.3 | |
| 2 | 47.184 | 8.30 | 1.43700 | 95.1 | |
| 3 | −687.049 | 0.09 | | | |
| 4 | 44.467 | 1.09 | 1.92286 | 18.9 | 0.6495 |
| 5 | 49.723 | 0.10 | | | |
| 6 | 46.082 | 5.50 | 1.43700 | 95.1 | |
| 7 | 264.543 | 0.10 | | | |
| 8 | 33.744 | 0.87 | 1.90525 | 35.0 | |
| 9 | 27.679 | 0.27 | | | |
| 10 | 28.238 | 5.16 | 1.43700 | 95.1 | |
| 11 | 71.347 | (variable) | | | |
| 12* | −2765.293 | 1.00 | 1.80610 | 40.7 | |
| 13* | 7.715 | 3.55 | | | |
| 14 | −59.264 | 0.90 | 1.88300 | 40.8 | |
| 15 | 7.167 | 3.24 | 1.75520 | 27.5 | |
| 16 | 20.558 | 0.22 | | | |
| 17 | 13.395 | 2.09 | 1.92286 | 18.9 | |
| 18 | 33.417 | (variable) | | | |
| 19 (diaphragm) | ∞ | (variable) | | | |
| 20* | 23.116 | 3.03 | 1.62263 | 58.2 | |
| 21* | −38.589 | 1.00 | | | |
| 22 | 123.101 | 2.49 | 1.49700 | 81.5 | |
| 23 | −34.772 | 0.73 | 1.60342 | 38.0 | |
| 24 | 16.878 | 1.00 | | | |
| 25 | 18.590 | 2.37 | 1.49700 | 81.5 | |
| 26 | 58.341 | (variable) | | | |
| 27* | 28.145 | 3.52 | 1.49710 | 81.6 | |
| 28 | −18.009 | 0.64 | 1.75520 | 27.5 | |
| 29 | −23.611 | (variable) | | | |
| 30 | ∞ | 1.05 | 1.51633 | 64.1 | |
| 31 | ∞ | 3.00 | | | |
| image plane | ∞ | | | | |

ASPHERICAL SURFACE DATA

Twelfth surface
K = 0.00000e+000 A 4 = 1.11272e−004 A 6 = −1.09556e−006
A 8 = 4.44334e−009
Thirteenth surface
K = 0.00000e+000 A 4 = 8.16309e−005 A 6 = 1.31021e−006
A 8 = −4.59528e−008
Twentieth surface
K = 0.00000e+000 A 4 = −2.62899e−005 A 6 = 5.31511e−007
A 8 = −8.36829e−009
Twenty-first surface
K = 0.00000e+000 A 4 = −1.39389e−007 A 6 = −1.39354e−007
A 8 = 1.26222e−009
Twenty-seventh surface
K = 0.00000e+000 A 4 = −2.84868e−005 A 6 = 5.06786e−007
A 8 = −8.09254e−009

VARIOUS DATA
Zoom ratio 67.32

| | Wide angle | Middle | Telephoto |
|---|---|---|---|
| Focal length | 4.73 | 16.65 | 318.66 |
| F-number | 1.89 | 2.52 | 7.46 |
| Half angle of view | 33.40 | 10.70 | 0.57 |
| Image height | 3.20 | 3.20 | 3.20 |
| Lens total length | 130.10 | 130.10 | 130.10 |
| BF | 17.45 | 26.87 | 4.69 |
| d11 | 0.97 | 21.53 | 42.09 |
| d18 | 42.11 | 21.55 | 0.99 |
| d19 | 5.93 | 0.20 | 0.20 |
| d26 | 14.88 | 11.19 | 33.37 |
| d29 | 13.75 | 23.18 | 1.00 |

ZOOM LENS UNIT DATA

| Unit | Starting surface | Focal length |
|---|---|---|
| 1 | 16 | 1.98 |
| 2 | 12 | −6.95 |
| 3 | 20 | 34.05 |
| 4 | 27 | 28.95 |

Various values in each numerical example are indicated in Table 1 below.

TABLE 1

| EXPRESSION | NUMERICAL EXAMPLE | | | | |
|---|---|---|---|---|---|
| | 1 | 2 | 3 | 4 | 5 |
| (1) | 0.36 | 0.4 | 0.24 | 0.16 | 0.37 |
| (2) | 62.0 | 52.8 | 90.0 | 74.8 | 67.4 |
| (3) | 1.92286 | 1.92286 | 1.92286 | 1.92286 | 1.92286 |
| (4) | −8.40 | −8.39 | −8.58 | −8.02 | −8.92 |
| (5) | −5.59 | −5.18 | −6.68 | −6.30 | −5.92 |
| (6) | −0.20 | −0.18 | −0.58 | −0.55 | −0.20 |
| (7) | 3.81 | 3.26 | 1.32 | 1.74 | 3.69 |
| (8) | 0.43 | 0.41 | 0.41 | 0.42 | 0.41 |
| (9) | 0.0387 | 0.0387 | 0.0387 | 0.0387 | 0.0387 |

According to the above embodiments, it is possible to provide, for example, a zoom lens beneficial in a high magnification ratio, a small size, and high optical performance over an entire zoom range.

Next, a zoom lens will be described according to each of sixth to eleventh embodiments.

The zoom lens according to each of the sixth to eleventh embodiments includes, in order from an object side to an image side, a first lens unit L1 having a positive refractive power, a second lens unit L2 having a negative refractive power, a third lens unit L3 having a positive refractive power, and a rear lens unit including a fourth lens unit L4 and a fifth lens unit L5. For zooming from a wide-angle end to a telephoto end, three or more lens units move and an interval between each pair of adjacent lens units. When, in positive lenses of the first lens unit L1, a positive lens having a smallest Abbe number for d-line is named as G1vdmin, the first lens unit L1 includes at least single negative lenses G1n1 and G1n2 on the object side and on the image side of the positive lens G1vdmin, respectively.

f1 represents a focal length of the first lens unit L1, and f1vdmin represents a focal length of the positive lens G1vdmin. f1p1 represents a focal length of a positive lens having a longest focal length in positive lenses included in the first lens unit L1, and f1p2 represents a focal length of a positive lens having a second longest focal length in the positive lenses included in the first lens unit L1. The following conditional expressions (10) and (11) are satisfied.

$$4.00 < f1vdmin/f1 < 10.00 \quad (10)$$

$$2.80 < f1p1/f1p2 < 10.00 \quad (11)$$

In the positive lenses of the first lens unit L1, the positive lens having the longest focal length may be the positive lens G1vdmin. With such a configuration, according to each embodiment, it is possible to provide a high-performance zoom lens over an entire zoom range while having a small size and a high magnification ratio. In other words, when a configuration is used that includes a lens unit having positive, negative, and positive powers (refractive powers) in order from the object side to the image side, and that changes an interval between each pair of adjacent lens units in zooming, it is possible to reduce the total length of the lens and to improve performance, while a high magnification ratio is ensured. By moving three or more lens units during zooming, the moving amount of each lens unit and the power of each lens unit can be reduced. Thereby, it is possible to reduce a size of an entire system of the zoom lens and to suppress aberration variation during zooming.

When the positive lens G1vdmin with high dispersion is included in the first lens unit L1, on-axis chromatic aberration can be corrected well on a telephoto side. When the positive lens G1vdmin is disposed on a position closer to an object side in the first lens unit, a marginal ray of an on-axis light beam passes through a higher position of the positive lens G1vdmin on the telephoto side, and a correction effect improves for the on-axis chromatic aberration. Thus, when the first lens unit includes a plurality of positive lenses G1vdmin having the smallest Abbe number vd for the d-line, it is assumed that the positive lens G1vdmin is a positive lens which is disposed on an most object side in the first lens unit and which satisfies each of the above conditional expressions.

When the negative lens G1n2 is disposed on the image side of the positive lens G1vdmin, it is possible to correct the lateral chromatic aberration variation on the wide-angle side by using G1vdmin. When a negative lens is disposed on a position closer to the image side, the marginal ray of the on-axis light beam passes through lower position the negative lens, and the on-axis chromatic aberration variation can be suppressed on the telephoto side. When the negative lens G1n1 is disposed on the object side of the positive lens G1vdmin, it is possible to correct well the on-axis chromatic aberration and spherical aberration on the telephoto side.

When the conditional expressions (10) and (11) are satisfied, it is possible to realize the zoom lens having the high-performance over the entire zoom range while having the small size and the high magnification ratio. The conditional expression (10) defines a ratio of the focal length f1vdmin of the positive lens G1vdmin to the focal length f1 of the first lens unit L1. When the conditional expression (10) is satisfied, it is possible to reduce the size of the first lens unit L1 and to correct the spherical aberration and the on-axis chromatic aberration on the telephoto side, and thus it is possible to acquire the small size and the good optical performance. If the value is larger than the upper limit of the conditional expression (10), the power of the first lens unit L1 becomes so strong that it may be impossible to suppress the spherical aberration and the on-axis chromatic aberration on the telephoto side. Further, a correction effect of the positive lens G1vdmin may decrease for the spherical aberration and the on-axis chromatic aberration on the telephoto side because the power of the positive lens G1vdmin is too weak. On the other hand, if the value is smaller than the lower limit of the conditional expression (10), the power of the first lens unit L1 is so weak that the size may increase of the entire system of the zoom lens in order to correct the aberration. Further, a thickness increases of the positive lens G1vdmin on the optical axis, and the total length of the first lens unit L1 may become too long because the power of the positive lens G1vdmin is too strong.

The conditional expression (11) defines a ratio of the focal length f1p1 of the positive lens having a weakest power in the first lens unit L1 to the focal length f1p2 of the positive lens having a second weakest power in the first lens unit L1. When the first lens unit L1 has only one positive lens, it is assumed to be f1p2=f1p1. By satisfying conditional expression (11), a small size and good optical performance are realized. If the value is larger than the upper limit of the conditional expression (11), the power of the positive lens G1vdmin is so weak for the positive lenses other than the positive lens G1vdmin of the first lens unit L1, and the correction effect of the positive lens G1vdmin may decrease for the spherical aberration and the on-axis chromatic aberration on the telephoto side. On the other hand, if the value is smaller than the lower limit of the conditional expression (11), the power of the positive lens of the first lens unit L1 is so weak that the total length may become too long of the first lens unit L1. Each embodiment properly sets each element so as to satisfy the conditional expressions (10) and (11). Thereby, the zoom lens can be acquired of high performance over the entire zoom range while ensuring the small size and the high magnification ratio.

In each embodiment, numerical ranges of the conditional expressions (10) and (11) may be numerical ranges of the following conditional expressions (10a) and (11a), respectively.

$$4.50 < f1vd\text{min}/f1 < 9.50 \tag{10a}$$

$$2.90 < f1p1/f1p2 < 9.00 \tag{11a}$$

In each embodiment, the numerical ranges of the conditional expressions (10a) and (11a) may be numerical ranges of the following conditional expressions (10b) and (11b), respectively.

$$5.00 < f1vd\text{min}/f1 < 9.00 \tag{10b}$$

$$3.00 < f1p1/f1p2 < 8.00 \tag{11b}$$

Here, vd1 represents an Abbe number for the d-line of the positive lens G1vdmin, and vdnmax represents an Abbe number of a negative lens having a largest Abbe number vd for the d-line in that of the negative lenses of the first lens unit L1. f1 represents a focal length of the first lens unit L1, f2 represents a focal length of the second lens unit L2, and D1 represents a distance on the optical axis from a surface of the first lens unit L1 closest to the object side to a surface of the first lens unit L1 closest to the image side. At least one of the following conditional expressions (12) to (15) may be satisfied.

$$15.00 < vd1 < 34.00 \tag{12}$$

$$15.00 < vdn\text{max} < 45.00 \tag{13}$$

$$-10.00 < f1/f2 < -4.00 \tag{14}$$

$$0.20 < D1/f1 < 0.80 \tag{15}$$

The conditional expression (12) defines the Abbe number vd1 for the d-line of the positive lens G1vdmin. By satisfying the conditional expression (12), the on-axis chromatic aberration can be suppressed on the telephoto side. Among glass material satisfying the conditional expression (12), by using glass material having an anomalous dispersion for the positive lens G1vdmin, secondary achromatism can be effectively performed.

The conditional expression (13) defines the Abbe number vdnmax of the negative lens having the largest Abbe number vd for d-line in the negative lenses of the first lens unit L1. By satisfying the conditional expression (13), color flare can be suppressed on the telephoto side. Among glass material satisfying the conditional expression (13), by using glass material having the anomalous dispersion as the negative lens, the secondary achromatism can be effectively performed.

The conditional expression (14) defines a ratio of the focal length f1 of the first lens unit L1 to the focal length f2 of the second lens unit L1. If the value is smaller than the lower limit of the conditional expression (14), power of the second lens unit L2 is so strong that variation increases of various aberration such as field curvature and spherical aberration caused by zooming, making it difficult to acquire the high optical performance. On the other hand, if the value is larger than the upper limit of the conditional expression (14), the power of the first lens unit L1 is so strong that the spherical aberration and coma may largely occur in the first lens unit L1 on the telephoto side, making it difficult to correct the aberration variation by zooming.

The conditional expression (15) defines a ratio of the focal length f1 of the first lens unit L1 to a total thickness of the first lens unit L1 (distance D1). If the value is smaller than the lower limit of the conditional expression (15), the power of the first lens unit L1 is so strong that the spherical aberration and the on-axis chromatic aberration largely occur on the telephoto side, making it difficult to acquire the high optical performance. On the other hand, if the value is larger than the upper limit of the conditional expression (15), the total thickness of the first lens unit L1 may not be sufficiently ensured for sufficient number of lenses, making it difficult to correct various aberrations.

In each embodiment, numerical ranges of the conditional expressions (12) to (15) may be numerical ranges of the following conditional expressions (12a) to (15a), respectively.

$$15.00 < vd1 < 30.00 \tag{12a}$$

$$15.00 < vdn\text{max} < 40.00 \tag{13a}$$

$$-9.00 < f1/f2 < -5.00 \tag{14a}$$

$$0.20 < D1/f1 < 0.70 \tag{15a}$$

In each embodiment, the numerical ranges of the conditional expressions (12) to (15) may be numerical ranges of the following conditional expressions (12b) to (15b), respectively.

$$15.00 < vd1 < 26.00 \tag{12b}$$

$$15.00 < vdn\text{max} < 38.00 \tag{13b}$$

$$-8.50 < f1/f2 < -6.00 \tag{14b}$$

$$0.20 < D1/f1 < 0.60 \tag{15b}$$

The first lens unit L1 may include a cemented lens of a positive lens and a negative lens. Thereby, it is possible to suppress the on-axis chromatic aberration on the telephoto side. A last lens unit may include a cemented lens. Thereby, it is possible to suppress the spherical aberration and field curvature on the wide-angle side. The first lens unit L1 may consist of six or more and nine or less lenses. Thereby, it is possible to reduce the size of the first lens unit L1 while the spherical aberration and the on-axis chromatic aberration are suppressed on the telephoto side. An aperture stop SP may be disposed on the image side of the second lens unit L2. When the aperture stop SP is disposed on the image side of the second lens unit L2 as a variator lens unit having a strong negative power, it is possible to suppress increase in an effective diameter of the lens unit on the image side of the second lens unit L2. Thereby, it is possible to realize the small size and a reduced weight of the entire system of the zoom lens.

In each embodiment, by configuring each element as described above, zoom lens can be acquired of the high-performance over the entire zoom range while the small size and the high magnification ratio are realized. Further, the effect of each embodiment can be further enhanced by arbitrarily combining a plurality of the above-mentioned conditional expressions.

Next, the zoom lens will be described of each of the sixth to eleventh embodiments with reference to FIGS. 12 to 23A to 23C. A zoom lens according to each embodiment is an optical system (image pickup lens system) used in an image pickup apparatus such as a digital still camera, a video camera, a silver halide film camera, and a TV camera.

FIGS. 12, 14, 16, 18, 20, and 22 are sectional views of zoom lenses (optical systems) 1a to 1f of the sixth to eleventh embodiments, respectively. In each sectional view, a left side is the object side and a right side is the image side. L1 represents a first lens unit having a positive refractive power, L2 represents a second lens unit having a negative refractive power, and L3, L4, and L5 represent a third lens unit, a fourth lens unit, and a fifth lens unit having refractive powers, respectively. SP represents an aperture stop. P represents an optical block corresponding to an optical filter, a face plate, a low pass filter, an infrared cut filter, and the like. I represents an image plane. When the zoom lens is used as an image pickup optical system of an image pickup apparatus such as a digital still camera or a video camera, the image plane I corresponds to a solid-state image pickup element as a photoelectric converter such as a CCD sensor or a CMOS sensor. On the other hand, when the zoom lens is used as an image pickup optical system of a silver halide film camera, the image plane I corresponds to a film surface. Arrows in each sectional view indicate movement trajectories of each lens unit during zooming.

An aperture diameter of the aperture stop SP may be set constant or may be set variable during zooming. When the diameter of the aperture stop SP is variable, it is possible to cut lower ray coma flare caused by the off-axis light beam that largely occurs at the telephoto end, and thus better optical performance can be acquired.

Focusing is performed by moving, on an optical axis, at least one lens unit of the lens units. Each sectional view includes movement trajectories for a focusing unit, and a curved line drawn by a solid line represents a movement trajectory for correcting an image plane variation caused by zooming from the wide-angle end to the telephoto end during focusing for an object at infinity. A curved line drawn by a dotted line represents a movement trajectory for correcting an image plane variation caused by zooming from the wide-angle end to the telephoto end during focusing for a near-distance object. In each embodiment, focusing may be performed by moving a plurality of lens units on the optical axis instead of moving one lens unit.

Each of FIGS. 13A to 13C, 15A to 15C, 17A to 17C, 19A to 19C, 21A to 21C, and 23A to 23C illustrates aberration diagrams of each of the zoom lenses 1a to 1f according to the sixth to eleventh embodiments. In each drawing, A, B and C are aberration diagrams at a wide-angle end, at a middle zoom position, and at a telephoto end, respectively. In each aberration diagram, d and g represent the d-line (wavelength 587.56 nm) and g-line (wavelength 435.84 nm), respectively, and S and M represent a sagittal image plane and a meridional image plane for d-line, respectively. Distortion is described of the d-line. Lateral chromatic aberration is described of the g-line relative to the d-line. Fno represents an F-number and ω represents a half-angle of view, that is an image-pickup half-angle of view.

Hereinafter, configurations will be described of the zoom lenses 1a to 1e of the sixth to eleventh embodiments. Unless otherwise specified, each lens unit is disposed in order from the object side to the image side.

Sixth Embodiment

Figure 12:
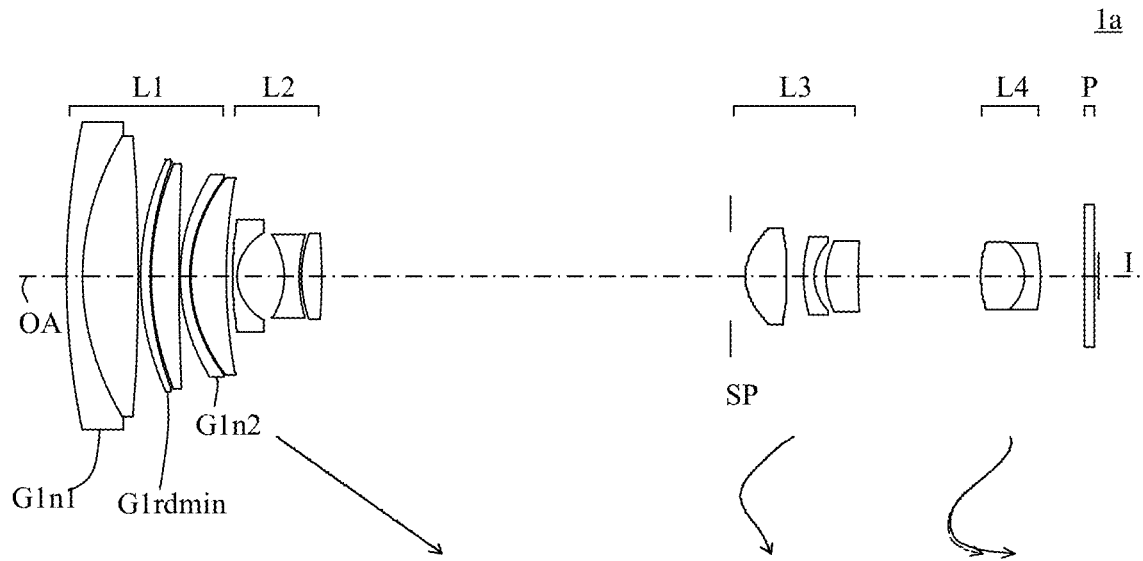
FIG. 12 is a sectional view of a zoom lens at a wide-angle end according to a sixth embodiment.
Figure 13A:
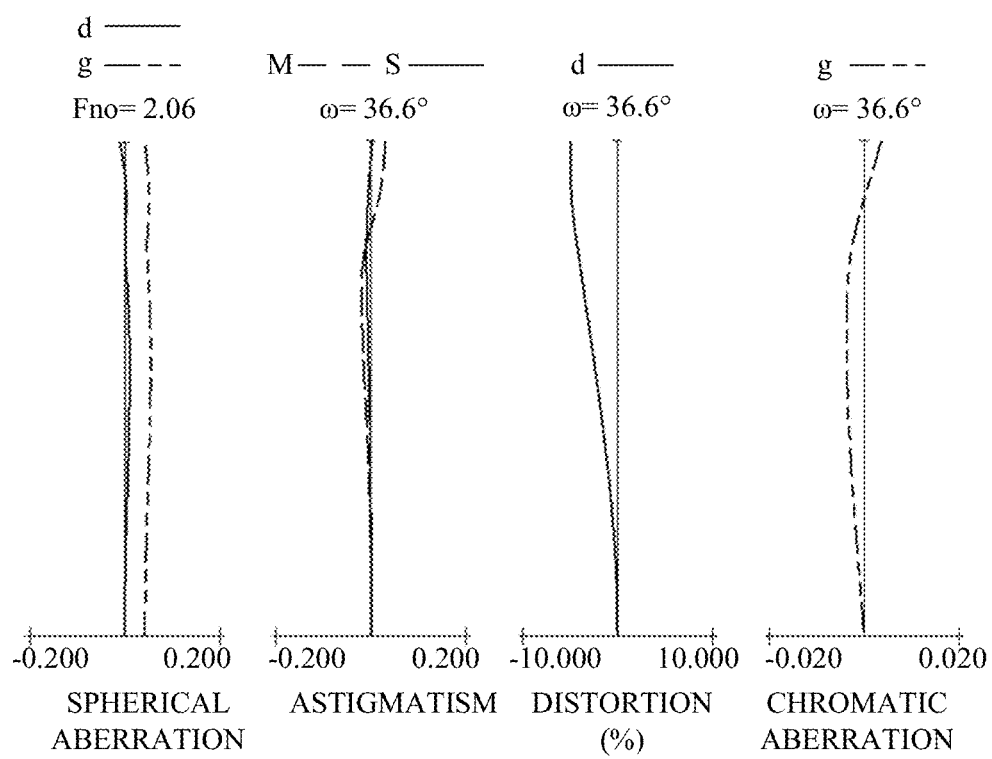
FIGS. 13A to 13C are aberration diagrams at the wide-angle end, a middle zoom position, and a telephoto end according to the sixth embodiment.
Figure 13B:
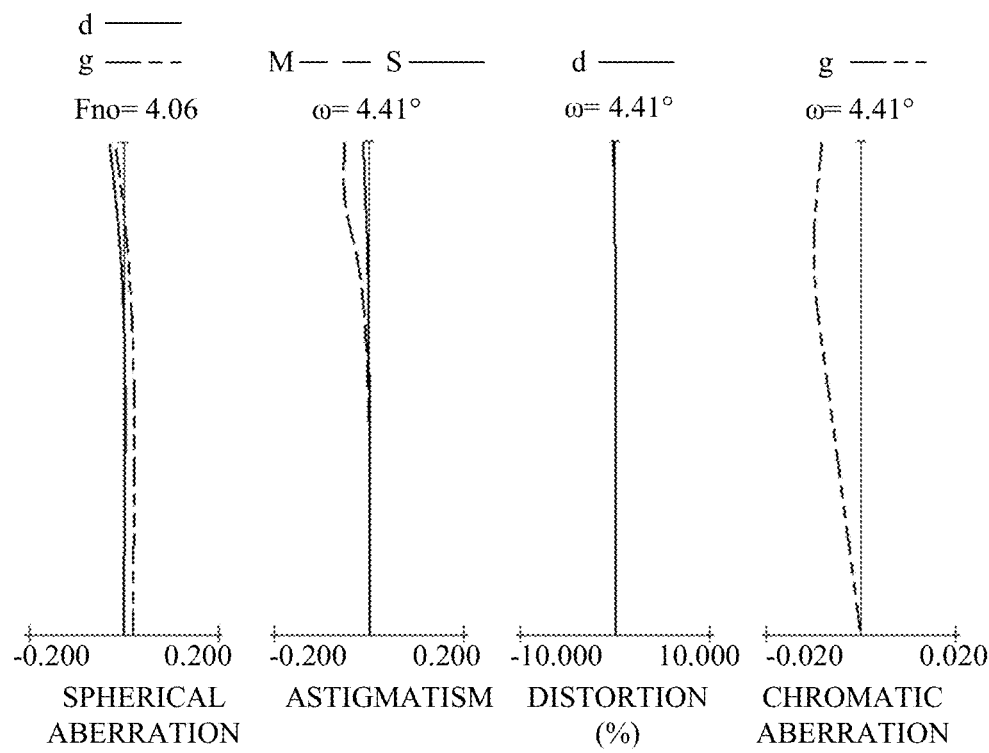
Figure 13C:
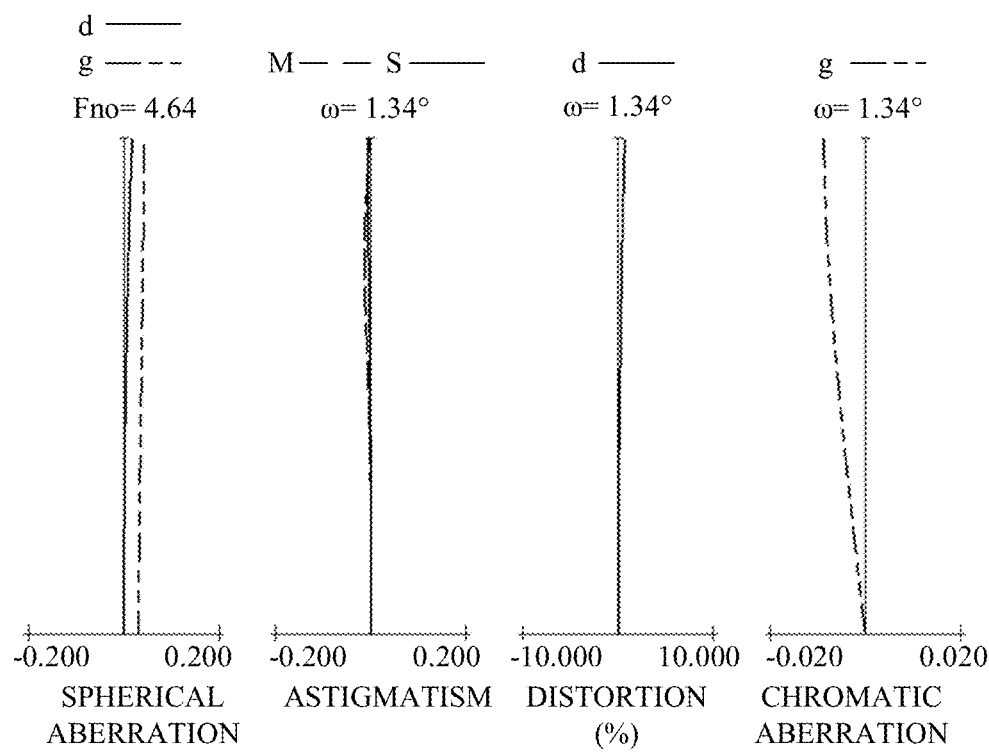

As illustrated in FIG. 12, a first lens unit L1 in a zoom lens 1a includes, in this order from an object side to an image side, a cemented lens having a positive refractive power in which a negative lens G1n1 and a positive lens are cemented, a positive lens G1vdmin, a positive lens, a negative lens G1n2, and a positive lens. For zooming, the first lens unit L1 does not move. Since six lens elements are included, spherical aberration and coma are corrected well especially on the telephoto side. Since the cemented lens is included, on-axis chromatic aberration is corrected well especially at the telephoto end. By including a highly dispersed positive lens, color flare and the on-axis chromatic aberration are corrected well especially at the telephoto end.

A second lens unit L2 includes, in order from the object side to the image side, a negative lens, a negative lens, and a positive lens, and moves along an optical axis OA during zooming. By including an aspherical lens, field curvature aberration in a wide-angle area and high-order spherical aberration in a telephoto area are corrected well. A third lens unit L3 includes, in order from the object side to the image side, a positive lens, a negative lens, and a positive lens, and moves along the optical axis OA during zooming. By disposing an aspherical lens on a most object side, spherical aberration is corrected well in the wide-angle area. A fourth lens unit L4 includes, in order from the object side to the image side, a cemented lens having a positive refractive power in which a positive lens and a negative lens are cemented. During zooming, the fourth lens unit L4 moves along the optical axis OA, and has functions as a compensator and a focusing unit. Consisting of one cemented lens, the fourth lens unit L4 can suppress lateral chromatic aberration variation during focusing while reducing a weight, making it easier to control focusing. An aperture stop SP is disposed between the second lens unit L2 and the third lens unit L3, and moves together with the third lens unit L3 during zooming.

Seventh Embodiment

Figure 14:
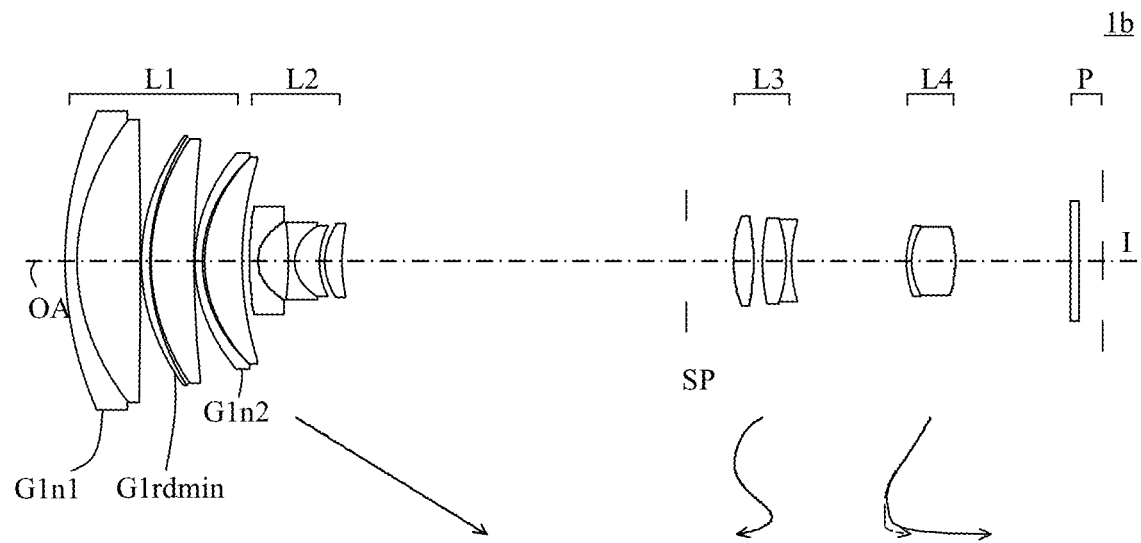
FIG. 14 is a sectional view of a zoom lens at a wide-angle end according to a seventh embodiment.
Figure 15A:
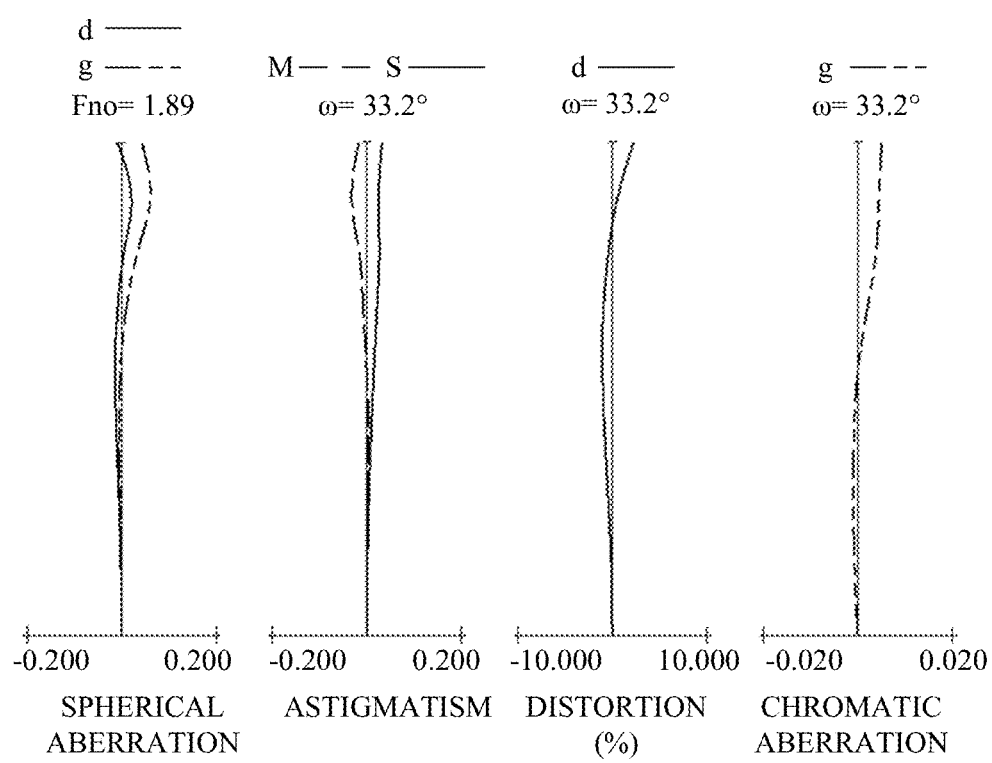
FIGS. 15A to 15C are aberration diagrams at the wide-angle end, a middle zoom position, and a telephoto end according to the seventh embodiment.
Figure 15B:
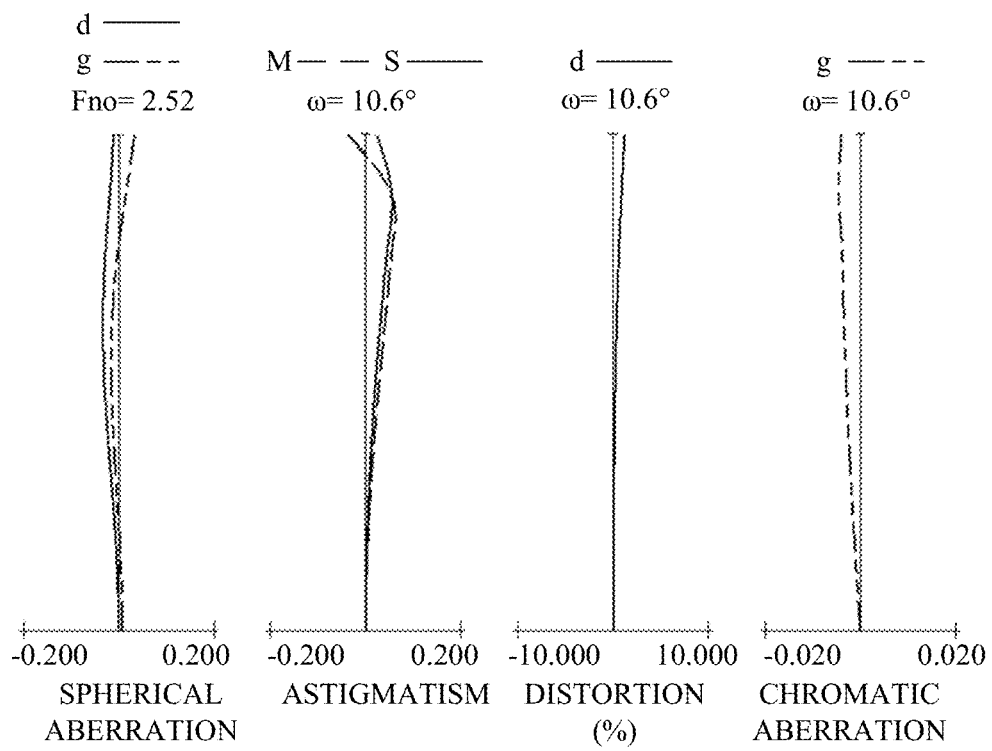
Figure 15C:
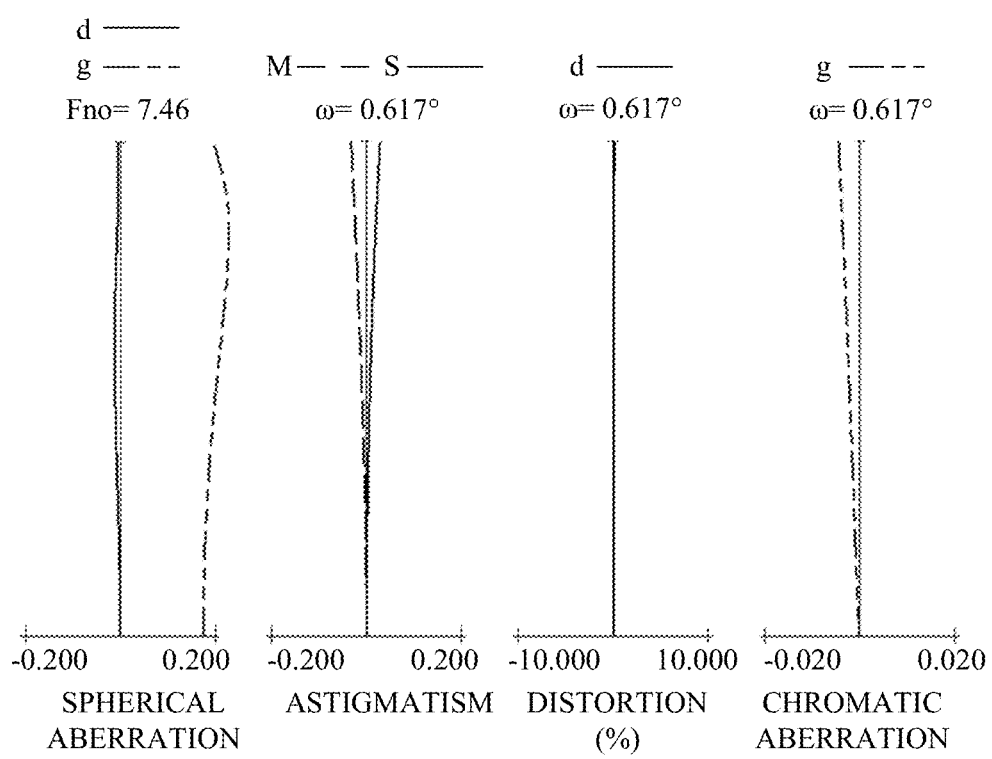

As illustrated in FIG. 14, a first lens unit L1 in a zoom lens 1b has the same configuration as that of the sixth embodiment. The second lens unit L2 includes, in order from an object side to an image side, a negative lens, a cemented lens having a negative refractive power in which a negative lens and a positive lens are cemented, and a positive lens, and moves along an optical axis OA during zooming. By including an aspherical lens, field curvature aberration in a wide-angle area and high-order spherical aberration in a telephoto area are corrected well.

A third lens unit L3 includes, in order from the object side to the image side, a positive lens and a cemented lens having a negative refractive power in which a positive lens and a negative lens are cemented, and moves along the optical axis OA during zooming. Spherical aberration is corrected well in the wide-angle area because an aspherical lens is disposed on a most object side. Since a cemented lens is included, on-axis chromatic aberration is corrected well especially at the wide-angle end. A fourth lens unit L4 includes, in order from the object side to the image side, a cemented lens having a positive refractive power in which a negative lens and a positive lens are cemented. During zooming, the fourth lens unit L4 moves along the optical axis OA, and has functions as a compensator and a focusing unit. Consisting of one cemented lens, the fourth lens unit L4 can suppress lateral chromatic aberration variation during focusing while reducing a weight, making it easier to control focusing. An aperture stop SP is disposed between the second lens unit L2 and the third lens unit L3, and does not move for zooming.

Eighth Embodiment

Figure 16:
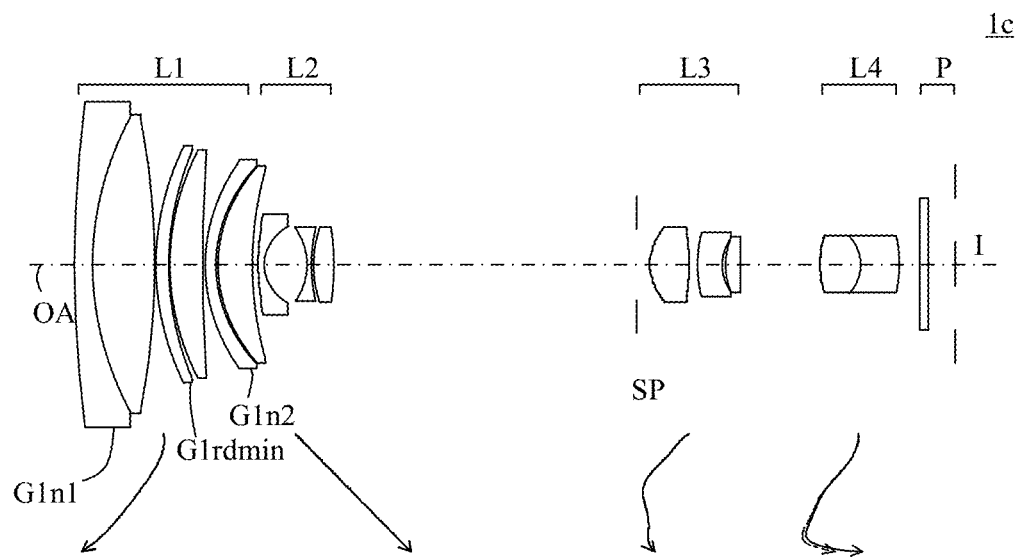
FIG. 16 is a sectional view of a zoom lens at a wide-angle end according to an eighth embodiment.
Figure 17A:
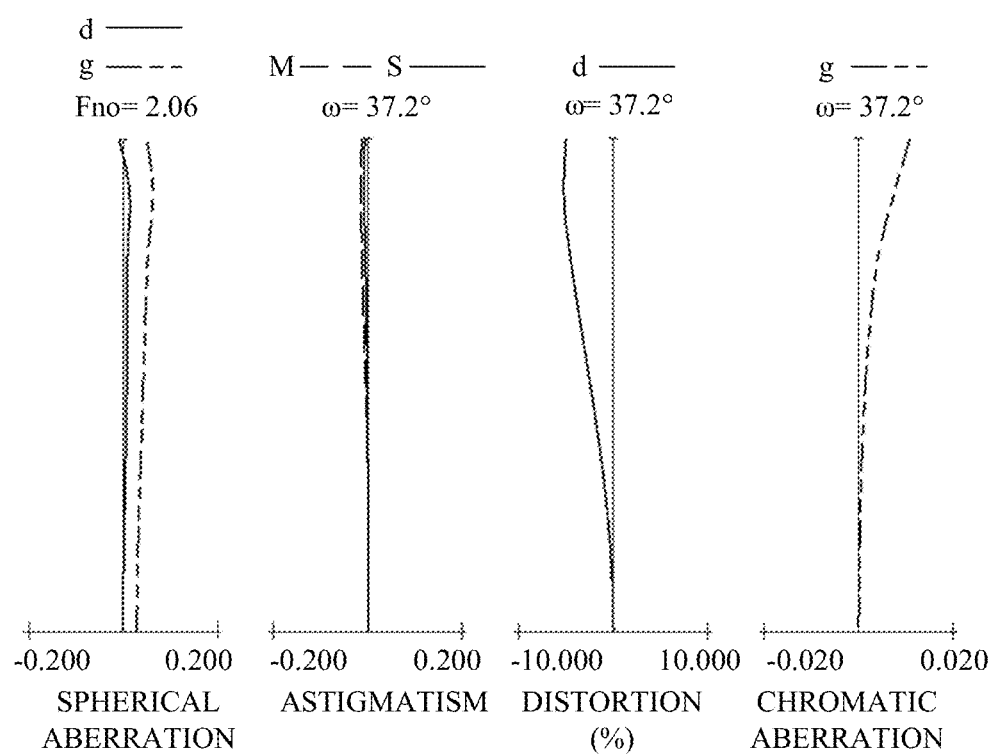
FIGS. 17A to 17C are aberration diagrams at the wide-angle end, a middle zoom position, and a telephoto end according to the eighth embodiment.
Figure 17B:
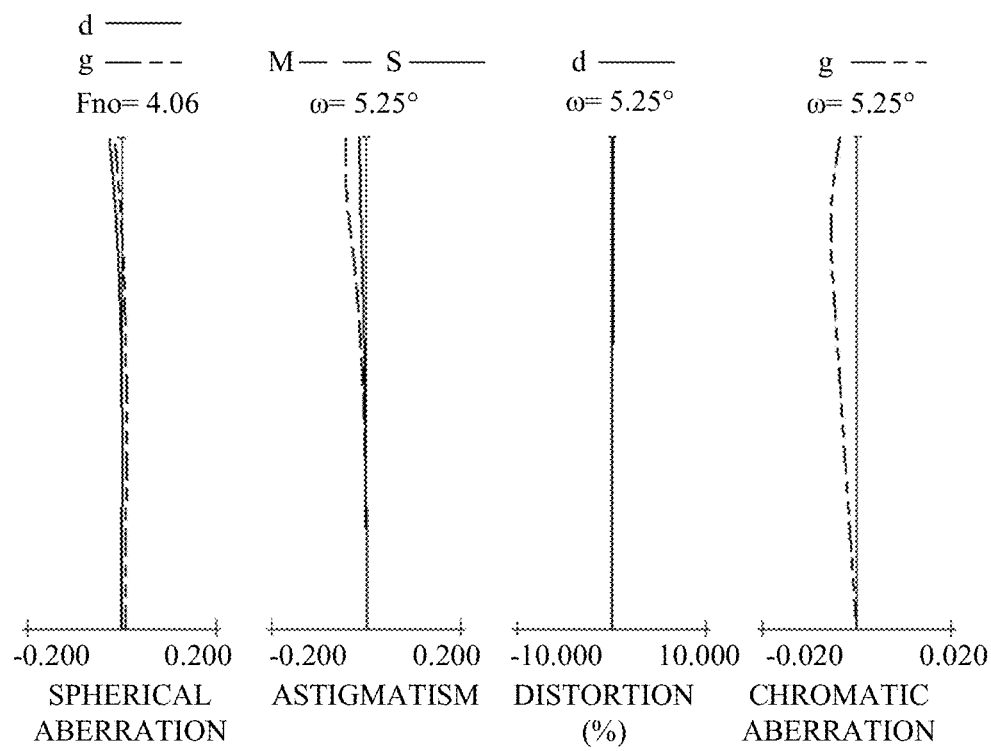
Figure 17C:
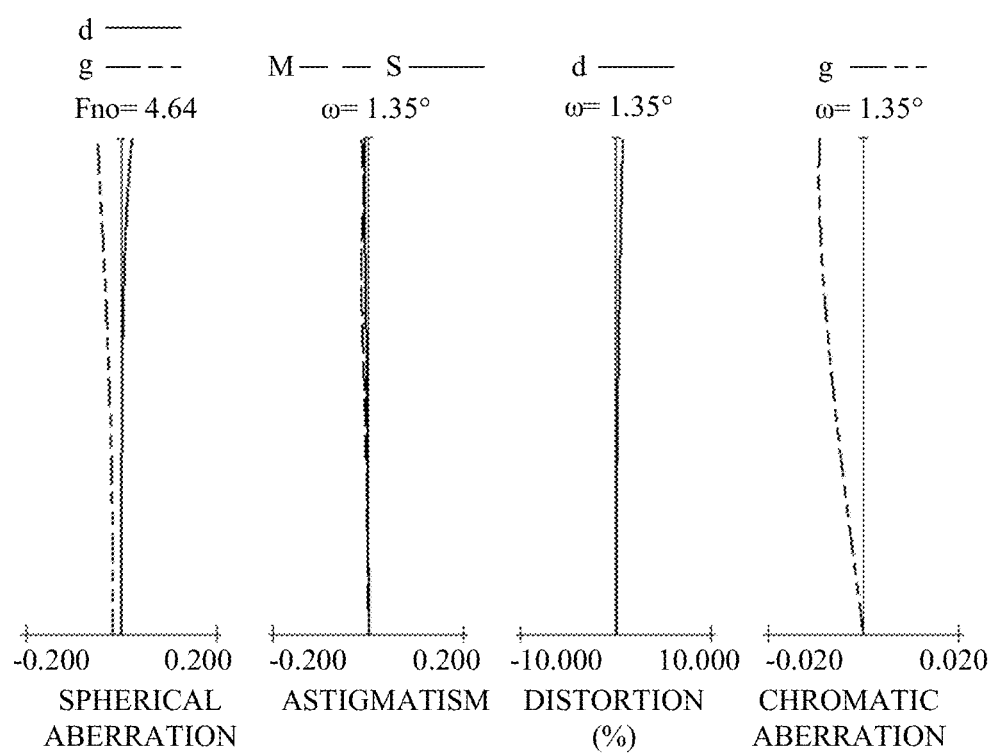

As illustrated in FIG. 16, a first lens unit L1 in a zoom lens 1c includes, in order from an object side to an image side, a cemented lens having a positive refractive power in which a negative lens G1n1 and a positive lens are cemented, a positive lens G1vdmin, a positive lens, and a negative lens G1n2, and a positive lens. The first lens unit L1 moves along the optical axis OA during zooming. Since six lens elements are included, it is possible to correct spherical aberration and coma well especially on a telephoto side. By including the cemented lens, on-axis chromatic aberration is corrected well especially at a telephoto end. Further, color flare and on-axis chromatic aberration are corrected well especially at the telephoto end because a highly dispersed positive lens is included. A second lens unit L2, a third lens unit L3, and a fourth lens unit L4 have the same configurations as those of the sixth embodiment, respectively. An aperture stop SP is disposed between the second lens unit L2 and the third lens unit L3, and moves together with the third lens unit L3 during zooming.

Ninth Embodiment

Figure 18:
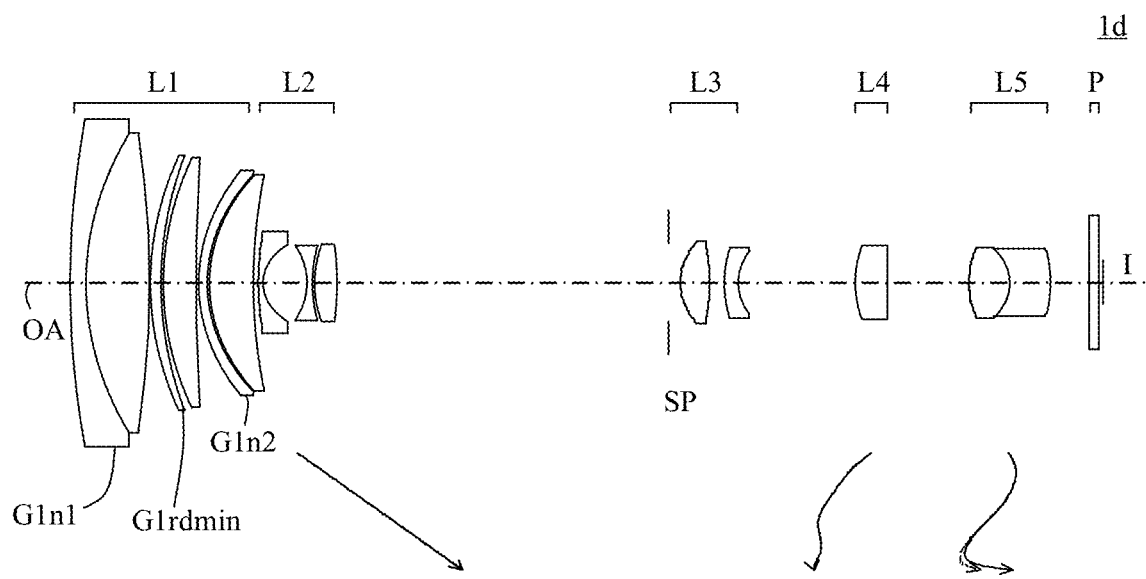
FIG. 18 is a sectional view of a zoom lens at a wide-angle end according to a nineth embodiment.
Figure 19A:
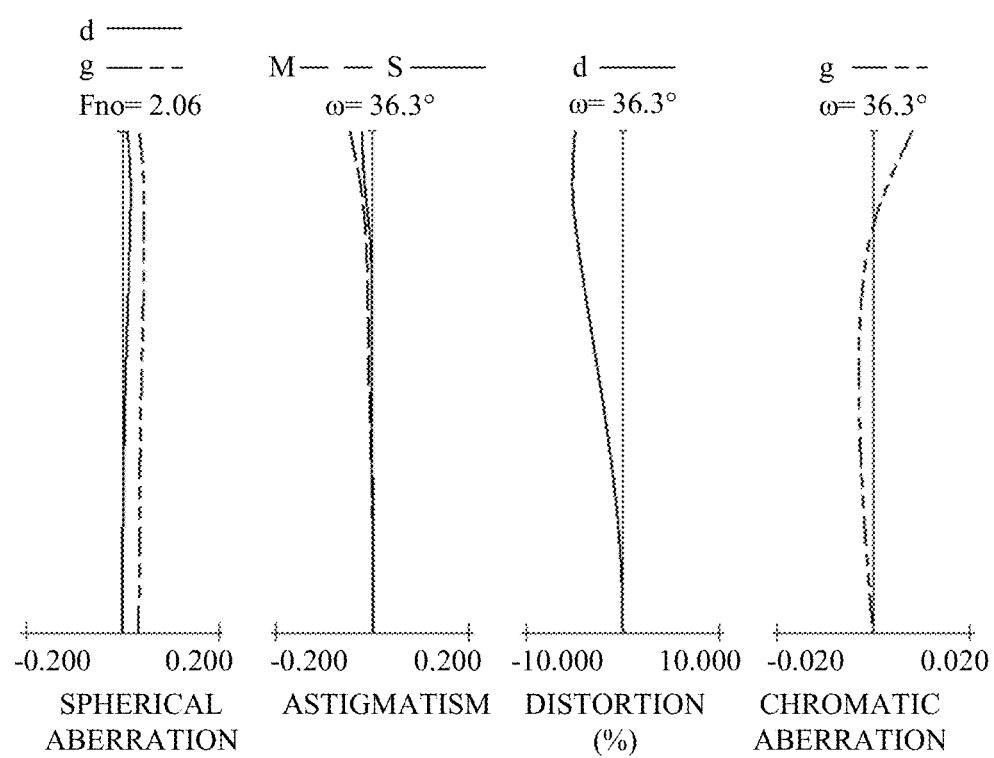
FIGS. 19A to 19C are aberration diagrams at the wide-angle end, a middle zoom position, and a telephoto end according to the ninth embodiment.
Figure 19B:
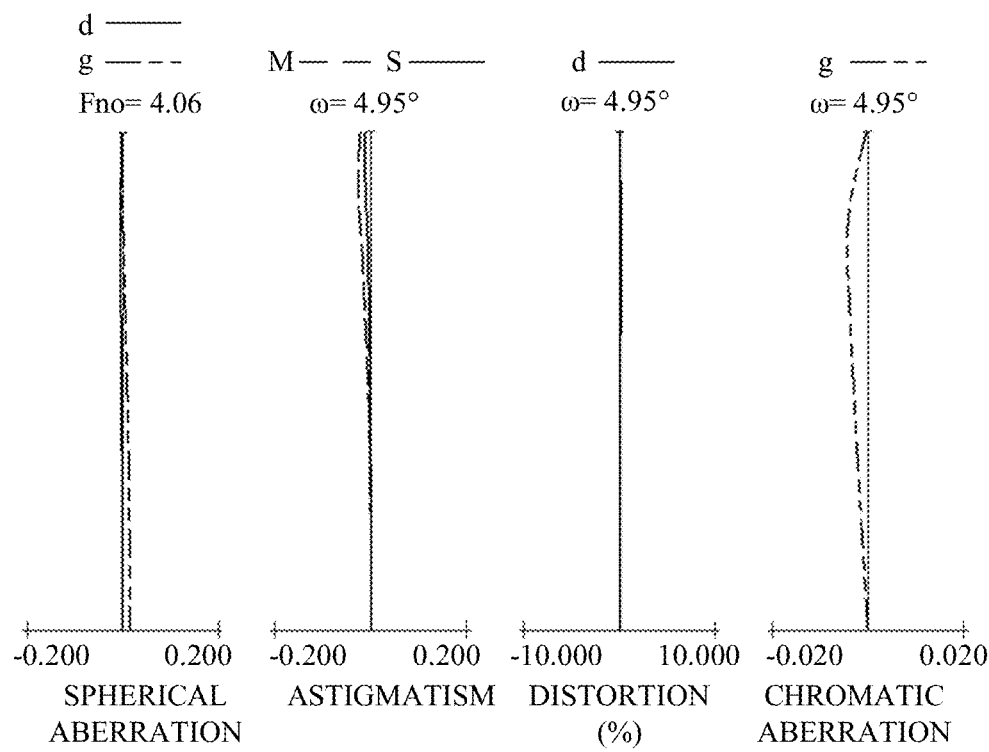
Figure 19C:
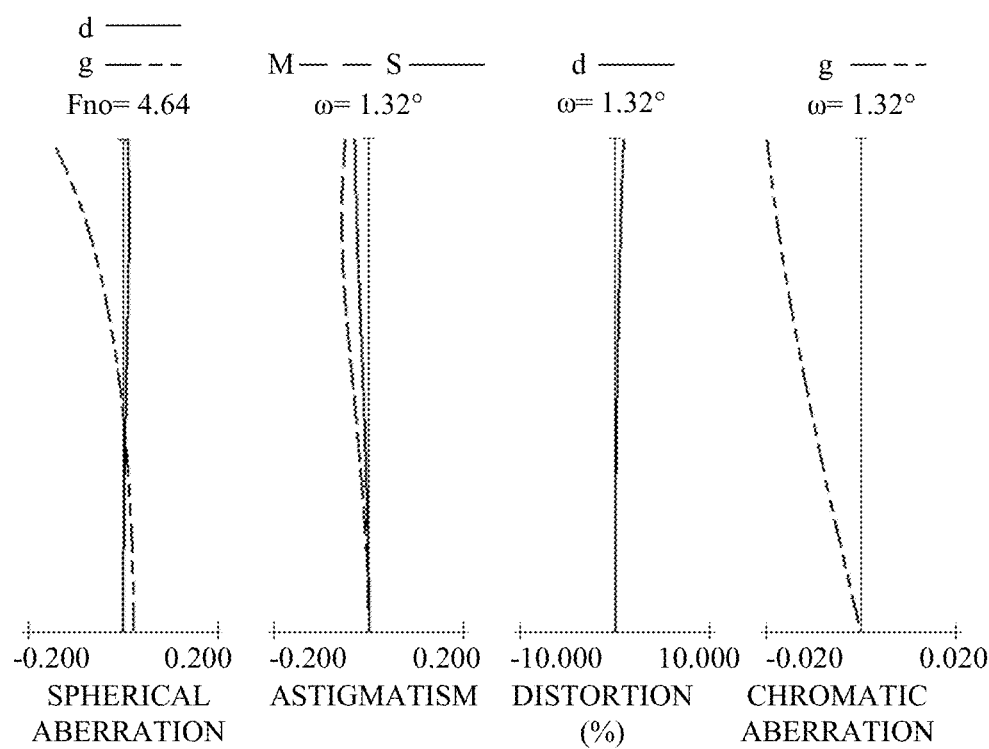

As illustrated in FIG. 18, a first lens unit L1 and a second lens unit L2 of a zoom lens 1d have the same configurations as those of the sixth embodiment, respectively. A third lens unit L3 includes a positive lens and a negative lens in order from the object side to the image side, and does not move for zooming. By disposing an aspherical lens on a most object side, spherical aberration is corrected well in a wide-angle area. A fourth lens unit L4 includes one positive lens and moves along an optical axis OA during zooming. A fifth lens unit L5 includes a cemented lens having a positive refractive power in which a negative lens and a positive lens are cemented, in order from the object side to the image side. During zooming, the fifth lens unit L5 moves along the optical axis OA, and has functions as a compensator and a focusing unit. Consisting of one cemented lens, the fifth lens unit L5 can suppress lateral chromatic aberration variation during focusing while reducing a weight, making it easier to control focusing. An aperture stop SP is disposed between the second lens unit L2 and the third lens unit L3, and moves together with the third lens unit L3 during zooming.

Tenth Embodiment

Figure 20:
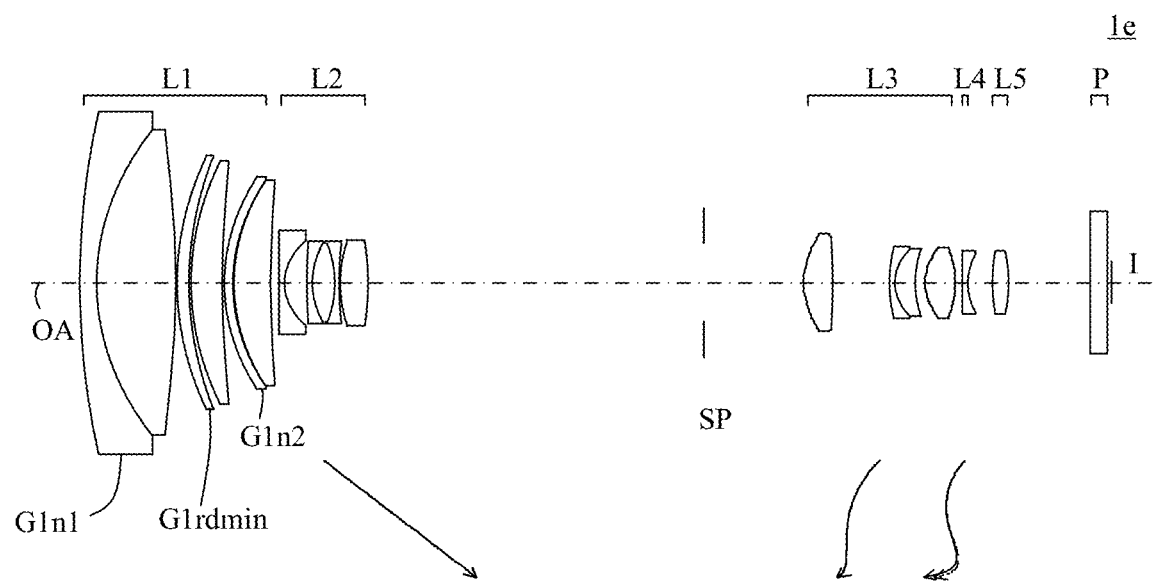
FIG. 20 is a sectional view of a zoom lens at a wide-angle end according to a tenth embodiment.
Figure 21A:
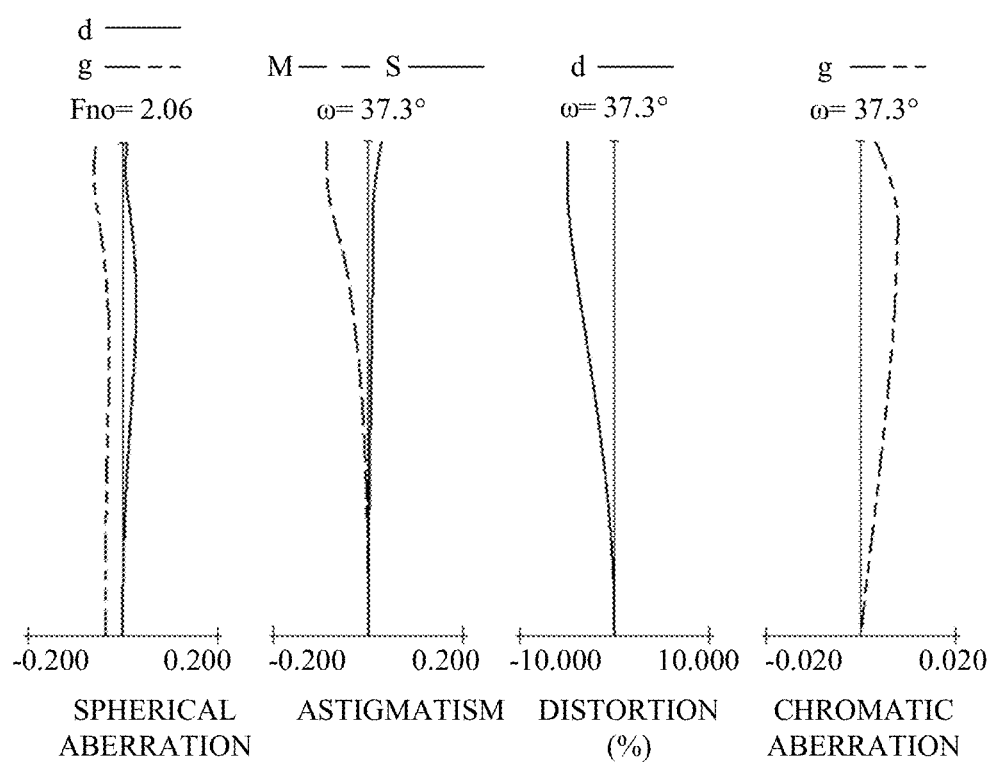
FIGS. 21A to 21C are aberration diagrams at the wide-angle end, a middle zoom position, and a telephoto end according to the tenth embodiment.
Figure 21B:
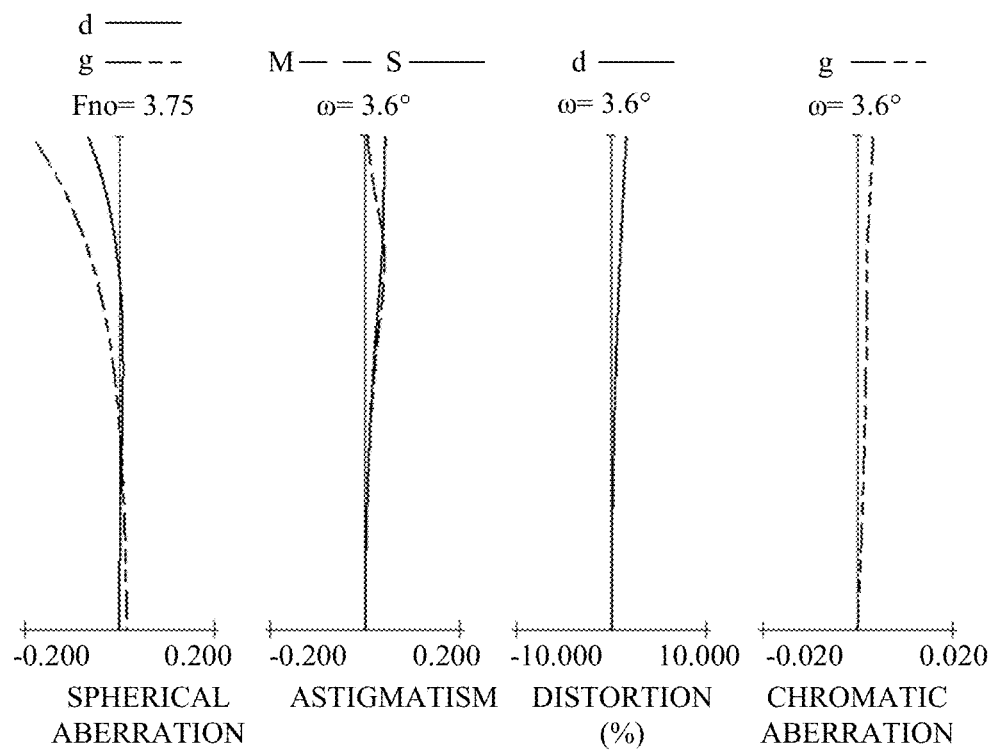
Figure 21C:
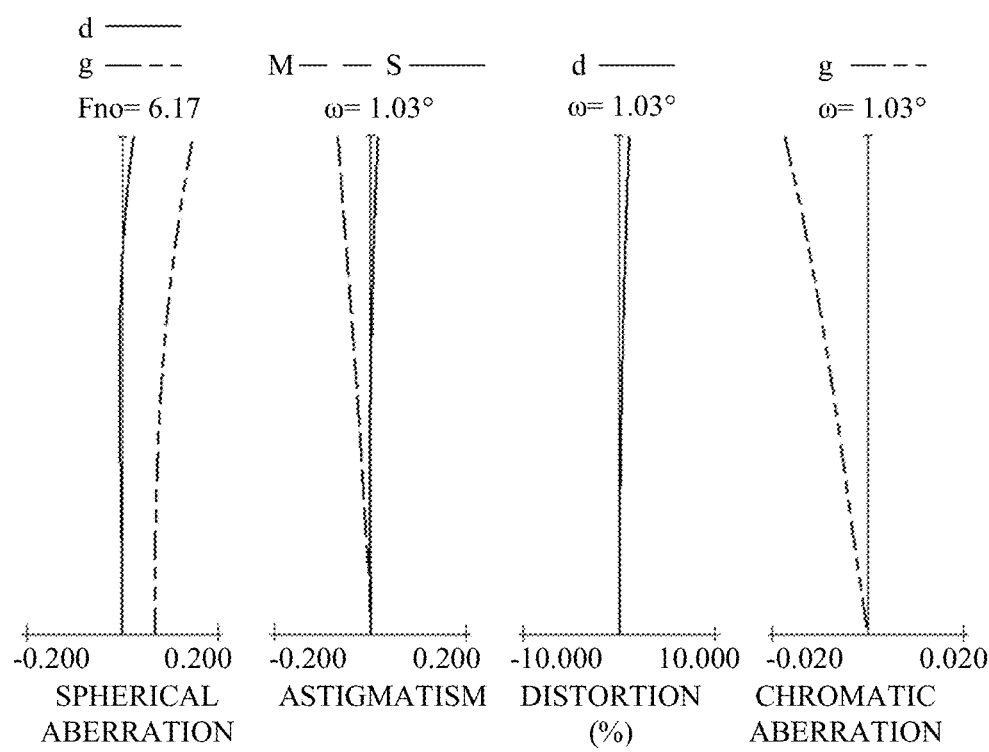

As illustrated in FIG. 20, a first lens unit L1 of a zoom lens 1e has the same configuration as that of the sixth embodiment. A second lens unit L2 includes, in order from an object side to an image side, a negative lens, a negative lens, a negative lens, and a positive lens, and moves along an optical axis OA during zooming. A third lens unit L3 includes, in order from the object side to the image side, a positive lens, a cemented lens having a negative refractive power in which a negative lens and a positive lens are cemented, and a positive lens, and moves along the optical axis OA during zooming. By disposing an aspherical lens on a most object side, spherical aberration is corrected well in the wide-angle area. A fourth lens unit L4 includes one negative lens. During zooming, the fourth lens unit L4 moves along the optical axis OA, and has functions as a compensator and a focusing unit. Consisting of one cemented lens, the fourth lens unit L4 can suppress lateral chromatic aberration variation during focusing while reducing a weight, making it easier to control focusing. A fifth lens unit L5 includes one positive lens and does not move for zooming. An aperture stop SP is disposed between the second lens unit L2 and the third lens unit L3, and does not move for zooming.

Eleventh Embodiment

Figure 22:
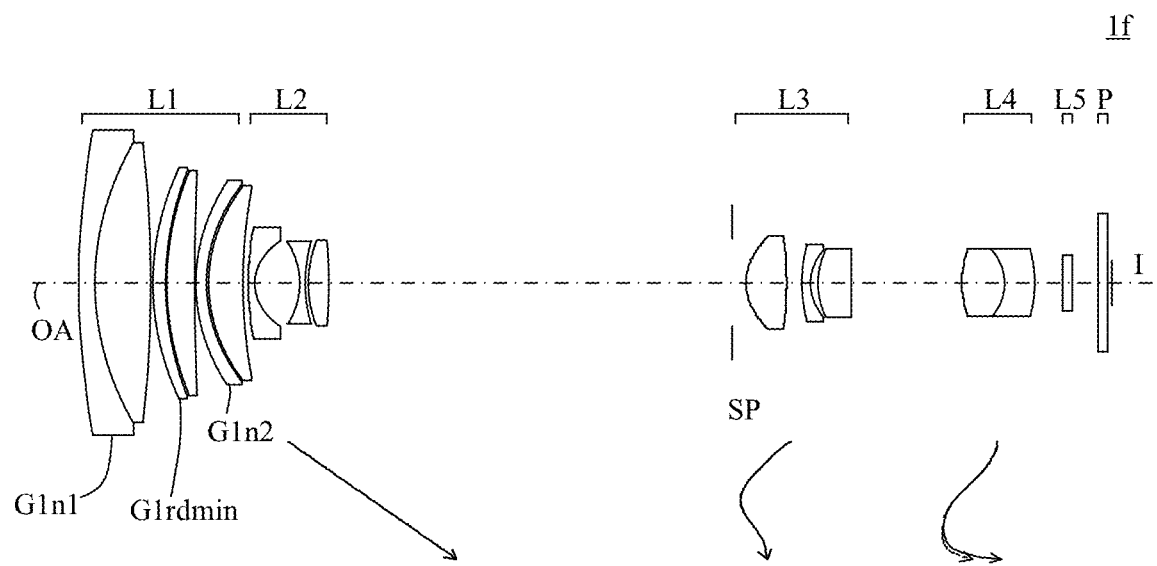
FIG. 22 is a sectional view of a zoom lens at a wide-angle end according to an eleventh embodiment.
Figure 23A:
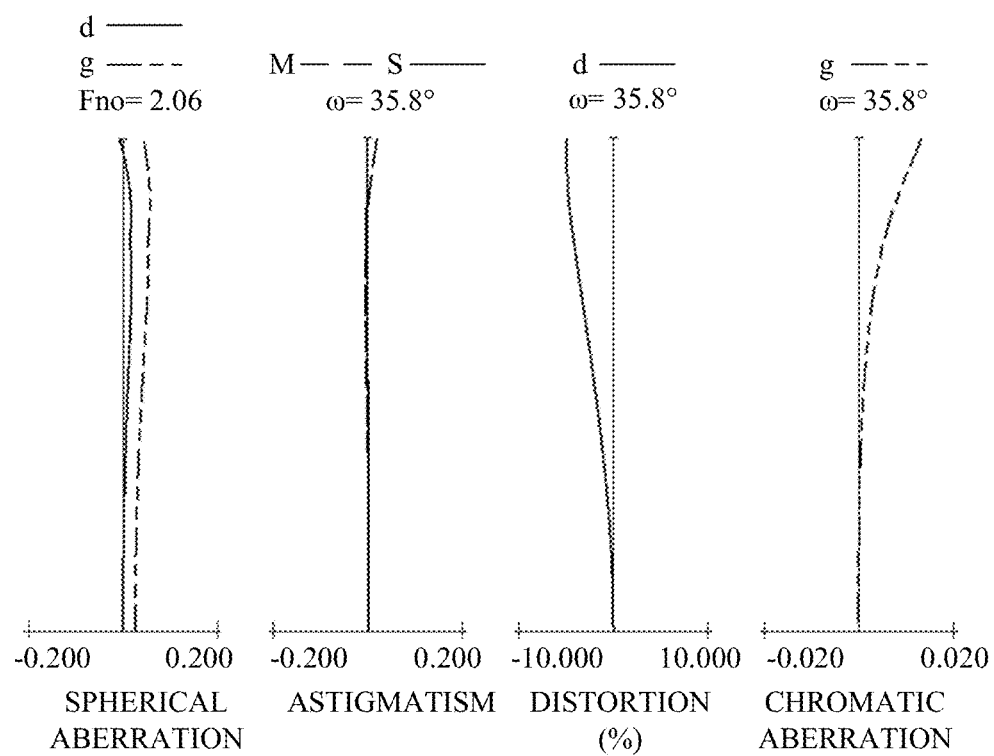
FIGS. 23A to 23C are aberration diagrams at the wide-angle end, a middle zoom position, and a telephoto end according to the eleventh embodiment.
Figure 23B:
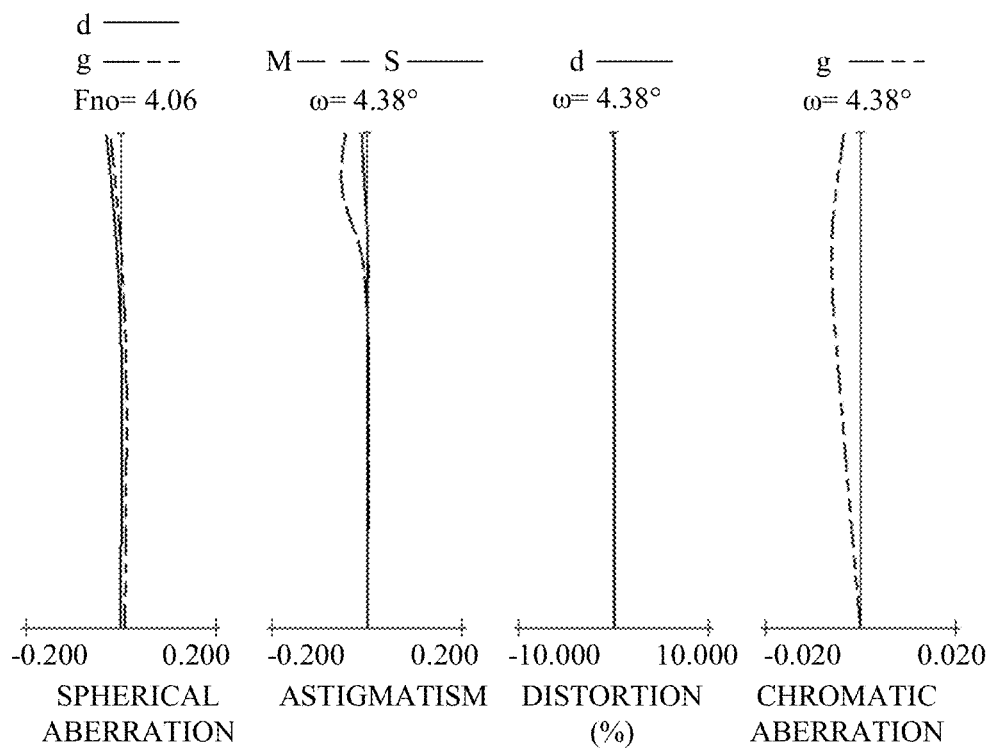
Figure 23C:
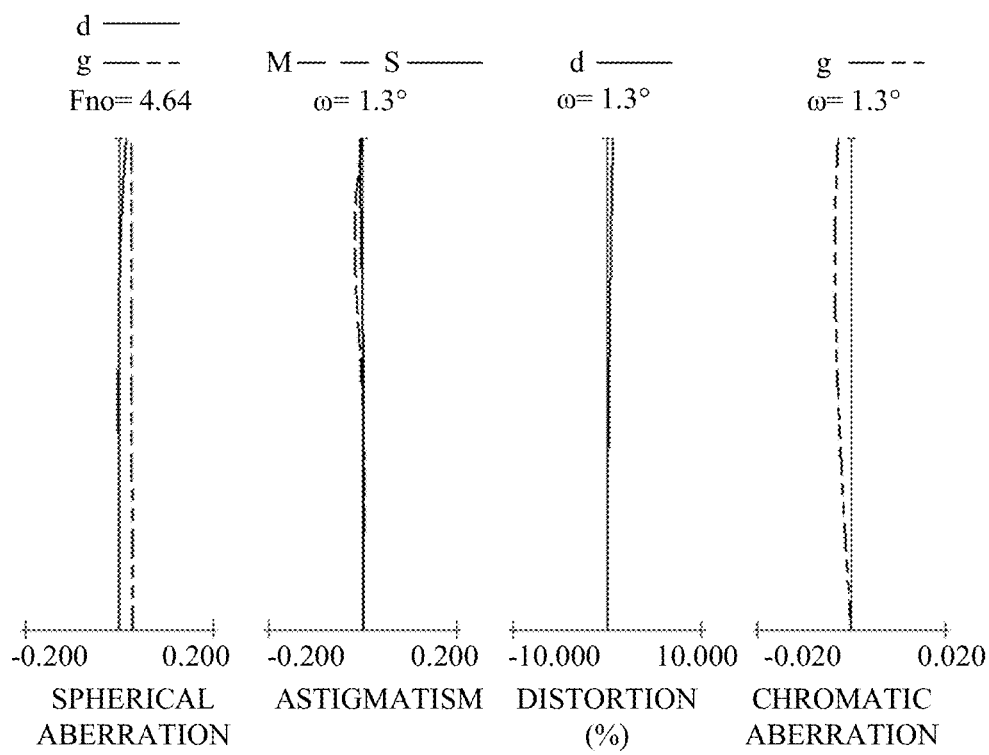

As illustrated in FIG. 22, a first lens unit L1, a second lens unit L2, a third lens unit L3, and a fourth lens unit L4 have the same configurations as those of the sixth embodiment, respectively. A fifth lens unit L5 includes one negative lens and does not move for zooming. An aperture stop SP is disposed between the second lens unit L2 and the third lens unit L3, and does not move for zooming.

Figure 24A:
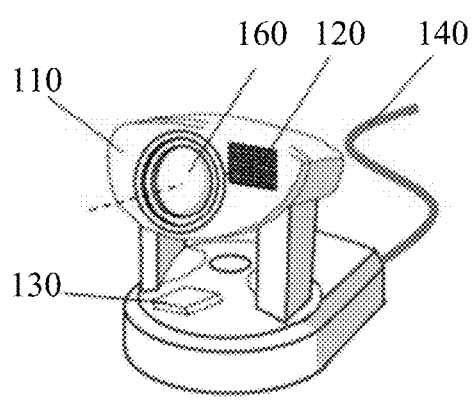
FIGS. 24A and 24B are schematic views of an image pickup apparatus according to each of the sixth to eleventh embodiments.
Figure 24B:
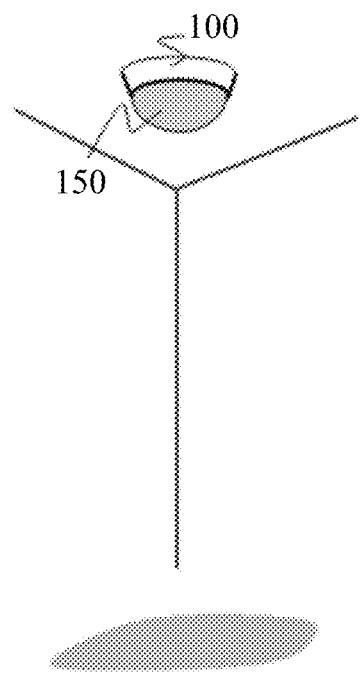

Next, with reference to FIGS. 24A and 24B, an image pickup apparatus (monitoring camera) will be described which uses each of the zoom lenses 1a to 1f of each embodiment as an image pickup optical system. FIGS. 24A and 24B are schematic views illustrating an image pickup apparatus 1000. FIG. 24A illustrates a schematic configuration of the image pickup apparatus 1000. FIG. 24B illustrates an installation example of the image pickup apparatus 1000. In FIGS. 24A and 24B, a reference numeral 100 denotes a camera main body (monitoring camera main body), and a reference numeral 110 denotes an image pickup optical system including any of the zoom lenses 1a to 1f of the sixth to eleventh embodiments. A reference numeral 120 denotes an image pickup element (photoelectric converter) such as a CCD sensor or a CMOS sensor, which is built in the camera main body and is configured to receive an object image formed by the image pickup optical system 110, that is, configured to pick up an image formed by the image pickup optical system 110. A reference numeral 130 denotes a memory configured to record information corresponding to the object image which is photoelectrically converted by the image pickup element 120. A reference numeral 140 denotes a network cable configured to transfer the object image which is photoelectrically converted by the image pickup element 120. A reference numeral 15 denotes a dome cover configured to protect the camera main body 110.

In each embodiment, the image pickup apparatus 100 is not limited to the monitoring camera, and can be applied to other image pickup apparatus 1000 such as a video camera and a digital camera. The image pickup apparatus 1000 may include a circuit configured to electrically correct at least one of distortion and lateral chromatic aberration, in addition to any of zoom lenses 1a to 1f. As described above, when a zoom lens has a configuration which can allow aberration such as distortion of the zoom lens, it is possible to reduce the number of lenses in an entire zoom lens and to make a size small. Further, by electrically correcting lateral chromatic aberration, it becomes easy to reduce color blur in a picked up image and to improve resolution.

Hereinafter, numerical examples 6 to 11 are given corresponding to the sixth to eleventh embodiments. In each numerical example, ri represents a curvature radius of an i-th surface, where the surface is counted from an object side. di represents a distance (lens thickness or air distance) between the i-th surface and an (i+1)-th surface. ndi and vdi represent a refractive index and an Abbe number of material of an i-th lens, respectively. The Abbe number vd of certain material can be expressed by the following expression, where nF, nd, and nC represents refractive indexes for F-line (486.1 nm), d-line (587.6 nm), and C-line (656.3 nm) of Fraunhofer line, respectively.

$$vd=(nd-1)/(nF-nC)$$

In each numerical example, d, focal length (mm), F-number, and half-angle of view (degree) are values when the zoom lens according to each embodiment focuses on an object at infinity. BF (back focus) indicates an air-converted length of a distance on an optical axis from a lens last surface (a lens surface closest to the image side) to a paraxial image plane, and is a value excluding glass block. "Lens total length" is a length acquired by adding the back focus to a distance on the optical axis from a front surface (a lens surface closest to the object side) to the last surface of the zoom lens. "Lens unit" is not limited to consist of a plurality of lenses, and may consist of a single lens. "e-Z" indicates "$10^{-Z}$". A half-angle of view is a value acquired by ray tracing.

When an optical surface is aspherical, a sign "*" is attached to a right side of a surface number. An aspherical shape is defined as follows. When an X axis is in an optical axis direction, an h axis is in a direction orthogonal to the optical axis, and a traveling direction of light is positive, R represents a paraxial curvature radius, k represents eccentricity, A4, A6, A8, A10, and A12 represent aspherical coefficients, and x represents a shift amount in the optical axis direction at a position of height h from the optical axis OA from a surface vertex. Here, the aspherical shape is expressed by the following expression.

$$x=(h^2/R)/[1+\{1-(1+k)(h/R)^2\}^{1/2}]+A4h^4+A6h^6+A8h^8+A10h^{10}+A12h^{12}$$

Table 2 describes numerical values of the conditional expressions in each of the numerical examples 6-11.

TABLE 2

| | | NUMERICAL EXAMPLE | | | | | |
|---|---|---|---|---|---|---|---|
| | | 6 | 7 | 8 | 9 | 10 | 11 |
| f1 | | 53.41 | 63.33 | 62.10 | 54.54 | 48.10 | 54.71 |
| f1vdmin | | 473.05 | 400.00 | 515.00 | 356.91 | 376.47 | 394.61 |
| f1p1 | | 473.05 | 400.00 | 515.00 | 356.91 | 376.47 | 394.61 |
| f2p2 | | 127.18 | 126.51 | 110.01 | 110.57 | 123.73 | 126.05 |
| f2 | | −7.87 | −7.55 | −7.72 | −7.56 | −6.83 | −8.02 |
| D1 | | 16.00 | 22.19 | 20.27 | 20.63 | 20.16 | 17.92 |
| EXPRESSION (10) | f1vdmin/f1 | 8.86 | 6.32 | 8.29 | 6.54 | 7.83 | 7.21 |
| EXPRESSION (11) | f1p1/f1p2 | 3.72 | 3.16 | 4.68 | 3.22 | 3.04 | 3.13 |
| EXPRESSION (12) | vd1 | 22.04 | 18.90 | 17.50 | 18.19 | 21.08 | 17.49 |
| EXPRESSION (13) | vdnmax | 35.13 | 35.04 | 37.12 | 31.23 | 33.56 | 35.04 |
| EXPRESSION (14) | f2 | −6.79 | −8.39 | −8.04 | −7.21 | −7.04 | −6.82 |
| EXPRESSION (15) | D1/f1 | 0.32 | 0.35 | 0.33 | 0.38 | 0.42 | 0.32 |

[NUMERICAL EXAMPLE 6]
Unit mm
Surface data

| Surface Number | r | d | nd | vd |
|---|---|---|---|---|
| 1 | 141.365 | 1.75 | 1.90525 | 35.0 |
| 2 | 49.187 | 5.88 | 1.51556 | 78.9 |
| 3 | −322.229 | 0.17 | | |
| 4 | 51.070 | 1.01 | 1.82856 | 22.0 |
| 5 | 58.195 | 0.17 | | |
| 6 | 54.796 | 2.91 | 1.49048 | 83.0 |
| 7 | 442.754 | 0.17 | | |
| 8 | 33.946 | 1.03 | 1.70537 | 35.1 |
| 9 | 28.339 | 0.17 | | |
| 10 | 28.248 | 3.74 | 1.48952 | 83.1 |
| 11 | 103.485 | (variable) | | |
| 12* | 61.742 | 0.52 | 1.95375 | 32.3 |
| 13 | 8.019 | 4.89 | | |
| 14 | −14.120 | 1.60 | 1.69963 | 55.3 |
| 15 | 28.617 | 0.37 | | |
| 16 | 22.952 | 2.05 | 1.94570 | 17.9 |
| 17 | −95.051 | (variable) | | |
| 18 (diaphragm) | ∞ | 1.60 | | |
| 19* | 9.838 | 4.38 | 1.53775 | 74.7 |
| 20* | −48.741 | 1.72 | | |
| 21 | 25.174 | 1.23 | 1.96866 | 30.6 |
| 22 | 8.820 | 1.20 | | |
| 23 | 14.561 | 3.41 | 1.62833 | 46.0 |
| 24 | 106.645 | (variable) | | |
| 25* | 20.470 | 4.51 | 1.55332 | 71.7 |
| 26 | −7.686 | 1.80 | 1.62220 | 42.7 |
| 27 | −28.127 | (variable) | | |

-continued

| | | | | |
|---|---|---|---|---|
| 28 | ∞ | 1.00 | 1.51633 | 64.1 |
| 29 | ∞ | | | |
| image plane | ∞ | | | |

ASPHERICAL SURFACE DATA

Twelfth surface
K = 4.55044e+001 A 4 = −2.23074e−006 A 6 = −3.29714e−007 A 8 = −3.30553e−009
A16 = −3.94506e−017
Nineteenth surface
K = −6.02098e−002 A 4 = −6.97267e−005 A 6 = −3.78488e−007 A 8 = −4.17413e−009
A16 = −4.09120e−016
Twentieth surface
K = 1.63338e+001 A 4 = 7.00577e−005 A 6 = −1.09817e−007 A 8 = 1.61937e−009
A16 = −4.45716e−016
Twenty-fifth surface
K = 8.32144e+000 A 4 = −1.06272e−004 A 6 = −3.79508e−007 A 8 = −5.42754e−008
A16 = 2.41326e−014

VARIOUS DATA
Zoom ratio 29.94

| | Wide angle | Middle | Telephoto |
|---|---|---|---|
| Focal length | 4.68 | 42.83 | 140.11 |
| F-number | 2.06 | 4.06 | 4.64 |
| Half angle of view | 35.20 | 4.41 | 1.35 |
| Image height | 3.30 | 3.30 | 3.30 |
| Lens total length | 109.52 | 109.52 | 109.52 |
| BF | 6.39 | 19.53 | 5.40 |
| d11 | 0.57 | 29.98 | 37.34 |
| d17 | 43.31 | 6.18 | 1.44 |
| d24 | 12.97 | 7.55 | 19.07 |
| d27 | 4.73 | 17.87 | 3.74 |

ZOOM LENS UNIT DATA

| Unit | Starting surface | Focal length |
|---|---|---|
| 1 | 1 | 53.41 |
| 2 | 12 | −7.87 |
| 3 | 18 | 23.32 |
| 4 | 25 | 25.84 |

[NUMERICAL EXAMPLE 7]
Unit mm
Surface data

| Surface Number | r | d | nd | vd |
|---|---|---|---|---|
| 1 | 80.262 | 1.50 | 1.90366 | 31.3 |
| 2 | 46.766 | 7.97 | 1.43700 | 95.1 |
| 3 | −1012.656 | 0.10 | | |
| 4 | 43.721 | 1.11 | 1.92286 | 18.9 |
| 5 | 48.992 | 0.10 | | |
| 6 | 45.303 | 5.38 | 1.43700 | 95.1 |
| 7 | 241.890 | 0.10 | | |
| 8 | 34.092 | 0.87 | 1.90525 | 35.0 |
| 9 | 27.950 | 0.39 | | |
| 10 | 29.061 | 4.67 | 1.43700 | 95.1 |
| 11 | 74.549 | (variable) | | |
| 12* | 181.677 | 1.00 | 1.80610 | 40.7 |
| 13* | 8.330 | 3.66 | | |
| 14 | −74.860 | 0.90 | 1.88300 | 40.8 |
| 15 | 7.521 | 3.08 | 1.75520 | 27.5 |
| 16 | 16.734 | 0.68 | | |
| 17 | 13.835 | 2.21 | 1.92286 | 18.9 |
| 18 | 37.868 | (variable) | | |
| 19 (diaphragm) | ∞ | (variable) | | |
| 20* | 27.564 | 2.55 | 1.62263 | 58.2 |
| 21* | −47.592 | 1.00 | | |
| 22 | 45.527 | 2.99 | 1.49700 | 81.5 |
| 23 | −27.754 | 0.73 | 1.60342 | 38.0 |
| 24 | 30.453 | (variable) | | |
| 25 | 20.583 | 0.64 | 1.75520 | 27.5 |
| 26 | 14.624 | 5.47 | 1.49710 | 81.6 |
| 27* | −26.636 | (variable) | | |
| 28 | ∞ | 1.05 | 1.51633 | 64.1 |
| 29 | ∞ | 3.00 | | |
| 30 | ∞ | | | |
| image plane | ∞ | | | |

ASPHERICAL SURFACE DATA

Twelfth surface
K = 0.00000e+000 A 4 = 7.53281e−005 A 6 = −5.65843e−007
A 8 = 1.74803e−009
Thirteenth surface
K = 0.00000e+000 A 4 = 6.35771e−005 A 6 = 4.80151e−007
A 8 = −6.23457e−009
Twentieth surface
K = 0.00000e+000 A 4 = −1.35134e−005 A 6 = 4.66395e−007
A 8 = −7.59210e−009
Twenty-first surface
K = 0.00000e+000 A 4 = 4.99620e−006 A 6 = 4.83769e−007
A 8 = −7.98175e−009
Twenty-seventh surface
K = 0.00000e+000 A 4 = 3.29779e−005 A 6 = 1.03803e−007
A 8 = −1.37418e−009

VARIOUS DATA
Zoom ratio 61.95

|  | Wide angle | Middle | Telephoto |
|---|---|---|---|
| Focal length | 4.79 | 16.93 | 296.57 |
| F-number | 1.89 | 2.52 | 7.46 |
| Half angle of view | 33.76 | 10.70 | 0.62 |
| Image height | 3.20 | 3.20 | 3.20 |
| Lens total length | 129.67 | 129.67 | 129.67 |
| BF | 18.12 | 26.36 | 4.68 |
| d11 | 1.00 | 22.12 | 43.24 |
| d18 | 43.24 | 22.12 | 1.00 |
| d19 | 5.80 | 0.20 | 0.20 |
| d24 | 14.41 | 11.77 | 33.45 |
| d27 | 14.44 | 22.68 | 1.00 |

ZOOM LENS UNIT DATA

| Unit | Starting surface | Focal length |
|---|---|---|
| 1 | 1 | 63.34 |
| 2 | 12 | −7.55 |
| 3 | 19 | ∞ |
| 4 | 20 | 38.61 |
| 5 | 25 | 27.49 |

[NUMERICAL EXAMPLE 8]
Unit mm
Surface data

| Surface Number | r | d | nd | vd |
|---|---|---|---|---|
| 1 | 249.384 | 2.01 | 1.90525 | 35.0 |
| 2 | 60.403 | 7.14 | 1.49700 | 81.5 |
| 3 | −161.211 | 0.17 | | |
| 4 | 52.305 | 1.47 | 1.95834 | 17.5 |
| 5 | 57.699 | 0.17 | | |
| 6 | 48.416 | 3.75 | 1.49700 | 81.5 |
| 7 | 412.161 | 0.17 | | |
| 8 | 34.013 | 1.34 | 1.88278 | 37.1 |
| 9 | 26.858 | 0.17 | | |
| 10 | 27.360 | 3.88 | 1.49700 | 81.5 |
| 11 | 71.107 | (variable) | | |
| 12* | 66.743 | 0.65 | 1.95375 | 32.3 |
| 13 | 7.581 | 4.85 | | |
| 14 | −12.167 | 0.60 | 1.70064 | 55.2 |
| 15 | 33.078 | 0.20 | | |
| 16 | 23.698 | 2.16 | 1.96272 | 18.2 |
| 17 | −48.167 | (variable) | | |
| 18 (diaphragm) | ∞ | 1.52 | | |
| 19* | 10.082 | 4.45 | 1.53775 | 74.7 |
| 20* | −58.411 | 1.06 | | |
| 21 | 27.948 | 2.68 | 1.88413 | 28.4 |
| 22 | 9.049 | 0.49 | | |
| 23 | 14.345 | 1.72 | 1.55787 | 44.9 |
| 24 | −317.043 | (variable) | | |
| 25* | 18.212 | 4.50 | 1.55332 | 71.7 |
| 26 | −8.149 | 4.41 | 1.61314 | 37.2 |
| 27 | −28.273 | (variable) | | |
| 28 | ∞ | 1.05 | 1.51633 | 64.1 |
| 29 | ∞ | 3.00 | | |
| 30 | ∞ | | | |
| image plane | ∞ | | | |

ASPHERICAL SURFACE DATA

Twelfth surface
K = 5.86609e+001 A 4 = 6.11275e−006 A 6 = −4.40214e−007
A 8 = −3.30553e−009 A16 = −1.00462e−016
Nineteenth surface
K = 4.39581e−002 A 4 = −8.18091e−005 A 6 = −7.72839e−008
A 8 = −4.17413e−009 A16 = −1.03392e−015
Twentieth surface
K = 4.26112e+001 A 4 = 7.88559e−005 A 6 = 6.09073e−007
A 8 = 1.61937e−009 A16 = −2.81668e−015
Twenty-fifth surface
K = 6.24758e+000 A 4 = −1.29837e−004 A 6 = −6.26602e−007
A 8 = −5.42754e−008 A16 = 2.97927e−014

VARIOUS DATA
Zoom ratio 30.30

|  | Wide angle | Middle | Telephoto |
|---|---|---|---|
| Focal length | 4.58 | 35.80 | 138.80 |
| F-number | 2.06 | 4.06 | 4.64 |
| Half angle of view | 35.77 | 5.27 | 1.36 |
| Image height | 3.30 | 3.30 | 3.30 |
| Lens total length | 100.07 | 111.86 | 117.92 |
| BF | 6.16 | 17.71 | 5.12 |
| d11 | 0.73 | 32.95 | 44.10 |
| d17 | 34.66 | 5.35 | 1.45 |
| d24 | 8.97 | 6.31 | 17.70 |
| d27 | 2.46 | 14.02 | 1.43 |

ZOOM LENS UNIT DATA

| Unit | Starting surface | Focal length |
|---|---|---|
| 1 | 1 | 62.10 |
| 2 | 12 | −7.72 |
| 3 | 18 | 20.96 |
| 4 | 25 | 23.77 |

[NUMERICAL EXAMPLE 9]
Unit mm
Surface data

| Surface Number | r | d | nd | vd |
|---|---|---|---|---|
| 1 | 178.151 | 1.76 | 1.96752 | 31.2 |
| 2 | 54.619 | 7.14 | 1.47736 | 80.9 |
| 3 | −223.893 | 0.17 | | |
| 4 | 59.107 | 1.27 | 1.96300 | 18.2 |
| 5 | 70.632 | 0.17 | | |
| 6 | 56.397 | 3.79 | 1.56395 | 72.1 |
| 7 | 575.677 | 0.17 | | |
| 8 | 32.329 | 1.01 | 1.86095 | 28.1 |
| 9 | 28.136 | 0.17 | | |
| 10 | 28.424 | 4.98 | 1.43421 | 95.1 |
| 11 | 108.699 | (variable) | | |
| 12* | 58.429 | 0.52 | 1.95375 | 32.3 |
| 13 | 7.490 | 4.93 | | |
| 14 | −12.352 | 0.69 | 1.69666 | 55.5 |
| 15 | 28.192 | 0.17 | | |
| 16 | 20.971 | 2.42 | 1.95443 | 17.9 |
| 17 | −60.028 | (variable) | | |
| 18 (diaphragm) | ∞ | 1.32 | | |
| 19* | 10.539 | 3.24 | 1.53775 | 74.7 |
| 20* | −52.941 | 1.69 | | |
| 21 | 22.809 | 1.62 | 1.89004 | 31.7 |
| 22 | 9.613 | (variable) | | |
| 23 | 20.243 | 3.66 | 1.59515 | 67.4 |
| 24 | −172.843 | (variable) | | |
| 25* | 17.870 | 4.51 | 1.55332 | 71.7 |
| 26 | −8.248 | 4.52 | 1.72820 | 36.2 |
| 27 | −26.364 | (variable) | | |
| 28 | ∞ | 1.00 | 1.51633 | 64.1 |
| 29 | ∞ | | | |
| image plane | ∞ | | | |

ASPHERICAL SURFACE DATA

Twelfth surface
K = 4.27341e+001 A 4 = −5.96989e−006 A 6 = −4.15753e−007
A 8 = −3.30553e−009 A16 = −7.36108e−017
Nineteenth surface
K = 9.98217e−002 A 4 = −9.80035e−005 A 6 = −4.79424e−007
A 8 = −4.17413e−009 A16 = −1.11387e−015

-continued

Twentieth surface
K = 3.50628e+001 A 4 = 4.72596e−005 A 6 = 2.30156e−007
A 8 = 1.61937e−009 A16 = −8.86808e−016
Twenty-fifth surface
K = 6.94502e+000 A 4 = −1.14919e−004 A 6 = −1.20721e−006
A 8 = −5.42754e−008 A16 = −2.10388e−014

VARIOUS DATA
Zoom ratio 30.00

|  | Wide angle | Middle | Telephoto |
|---|---|---|---|
| Focal length | 4.72 | 38.09 | 141.72 |
| F-number | 2.06 | 4.06 | 4.64 |
| Half angle of view | 34.9 | 34.9 | 51.33 |
| Image height | 3.30 | 3.30 | 3.30 |
| Lens total length | 116.36 | 116.36 | 116.36 |
| BF | 6.19 | 15.59 | 5.35 |
| d11 | 0.55 | 29.85 | 37.17 |
| d17 | 37.44 | 8.15 | 0.82 |
| d22 | 13.10 | 1.98 | 0.49 |
| d24 | 9.16 | 10.87 | 22.61 |
| d27 | 4.53 | 13.93 | 3.69 |

ZOOM LENS UNIT DATA

| Unit | Starting surface | Focal length |
|---|---|---|
| 1 | 1 | 54.54 |
| 2 | 12 | −7.56 |
| 3 | 18 | 40.08 |
| 4 | 23 | 30.66 |
| 5 | 25 | 27.81 |

[NUMERICAL EXAMPLE 10]
Unit mm
Surface data

| Surface Number | r | d | nd | νd |
|---|---|---|---|---|
| 1 | 148.069 | 1.85 | 1.93473 | 33.6 |
| 2 | 42.402 | 8.27 | 1.49700 | 81.5 |
| 3 | −197.857 | 0.17 | | |
| 4 | 52.912 | 1.30 | 1.86387 | 21.1 |
| 5 | 62.470 | 0.17 | | |
| 6 | 48.775 | 3.31 | 1.49700 | 81.5 |
| 7 | 230.497 | 0.17 | | |
| 8 | 33.888 | 0.95 | 1.79122 | 23.9 |
| 9 | 32.095 | 0.17 | | |
| 10 | 33.531 | 3.80 | 1.49700 | 81.5 |
| 11 | 224.918 | (variable) | | |
| 12 | −1086.622 | 0.56 | 1.95375 | 32.3 |
| 13 | 9.043 | 2.31 | | |
| 14 | 114.994 | 0.58 | 1.80400 | 46.6 |
| 15 | 14.302 | 2.20 | | |
| 16 | −19.145 | 0.56 | 1.77250 | 49.6 |
| 17 | 66.904 | 0.17 | | |
| 18 | 24.032 | 2.88 | 1.95906 | 17.5 |
| 19 | −50.065 | (variable) | | |
| 20 (diaphragm) | ∞ | (variable) | | |
| 21* | 14.231 | 2.89 | 1.76450 | 49.1 |
| 22 | −137.089 | 6.10 | | |
| 23 | 27.905 | 0.59 | 2.00100 | 29.1 |
| 24 | 7.738 | 2.17 | 1.49700 | 81.5 |
| 25 | 18.353 | 1.04 | | |
| 26* | 8.717 | 3.16 | 0.00000 | 0.0 |
| 27* | −18.059 | (variable) | | |
| 28 | −9922.042 | 0.55 | 1.95375 | 32.3 |
| 29 | 10.921 | (variable) | | |
| 30 | 32.915 | 1.57 | 1.76182 | 26.5 |
| 31 | −27.241 | (variable) | | |
| 32 | ∞ | 1.73 | 1.51633 | 64.1 |
| 33 | ∞ | | | |
| image plane | ∞ | | | |

-continued

ASPHERICAL SURFACE DATA

Twenty-first surface
K = 3.38150e−001 A 4 = −2.39807e−005 A 6 = −1.06133e−007
A 8 = −1.84395e−011 A10 = −3.27947e−012 A16 = −8.63837e−018
Twenty-sixth surface
K = 3.97524e−001 A 4 = −3.19848e−004 A 6 = −5.11064e−006
A 8 = 2.40374e−008 A10 = −8.52233e−010 A16 = 7.90438e−015
Twenty-seventh surface
K = 5.68430e+000 A 4 = 1.28284e−004 A 6 = −2.71608e−006
A 8 = 1.27974e−007 A10 = −5.49086e−010 A16 = 6.06120e−015

VARIOUS DATA
Zoom ratio 39.71

|  | Wide angle | Middle | Telephoto |
|---|---|---|---|
| Focal length | 4.14 | 47.00 | 164.31 |
| F-number | 2.06 | 3.75 | 6.17 |
| Half angle of view | 35.94 | 3.65 | 1.05 |
| Image height | 3.00 | 3.00 | 3.00 |
| Lens total length | 108.78 | 108.78 | 108.78 |
| BF | 10.94 | 10.94 | 10.94 |
| d11 | 0.94 | 28.71 | 34.80 |
| d19 | 35.40 | 7.63 | 1.53 |
| d20 | 10.61 | 3.27 | 1.26 |
| d27 | 0.77 | 6.32 | 0.88 |
| d29 | 2.64 | 4.42 | 11.87 |
| d31 | 8.80 | 8.80 | 8.80 |

ZOOM LENS UNIT DATA

| Unit | Starting surface | Focal length |
|---|---|---|
| 1 | 1 | 48.10 |
| 2 | 12 | −6.83 |
| 3 | 20 | ∞ |
| 4 | 21 | 15.44 |
| 5 | 28 | −11.44 |
| 6 | 30 | 19.79 |

[NUMERICAL EXAMPLE 11]
Unit mm
Surface data

| Surface Number | r | d | nd | νd |
|---|---|---|---|---|
| 1 | 156.120 | 1.80 | 1.90525 | 35.0 |
| 2 | 51.549 | 6.07 | 1.49700 | 81.5 |
| 3 | −253.579 | 0.17 | | |
| 4 | 51.153 | 1.38 | 1.95906 | 17.5 |
| 5 | 58.369 | 0.17 | | |
| 6 | 55.995 | 3.03 | 1.49700 | 81.5 |
| 7 | 517.843 | 0.17 | | |
| 8 | 33.961 | 1.21 | 1.81050 | 22.7 |
| 9 | 28.723 | 0.17 | | |
| 10 | 28.811 | 3.75 | 1.48424 | 84.3 |
| 11 | 100.591 | (variable) | | |
| 12* | 67.950 | 0.68 | 1.95375 | 32.3 |
| 13 | 8.267 | 4.83 | | |
| 14 | −14.285 | 0.67 | 1.69699 | 55.5 |
| 15 | 28.314 | 0.43 | | |
| 16 | 22.745 | 2.04 | 1.95906 | 17.5 |
| 17 | −98.785 | (variable) | | |
| 18 (diaphragm) | ∞ | 1.48 | | |
| 19 | 10.010 | 4.45 | 1.53775 | 74.7 |
| 20* | −55.844 | 1.64 | | |
| 21 | 29.083 | 0.92 | 1.93291 | 33.7 |
| 22 | 9.323 | 0.93 | | |
| 23 | 15.147 | 3.48 | 1.55780 | 45.1 |
| 24 | 269.455 | (variable) | | |
| 25* | 20.244 | 4.50 | 1.55332 | 71.7 |
| 26 | −9.304 | 3.30 | 1.66664 | 35.4 |
| 27 | −23.786 | (variable) | | |
| 28 | 3288.165 | 1.06 | 1.90300 | 19.4 |

-continued

| 29 | 172.612 | (variable) | | |
| 30 | ∞ | 1.00 | 1.51633 | 64.1 |
| 31 | ∞ | | | |
| image plane | ∞ | | | |

ASPHERICAL SURFACE DATA

Twelfth surface
K = 5.38640e+001 A 4 = −3.52212e−006 A 6 = −3.26475e−007
A 8 = −2.02694e−009 A16 = −3.94506e−017
Nineteenth surface
K = −1.35366e−002 A 4 = −6.91436e−005 A 6 = −4.01294e−007
A 8 = −3.17213e−009 A16 = −4.09120e−016
Twentieth surface
K = 2.15775e+001 A 4 = 5.97262e−005 A 6 = 1.67368e−008
A 8 = 8.51531e−010 A16 = −4.45716e−016
Twenty-fifth surface
K = 5.72628e+000 A 4 = −8.90959e−005 A 6 = 2.00541e−007
A 8 = −3.90543e−008 A16 = 2.41326e−014

VARIOUS DATA
Zoom ratio 30.00

| | Wide angle | Middle | Telephoto |
|---|---|---|---|
| Focal length | 4.82 | 43.04 | 144.60 |
| F-number | 2.06 | 4.06 | 4.64 |
| Half angle of view | 34.40 | 4.38 | 1.31 |
| Image height | 3.30 | 3.30 | 3.30 |
| Lens total length | 112.99 | 112.99 | 112.99 |
| BF | 4.44 | 4.44 | 4.44 |
| d11 | 0.63 | 30.49 | 37.95 |
| d17 | 44.20 | 7.38 | 1.47 |
| d24 | 12.19 | 7.45 | 18.53 |
| d27 | 3.20 | 14.89 | 2.27 |
| d29 | 2.78 | 2.78 | 2.78 |

ZOOM LENS UNIT DATA

| Unit | Starting surface | Focal length |
|---|---|---|
| 1 | 1 | 54.71 |
| 2 | 12 | −8.02 |
| 3 | 18 | 25.30 |
| 4 | 25 | 24.37 |
| 5 | 28 | −201.78 |

Image Pickup Apparatus

Figure 11:
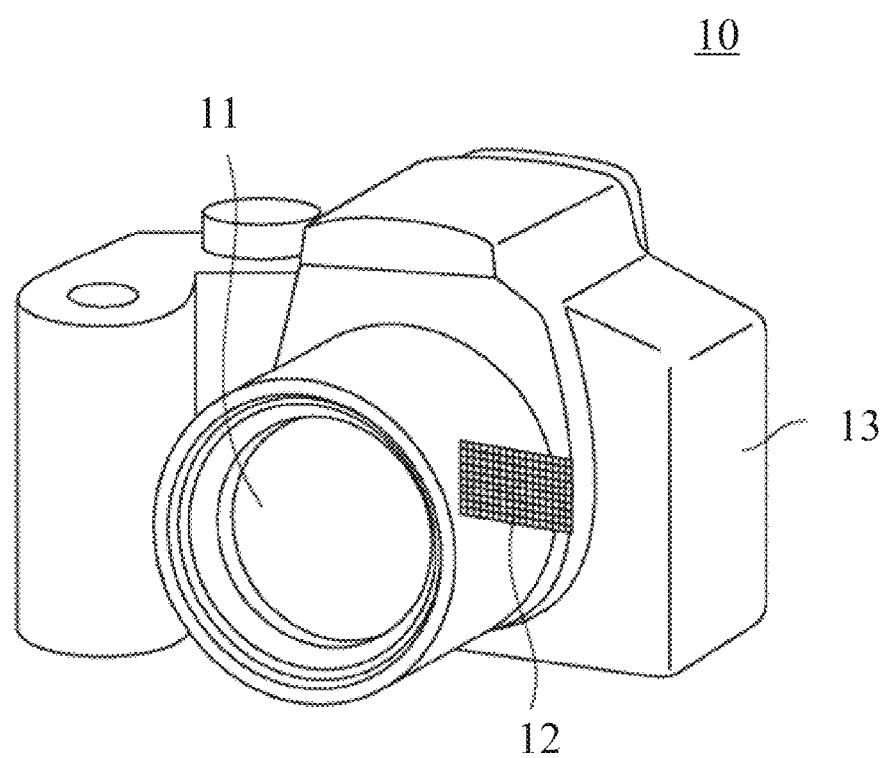
FIG. 11 is a schematic view of an image pickup apparatus according to each of the first to fifth embodiments.

Next, an example of a digital still camera as an image pickup apparatus will be described which uses any of the optical systems according to the first to eleventh embodiments as an image pickup optical system with reference to FIG. 11. In FIG. 11, a reference numeral 10 denotes a camera main body, and a reference numeral 11 denotes an image pickup optical system including any of the zoom lenses described in the first to eleventh embodiments. A reference numeral 12 denotes a solid-state image pickup element as a photoelectric converter such as a CCD sensor and a CMOS sensor, that is built in the camera main body and is configured to pick up an optical image formed by the image pickup optical system 11. The camera main body 10 may be a so-called single-lens reflex camera having a quick turn mirror, or may be a so-called mirrorless camera having no quick turn mirror.

By applying the zoom lens according to the present invention to an image pickup apparatus such as a digital still camera, an image pickup apparatus can be acquired which has a small lens.

Image Pickup System

An image pickup system (monitoring camera system) may include any of the zoom lenses according to the first to eleventh embodiments and a controller configured to control the zoom lens. In this case, the controller can control the zoom lens so that each lens unit moves as described above during zooming, focusing, and image stabilization. The controller may not necessarily be configured integrally with the zoom lens, and the controller may be configured as a separate body from the zoom lens. For example, a configuration may be used in which a controller (control apparatus) is disposed far away from a driver configured to drive each lens of the zoom lens, and in which a transmitter is included to transmit a control signal (instruction) for controlling the zoom lens. With such a controller, it is possible to remotely control the zoom lens.

A configuration may be used in which a controller includes an operation unit such as a controlling unit or a button for remotely controlling the zoom lens, and the zoom lens is controlled according to input to the operation unit by the user. For example, the operation unit may have an enlargement button and a reduction button, and may be configured to transmit a signal to the driver so that magnification of the zoom lens increases when the user presses the enlargement button, and the magnification of the zoom lens decreases when the user presses the reduction button.

The image pickup system may include a display such as a liquid crystal panel which displays information on zooming of the zoom lens. The information on zooming of the zoom lens is, for example, zooming magnification (zooming state) and a moving amount (moving state) of each lens unit. In this case, the user can remotely control the zoom lens via the operation unit while viewing the information on the zoom of the zoom lens displayed on the display. At this time, the display unit and the operation unit may be integrated by using, for example, a touch panel.

According to each embodiment, it is possible to provide, for example, a zoom lens and an image pickup apparatus each of which is beneficial in high magnification ratio, small size, and high performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-234095, filed on Dec. 25, 2019 and Japanese Patent Application No. 2019-233783, filed on Dec. 25, 2019, which are hereby incorporated by reference herein in their entirety.

What is claimed is:

1. A zoom lens comprising in order from an object side to an image side:
   a first lens unit having a positive refractive power;
   a second lens unit having a negative refractive power;
   a third lens unit having a positive refractive power; and
   one or more rear lens units,
   wherein the first lens unit does not move for zooming,
   an interval between each pair of adjacent lens units changes in zooming,
   the first lens unit includes four positive lenses including a positive lens made of material with an Abbe number less than 30, and
   following conditional expressions are satisfied:

$0.05 < TL1/f1 < 0.80$, $40 < ft/fw < 200$, and $0.2 < TL/ft < 0.7$, where TL1 represents a distance on an optical axis from a surface of the first lens unit closest to the object side to a surface of the first lens unit closest to the image side, f1 represents a focal length of the first lens unit, ft represents a focal length of the zoom lens at a telephoto end, fw represents a focal length of the zoom lens at a wide-angle end, and TL represents a total length of the zoom lens at the telephoto end.

2. The zoom lens according to claim 1, wherein a following conditional expression is satisfied:

$$1.65 < ndA < 20.30,$$

where ndA represents a refractive index of material of the positive lens.

3. The zoom lens according to claim 1, wherein a following conditional expression is satisfied:

$$-12.0 < f1/f2 < -2.0,$$

where f2 represents a focal length of the second lens unit.

4. The zoom lens according to claim 1, wherein a following conditional expression is satisfied:

$$-9.0 < M2/f2 < -3.0,$$

where M2 represents a moving amount of the second lens unit in zooming from the wide-angle end to the telephoto end, a sign of the moving amount M2 is positive in a case where a position of the second lens unit is closer to the image side at the telephoto end than at the wide-angle end, and f2 represents a focal length of the second lens unit.

5. The zoom lens according to claim 1, wherein a following conditional expression is satisfied:

$$-1.00 < f2/f3 < -0.10,$$

where f2 represents a focal length of the second lens unit, and f3 represents a focal length of the third lens unit.

6. The zoom lens according to claim 1, wherein a following conditional expression is satisfied:

$$0.1 < BFw/fw < 6.0,$$

where BFw represents a back focus of the zoom lens at the wide-angle end.

7. The zoom lens according to claim 1, wherein a following conditional expression is satisfied:

$$0 < \theta gFA + (0.00162 \times vdA) - 0.64146 < 0.15,$$

where vdA represents an Abbe number of the material of the positive lens, and θgFA represents a partial dispersion ratio of the material of the positive lens.

8. An image pickup apparatus comprising:
a zoom lens; and
an image pickup element configured to pick up an image formed via the zoom lens,
wherein the zoom lens comprises in order from an object side to an image side:
a first lens unit having a positive refractive power;
a second lens unit having a negative refractive power;
a third lens unit having a positive refractive power; and
one or more rear lens units,
wherein the first lens unit does not move for zooming,
an interval between each pair of adjacent lens units changes in zooming,
the first lens unit includes four positive lenses including a positive lens made of material with an Abbe number less than 30, and
following conditional expressions are satisfied:

$$0.05 < TL1/f1 < 0.80,$$

$$40 < ft/fw < 200, \text{ and}$$

$$0.2 < TL/ft < 0.7,$$

where TL1 represents a distance on an optical axis from a surface of the first lens unit closest to the object side to a surface of the first lens unit closest to the image side, f1 represents a focal length of the first lens unit, ft represents a focal length of the zoom lens at a telephoto end, fw represents a focal length of the zoom lens at a wide-angle end, and TL represents a total length of the zoom lens at the telephoto end.

* * * * *